US011189043B2

(12) United States Patent
McCombe et al.

(10) Patent No.: US 11,189,043 B2
(45) Date of Patent: Nov. 30, 2021

(54) IMAGE RECONSTRUCTION FOR VIRTUAL 3D

(71) Applicants: MINE ONE GmbH, Berlin (DE); James A. McCombe, San Francisco, CA (US)

(72) Inventors: James A. McCombe, San Francisco, CA (US); Christoph Birkhold, San Francisco, CA (US)

(73) Assignee: MINE ONE GMBH, Berlin (DE)

( * ) Notice: Subject to any disclaimer, the term of this patent is extended or adjusted under 35 U.S.C. 154(b) by 134 days.

(21) Appl. No.: 16/487,712

(22) PCT Filed: Feb. 22, 2018

(86) PCT No.: PCT/US2018/019243
§ 371 (c)(1),
(2) Date: Aug. 21, 2019

(87) PCT Pub. No.: WO2018/164852
PCT Pub. Date: Sep. 13, 2018

(65) Prior Publication Data
US 2020/0357128 A1  Nov. 12, 2020

Related U.S. Application Data

(63) Continuation-in-part of application No. 15/560,019, filed as application No. PCT/US2016/023433 on
(Continued)

(51) Int. Cl.
*G06K 9/00* (2006.01)
*G06T 7/593* (2017.01)
(Continued)

(52) U.S. Cl.
CPC ............ *G06T 7/593* (2017.01); *G06T 7/73* (2017.01); *G06T 7/85* (2017.01); *H04N 13/128* (2018.05);
(Continued)

(58) Field of Classification Search
CPC ...... A63F 13/327; A63F 13/213; A63F 13/25; A63F 13/32; A63F 13/332; A63F 13/335;
(Continued)

(56) References Cited

U.S. PATENT DOCUMENTS 8,395,629 B1    3/2013  Kilpatrick
10,551,913 B2 *  2/2020  McCombe ............... G06T 7/50
(Continued)

FOREIGN PATENT DOCUMENTS

CN    110230983    9/2019
CN    111028155    4/2020
(Continued)

OTHER PUBLICATIONS

Shin et al., "Virtual Viewpoint Disparity Estimation", PSIVT 2011, Part 1, LNCS 7087, pp. 121-131, Springer-Verlag 2011.

*Primary Examiner* — Duy M Dang
(74) *Attorney, Agent, or Firm* — Jacobs & Kim LLP; David Jacobs

(57) ABSTRACT

Methods, systems, devices and computer software/program code products enable reconstruction of synthetic images of a scene from the perspective of a virtual camera having a selected virtual camera position, based on images of the scene captured by a number of actual, physical cameras.

22 Claims, 45 Drawing Sheets

Related U.S. Application Data

Mar. 21, 2016, now Pat. No. 10,551,913, application No. PCT/US2018/019243, filed on Feb. 22, 2018, which is a continuation-in-part of application No. PCT/US2016/023433, filed on Mar. 21, 2016.

(60) Provisional application No. 62/136,494, filed on Mar. 21, 2015, provisional application No. 62/462,307, filed on Feb. 22, 2017.

(51) Int. Cl.
| | | |
|---|---|---|
| *G06T 7/80* | (2017.01) | |
| *G06T 7/73* | (2017.01) | |
| *H04N 13/128* | (2018.01) | |
| *H04N 13/194* | (2018.01) | |
| *H04N 13/00* | (2018.01) | |

(52) U.S. Cl.
CPC . *H04N 13/194* (2018.05); *G06T 2207/10024* (2013.01); *H04N 2013/0081* (2013.01)

(58) Field of Classification Search
CPC .......... A63F 13/655; A63F 13/00; G06T 7/55; G06T 3/0068; G06T 15/04; G06T 7/001; G06T 7/593; G06T 7/85; G06T 7/73; G06T 2207/10024; G06T 11/40; G06T 2207/20228; G06T 2207/30201; G06T 2207/10021; G06K 9/00228; G06K 9/6202; G06K 9/6279; G01S 13/90; G01S 17/89; H04N 13/128; H04N 13/194; H04N 2013/0081
See application file for complete search history.

(56) References Cited

U.S. PATENT DOCUMENTS

| | | |
|---|---|---|
| 2005/0078866 A1 | 4/2005 | Criminisi |
| 2005/0129325 A1 | 6/2005 | Wu |
| 2006/0193509 A1 | 8/2006 | Criminisi |
| 2009/0116695 A1 | 5/2009 | Anchyshkin |
| 2010/0094800 A1 | 4/2010 | Sharp |
| 2010/0103249 A1 | 4/2010 | Lipton |
| 2011/0187922 A1 | 8/2011 | Hwang |
| 2012/0045091 A1 | 2/2012 | Kaganovich |
| 2012/0099005 A1 | 4/2012 | Kali |
| 2013/0101160 A1 | 4/2013 | Woodfill |
| 2013/0293669 A1 | 11/2013 | Lucey |
| 2013/0321564 A1 | 12/2013 | Smith |
| 2014/0219551 A1 | 8/2014 | Tang |
| 2014/0267243 A1 | 9/2014 | Venkataraman et al. |
| 2014/0341290 A1 | 11/2014 | Fraunhofer |
| 2015/0373316 A1 | 12/2015 | Meng |
| 2016/0088287 A1 | 3/2016 | Sadi et al. |
| 2016/0189387 A1 | 6/2016 | Lensbricks |
| 2016/0219267 A1 | 7/2016 | Chu |
| 2017/0094243 A1 | 3/2017 | Venkataraman et al. |
| 2019/0304112 A1 | 10/2019 | Hota et al. |
| 2020/0302682 A1 | 9/2020 | Aksoy et al. |

FOREIGN PATENT DOCUMENTS

| | | |
|---|---|---|
| WO | WO 2016/154123 | 9/2016 |
| WO | WO 2018146558 | 11/2018 |

* cited by examiner

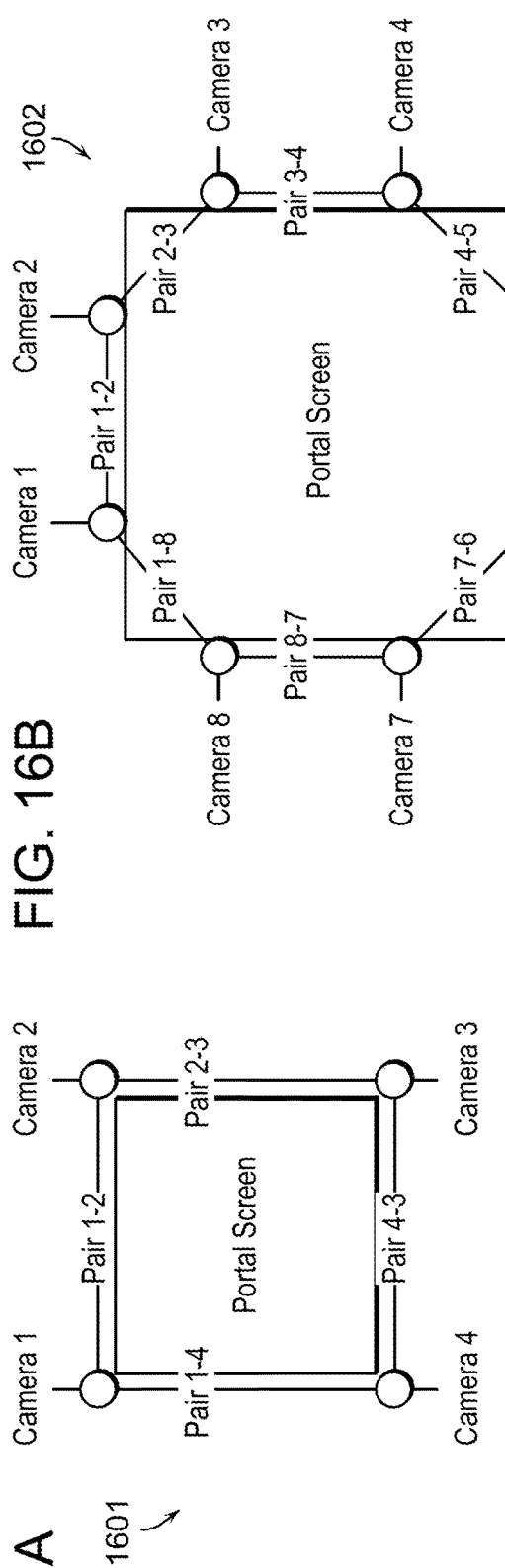
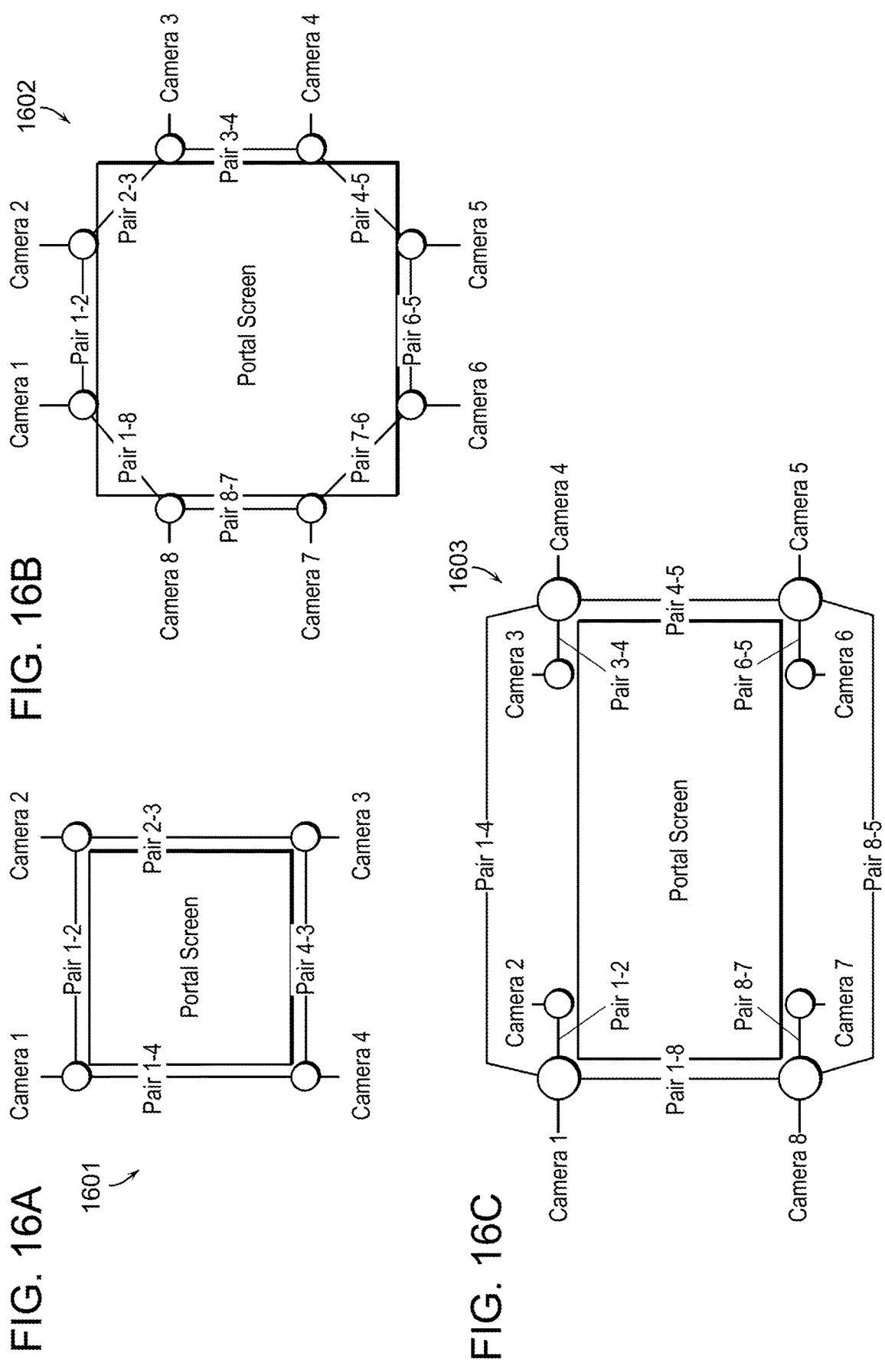
FIG. 16A
FIG. 16B
FIG. 16C

3100. EXEMPLARY IMAGE COMMUNICATION METHOD:

3101. CAPTURE SCENE IMAGES UTILIZING AT LEAST TWO CAMERAS, EACH HAVING A RESPECTIVE PHYSICAL CAMERA VIEW OF THE SCENE, WHEREIN EACH CAMERA CAPTURES AT LEAST ONE CAMERA IMAGE OF THE SCENE AND GENERATES CORRESPONDING IMAGE DATA REPRESENTATIVE OF THE RESPECTIVE CAMERA IMAGE OF THE SCENE

3102. OBTAIN CALIBRATION DATA REPRESENTATIVE OF EACH CAMERA'S RESPECTIVE CONFIGURATION AND REPRESENTATIVE OF AT LEAST ONE EPIPOLAR PLANE CONFIGURATION SHARED AMONG CAMERAS, WHEREIN AN EPIPOLAR PLANE IS SHARED BETWEEN AT LEAST TWO CAMERAS

3103. GENERATE AT LEAST ONE NATIVE DISPARITY MAP FOR A GIVEN EPIPOLAR PLANE, WHEREIN GENERATING A NATIVE DISPARITY MAP COMPRISES COMPUTATIONALLY SOLVING THE STEREO CORRESPONDENCE PROBLEM BETWEEN AT LEAST TWO CAMERAS IN A SHARED EPIPOLAR PLANE, USING RECTIFIED IMAGES FROM THE AT LEAST TWO CAMERAS, AND GENERATING DISPARITY VALUES STORED IN THE NATIVE DISPARITY MAP

3104. TRANSMIT, FOR REMOTE USE IN RECONSTRUCTION OF IMAGES OF THE SCENE, THE CALIBRATION DATA, IMAGE DATA REPRESENTATIVE OF THE CAMERA IMAGES, AND AT LEAST ONE NATIVE DISPARITY MAP

3105. RECEIVE, REMOTE FROM THE CAMERAS HAVING A PHYSICAL CAMERA VIEW OF THE SCENE, THE CALIBRATION DATA, IMAGE DATA REPRESENTATIVE OF THE CAMERA IMAGES AND AT LEAST ONE NATIVE DISPARITY MAP

3106. GENERATE, BASED ON THE CALIBRATION DATA, IMAGE DATA REPRESENTATIVE OF THE CAMERA IMAGES AND AT LEAST ONE NATIVE DISPARITY MAP, A SYNTHETIC, RECONSTRUCTED IMAGE OF THE SCENE FROM THE PERSPECTIVE OF A VIRTUAL CAMERA HAVING A SELECTED VIRTUAL CAMERA POSITION, THE SELECTED VIRTUAL CAMERA POSITION BEING UNCONSTRAINED BY THE PHYSICAL POSITION OF ANY OF THE CAMERAS HAVING AN ACTUAL VIEW OF THE SCENE, WHEREIN THE GENERATING COMPRISES: UTILIZING A SELECTED RASTERIZING TECHNIQUE, SELECTED RAY-TRACING TECHNIQUE, OR A SELECTED COMBINATION OF A RASTERIZING TECHNIQUE AND A RAY-TRACING TECHNIQUE, TO GENERATE CAMERA IMAGE UV SAMPLE COORDINATES AND SAMPLE WEIGHTS TO GENERATE THE RECONSTRUCTED IMAGE FROM THE PERSPECTIVE OF THE VIRTUAL CAMERA

FIG. 31

3200. EXEMPLARY IMAGE COMMUNICATION METHOD:

3201. CAPTURE IMAGES OF A SCENE, UTILIZING AT LEAST TWO CAMERAS, EACH HAVING A RESPECTIVE PHYSICAL CAMERA VIEW OF THE SCENE, WHEREIN EACH CAMERA CAPTURES AT LEAST ONE CAMERA IMAGE OF THE SCENE AND GENERATES CORRESPONDING IMAGE DATA REPRESENTATIVE OF THE RESPECTIVE CAMERA IMAGE OF THE SCENE, AND AN EPIPOLAR PLANE IS SHARED BETWEEN AT LEAST TWO CAMERAS

3202. GENERATE AT LEAST ONE NATIVE DISPARITY MAP FOR A GIVEN EPIPOLAR PLANE, WHEREIN GENERATING A NATIVE DISPARITY MAP COMPRISES COMPUTATIONALLY SOLVING THE STEREO CORRESPONDENCE PROBLEM BETWEEN AT LEAST TWO CAMERAS IN A SHARED EPIPOLAR PLANE, USING RECTIFIED IMAGES FROM THE AT LEAST TWO CAMERAS, AND GENERATING DISPARITY VALUES STORED IN THE NATIVE DISPARITY MAP

3203. TRANSMIT, FOR REMOTE USE IN RECONSTRUCTION OF IMAGES OF THE SCENE, IMAGE DATA REPRESENTATIVE OF THE CAMERA IMAGES, AND AT LEAST ONE NATIVE DISPARITY MAP

3204. RECEIVE THE IMAGE DATA AND AT LEAST ONE NATIVE DISPARITY MAP

3205. READ CALIBRATION DATA REPRESENTATIVE OF EACH CAMERA'S RESPECTIVE CONFIGURATION AND OF AT LEAST ONE EPIPOLAR PLANE CONFIGURATION SHARED AMONG CAMERAS

3206. GENERATE, BASED ON THE CALIBRATION DATA, IMAGE DATA AND AT LEAST ONE NATIVE DISPARITY MAP, A SYNTHETIC, RECONSTRUCTED IMAGE OF THE SCENE FROM THE PERSPECTIVE OF A VIRTUAL CAMERA HAVING A SELECTED VIRTUAL CAMERA POSITION, THE SELECTED VIRTUAL CAMERA POSITION BEING UNCONSTRAINED BY THE PHYSICAL POSITION OF ANY OF THE CAMERAS HAVING AN ACTUAL VIEW OF THE SCENE, WHEREIN GENERATING A RECONSTRUCTED IMAGE COMPRISES: UTILIZING A SELECTED RASTERIZING TECHNIQUE, SELECTED RAY-TRACING TECHNIQUE, OR A SELECTED COMBINATION OF A RASTERIZING TECHNIQUE AND A RAY-TRACING TECHNIQUE, TO GENERATE CAMERA IMAGE UV SAMPLE COORDINATES AND SAMPLE WEIGHTS TO GENERATE THE RECONSTRUCTED IMAGE FROM THE PERSPECTIVE OF THE VIRTUAL CAMERA

FIG. 32

3300. EXEMPLARY IMAGE COMMUNICATION METHOD:

3301. CAPTURE IMAGES OF A SCENE, UTILIZING AT LEAST TWO CAMERAS, EACH HAVING A RESPECTIVE PHYSICAL CAMERA VIEW OF THE SCENE, WHEREIN EACH CAMERA CAPTURES AT LEAST ONE CAMERA IMAGE OF THE SCENE AND GENERATES CORRESPONDING IMAGE DATA REPRESENTATIVE OF THE RESPECTIVE CAMERA IMAGE OF THE SCENE, AND WHEREIN AN EPIPOLAR PLANE IS SHARED BETWEEN AT LEAST TWO CAMERAS

3302. TRANSMIT, FOR REMOTE USE IN RECONSTRUCTION OF IMAGES OF THE SCENE, IMAGE DATA REPRESENTATIVE OF THE CAMERA IMAGES, THE IMAGE DATA COMPRISING LOSSLESS DATA FROM NATIVE CAMERA IMAGE BUFFERS

3303. RECEIVE THE IMAGE DATA

3304. READ CALIBRATION DATA REPRESENTATIVE OF EACH CAMERA'S RESPECTIVE CONFIGURATION AND OF AT LEAST ONE EPIPOLAR PLANE CONFIGURATION SHARED AMONG CAMERAS

3305. GENERATE, USING THE IMAGE DATA, AT LEAST ONE NATIVE DISPARITY MAP FOR A GIVEN EPIPOLAR PLANE, WHEREIN GENERATING A NATIVE DISPARITY MAP COMPRISES COMPUTATIONALLY SOLVING THE STEREO CORRESPONDENCE PROBLEM BETWEEN AT LEAST TWO CAMERAS IN A SHARED EPIPOLAR PLANE, USING RECTIFIED IMAGES FROM THE AT LEAST TWO CAMERAS, AND GENERATING DISPARITY VALUES STORED IN THE NATIVE DISPARITY MAP

3306. GENERATE, BASED ON THE CALIBRATION DATA, IMAGE DATA AND AT LEAST ONE NATIVE DISPARITY MAP, A SYNTHETIC, RECONSTRUCTED IMAGE OF THE SCENE FROM THE PERSPECTIVE OF A VIRTUAL CAMERA HAVING A SELECTED VIRTUAL CAMERA POSITION, THE SELECTED VIRTUAL CAMERA POSITION BEING UNCONSTRAINED BY THE PHYSICAL POSITION OF ANY OF THE CAMERAS HAVING AN ACTUAL VIEW OF THE SCENE, WHEREIN GENERATING A RECONSTRUCTED IMAGE COMPRISES UTILIZING A SELECTED RASTERIZING TECHNIQUE, SELECTED RAY-TRACING TECHNIQUE, OR A SELECTED COMBINATION OF A RASTERIZING TECHNIQUE AND A RAY-TRACING TECHNIQUE, TO GENERATE CAMERA IMAGE UV SAMPLE COORDINATES AND SAMPLE WEIGHTS TO GENERATE THE RECONSTRUCTED IMAGE FROM THE PERSPECTIVE OF THE VIRTUAL CAMERA

FIG. 33

3400. EXEMPLARY IMAGE COMMUNICATION METHOD:

3401. CAPTURE IMAGES OF A SCENE, UTILIZING AT LEAST TWO CAMERAS, EACH HAVING A RESPECTIVE PHYSICAL CAMERA VIEW OF THE SCENE, WHEREIN EACH CAMERA CAPTURES AT LEAST ONE CAMERA IMAGE OF THE SCENE AND GENERATES CORRESPONDING IMAGE DATA REPRESENTATIVE OF THE RESPECTIVE CAMERA IMAGE OF THE SCENE, AND AN EPIPOLAR PLANE IS SHARED BETWEEN AT LEAST TWO CAMERAS

3402. GENERATE AT LEAST ONE NATIVE DISPARITY MAP FOR A GIVEN EPIPOLAR PLANE, WHEREIN GENERATING A NATIVE DISPARITY MAP COMPRISES COMPUTATIONALLY SOLVING THE STEREO CORRESPONDENCE PROBLEM BETWEEN AT LEAST TWO CAMERAS IN A SHARED EPIPOLAR PLANE, USING RECTIFIED IMAGES FROM THE AT LEAST TWO CAMERAS, AND GENERATING DISPARITY VALUES STORED IN THE NATIVE DISPARITY MAP

3403. TRANSMIT, FOR REMOTE USE IN RECONSTRUCTION OF IMAGES OF THE SCENE, IMAGE DATA REPRESENTATIVE OF THE CAMERA IMAGES, AND AT LEAST ONE NATIVE DISPARITY MAP

3404. RECEIVE THE IMAGE DATA AND AT LEAST ONE NATIVE DISPARITY MAP

3405. READ CALIBRATION DATA REPRESENTATIVE OF EACH CAMERA'S RESPECTIVE CONFIGURATION AND OF AT LEAST ONE EPIPOLAR PLANE CONFIGURATION SHARED AMONG CAMERAS

3406. GENERATE, BASED ON THE CALIBRATION DATA, IMAGE DATA AND AT LEAST ONE NATIVE DISPARITY MAP, A SYNTHETIC, RECONSTRUCTED IMAGE OF THE SCENE FROM THE PERSPECTIVE OF A VIRTUAL CAMERA HAVING A SELECTED VIRTUAL CAMERA POSITION, THE SELECTED VIRTUAL CAMERA POSITION BEING UNCONSTRAINED BY THE PHYSICAL POSITION OF ANY OF THE CAMERAS HAVING AN ACTUAL VIEW OF THE SCENE, WHEREIN GENERATING A RECONSTRUCTED IMAGE COMPRISES UTILIZING A SELECTED RASTERIZING TECHNIQUE, SELECTED RAY-TRACING TECHNIQUE, OR A SELECTED COMBINATION OF A RASTERIZING TECHNIQUE AND A RAY-TRACING TECHNIQUE, TO GENERATE CAMERA IMAGE UV SAMPLE COORDINATES AND SAMPLE WEIGHTS TO GENERATE THE RECONSTRUCTED IMAGE FROM THE PERSPECTIVE OF THE VIRTUAL CAMERA, AND THE CAPTURING, THE GENERATING OF A NATIVE DISPARITY MAP AND THE TRANSMITTING ARE EXECUTED IN A TRANSMITTING DIGITAL PROCESSING RESOURCE, AND THE RECEIVING, READING AND GENERATING OF SYNTHETIC, RECONSTRUCTED IMAGE ARE EXECUTED IN A RECEIVING DIGITAL PROCESSING RESOURCE AT LEAST IN PART REMOTE FROM THE TRANSMITTING DIGITAL PROCESSING RESOURCE

FIG. 34

3500. EXEMPLARY IMAGE COMMUNICATION METHOD:

3501. CAPTURE IMAGES OF A SCENE, UTILIZING AT LEAST TWO CAMERAS, EACH HAVING A RESPECTIVE PHYSICAL CAMERA VIEW OF THE SCENE, WHEREIN EACH CAMERA CAPTURES AT LEAST ONE CAMERA IMAGE OF THE SCENE AND GENERATES CORRESPONDING IMAGE DATA REPRESENTATIVE OF THE RESPECTIVE CAMERA IMAGE OF THE SCENE, AND WHEREIN AN EPIPOLAR PLANE IS SHARED BETWEEN AT LEAST TWO CAMERAS

3502. GENERATE AT LEAST ONE NATIVE DISPARITY MAP FOR A GIVEN EPIPOLAR PLANE, WHEREIN GENERATING A NATIVE DISPARITY MAP COMPRISES COMPUTATIONALLY SOLVING THE STEREO CORRESPONDENCE PROBLEM BETWEEN AT LEAST TWO CAMERAS IN A SHARED EPIPOLAR PLANE, USING RECTIFIED IMAGES FROM THE AT LEAST TWO CAMERAS, AND GENERATING DISPARITY VALUES STORED IN THE NATIVE DISPARITY MAP

3503. TRANSMIT, FOR REMOTE USE IN RECONSTRUCTION OF IMAGES OF THE SCENE, IMAGE DATA REPRESENTATIVE OF THE CAMERA IMAGES, AND AT LEAST ONE NATIVE DISPARITY MAP, WHEREIN THE CAPTURING, THE GENERATING OF NATIVE DISPARITY MAP AND THE TRANSMITTING ARE EXECUTED BY A TRANSMITTING DIGITAL PROCESSING RESOURCE, AND THE IMAGE DATA AND AT LEAST ONE NATIVE DISPARITY MAP CONFIGURED SO THAT A RECEIVING DIGITAL PROCESSING RESOURCE CONFIGURED TO RECEIVE THE IMAGE DATA AND AT LEAST ONE NATIVE DISPARITY MAP, AND CONFIGURED TO READ CALIBRATION DATA REPRESENTATIVE OF EACH CAMERA'S RESPECTIVE CONFIGURATION AND OF AT LEAST ONE EPIPOLAR PLANE CONFIGURATION SHARED AMONG CAMERAS, CAN GENERATE, BASED ON THE CALIBRATION DATA, IMAGE DATA AND AT LEAST ONE NATIVE DISPARITY MAP, A SYNTHETIC, RECONSTRUCTED IMAGE OF THE SCENE FROM THE PERSPECTIVE OF A VIRTUAL CAMERA HAVING A SELECTED VIRTUAL CAMERA POSITION, THE SELECTED VIRTUAL CAMERA POSITION BEING UNCONSTRAINED BY THE PHYSICAL POSITION OF ANY OF THE CAMERAS HAVING AN ACTUAL VIEW OF THE SCENE

FIG. 35

3600. EXEMPLARY IMAGE COMMUNICATION METHOD:

3601. RECEIVE, FROM A TRANSMITTING DIGITAL PROCESSING RESOURCE, IMAGE DATA REPRESENTATIVE OF IMAGES OF A SCENE CAPTURED BY AT LEAST TWO RESPECTIVE CAMERAS, EACH HAVING A RESPECTIVE PHYSICAL CAMERA VIEW OF THE SCENE, WHEREIN EACH CAMERA IS CONFIGURED TO CAPTURE AT LEAST ONE CAMERA IMAGE OF THE SCENE AND GENERATE CORRESPONDING IMAGE DATA REPRESENTATIVE OF THE RESPECTIVE CAMERA IMAGE OF THE SCENE, AND AN EPIPOLAR PLANE IS SHARED BETWEEN AT LEAST TWO CAMERAS

3602. RECEIVE, FROM THE TRANSMITTING DIGITAL PROCESSING RESOURCE, AT LEAST ONE NATIVE DISPARITY MAP FOR A GIVEN EPIPOLAR PLANE, WHEREIN THE NATIVE DISPARITY MAP COMPRISES A COMPUTATIONAL SOLUTION TO THE STEREO CORRESPONDENCE PROBLEM BETWEEN AT LEAST TWO CAMERAS IN A SHARED EPIPOLAR PLANE, USING RECTIFIED IMAGES FROM THE AT LEAST TWO CAMERAS, WITH ASSOCIATED DISPARITY VALUES STORED IN THE NATIVE DISPARITY MAP

3603. READ CALIBRATION DATA REPRESENTATIVE OF EACH CAMERA'S RESPECTIVE CONFIGURATION AND OF AT LEAST ONE EPIPOLAR PLANE CONFIGURATION SHARED AMONG CAMERAS

3604. GENERATE, BASED ON THE CALIBRATION DATA, IMAGE DATA AND AT LEAST ONE NATIVE DISPARITY MAP, A SYNTHETIC, RECONSTRUCTED IMAGE OF THE SCENE FROM THE PERSPECTIVE OF A VIRTUAL CAMERA HAVING A SELECTED VIRTUAL CAMERA POSITION, THE SELECTED VIRTUAL CAMERA POSITION BEING UNCONSTRAINED BY THE PHYSICAL POSITION OF ANY OF THE CAMERAS HAVING AN ACTUAL VIEW OF THE SCENE, WHEREIN GENERATING A RECONSTRUCTED IMAGE COMPRISES UTILIZING A SELECTED RASTERIZING TECHNIQUE, SELECTED RAY-TRACING TECHNIQUE, OR A SELECTED COMBINATION OF A RASTERIZING TECHNIQUE AND A RAY-TRACING TECHNIQUE, TO GENERATE CAMERA IMAGE UV SAMPLE COORDINATES AND SAMPLE WEIGHTS TO GENERATE THE RECONSTRUCTED IMAGE FROM THE PERSPECTIVE OF THE VIRTUAL CAMERA

FIG. 36

3700. EXEMPLARY IMAGE COMMUNICATION METHOD:

3701. CAPTURE IMAGES OF A SCENE, UTILIZING AT LEAST TWO CAMERAS, EACH HAVING A RESPECTIVE PHYSICAL CAMERA VIEW OF THE SCENE, WHEREIN EACH CAMERA CAPTURES AT LEAST ONE CAMERA IMAGE OF THE SCENE AND GENERATES CORRESPONDING IMAGE DATA REPRESENTATIVE OF THE RESPECTIVE CAMERA IMAGE OF THE SCENE

3702. OBTAIN CALIBRATION DATA REPRESENTATIVE OF EACH CAMERA'S RESPECTIVE CONFIGURATION AND REPRESENTATIVE OF AT LEAST ONE EPIPOLAR PLANE CONFIGURATION SHARED AMONG CAMERAS, WHEREIN AN EPIPOLAR PLANE IS SHARED BETWEEN AT LEAST TWO CAMERAS

3703. GENERATE AT LEAST ONE NATIVE DISPARITY MAP FOR A GIVEN EPIPOLAR PLANE, WHEREIN GENERATING A NATIVE DISPARITY MAP COMPRISES COMPUTATIONALLY SOLVING THE STEREO CORRESPONDENCE PROBLEM BETWEEN AT LEAST TWO CAMERAS IN A SHARED EPIPOLAR PLANE, USING RECTIFIED IMAGES FROM THE AT LEAST TWO CAMERAS, AND GENERATING DISPARITY VALUES STORED IN THE NATIVE DISPARITY MAP

3704. TRANSMIT, FOR REMOTE USE IN RECONSTRUCTION OF IMAGES OF THE SCENE, THE CALIBRATION DATA, IMAGE DATA REPRESENTATIVE OF THE CAMERA IMAGES, AND AT LEAST ONE NATIVE DISPARITY MAP

3705. RECEIVE, REMOTE FROM THE CAMERAS HAVING A PHYSICAL CAMERA VIEW OF THE SCENE, THE CALIBRATION DATA, IMAGE DATA REPRESENTATIVE OF THE CAMERA IMAGES AND AT LEAST ONE NATIVE DISPARITY MAP

3706. GENERATE, BASED ON THE CALIBRATION DATA, IMAGE DATA REPRESENTATIVE OF THE CAMERA IMAGES AND AT LEAST ONE NATIVE DISPARITY MAP, A SYNTHETIC, RECONSTRUCTED IMAGE OF THE SCENE FROM THE PERSPECTIVE OF A VIRTUAL CAMERA HAVING A SELECTED VIRTUAL CAMERA POSITION, THE SELECTED VIRTUAL CAMERA POSITION BEING UNCONSTRAINED BY THE PHYSICAL POSITION OF ANY OF THE CAMERAS HAVING AN ACTUAL VIEW OF THE SCENE, WHEREIN THE GENERATING OF A RECONSTRUCTED IMAGE COMPRISES: (A) UTILIZING A SELECTED RASTERIZING TECHNIQUE, SELECTED RAY-TRACING TECHNIQUE, OR A SELECTED COMBINATION OF A RASTERIZING TECHNIQUE AND A RAY-TRACING TECHNIQUE, TO GENERATE CAMERA IMAGE UV SAMPLE COORDINATES AND SAMPLE WEIGHTS TO GENERATE THE RECONSTRUCTED IMAGE FROM THE PERSPECTIVE OF THE VIRTUAL CAMERA, AND (B) EXECUTING A PROJECTION FUNCTION FOR TRANSFORMING A POINT IN A DISPARITY MAP GENERATED FROM IMAGE DATA FROM THE CAMERAS INTO A COORDINATE ON THE DISPLAY DEVICE, TO ACCURATELY ACCOMMODATE DIFFERENCES IN POSITION AND FIELD OF VIEW OF THE RECONSTRUCTED IMAGE, AS DISPLAYED ON THE DISPLAY DEVICE, FROM THAT OF THE CAMERA IMAGES CAPTURED FROM THE REMOTE SCENE, THEREBY TO ENABLE A SELECTED VIRTUAL CAMERA PERSPECTIVE TO BE ACCURATELY DISPLAYED ON THE DISPLAY DEVICE

FIG. 37

3800. DUPLEX CONFIGURATION:

3801. CONFIGURE FIRST AND SECOND DIGITAL PROCESSING RESOURCES, RESPECTIVELY CORRESPONDING TO DIGITAL PROCESSING DEVICES ASSOCIATED WITH RESPECTIVE FIRST AND SECOND USERS, TO COMMUNICATE VIA A COMMUNICATIONS NETWORK TO FORM A DUPLEX CONFIGURATION

3802. EXECUTE THE CAPTURING OF IMAGES, OBTAINING CALIBRATION DATA, GENERATING AT LEAST ONE NATIVE DISPARITY MAP, TRANSMITTING IMAGE DATA, RECEIVING IMAGE DATA, AND GENERATING OF SYNTHETIC RECONSTRUCTED IMAGES IN A DUPLEX CONFIGURATION BY THE FIRST AND SECOND DIGITAL PROCESSING RESOURCES, OR BY OTHER DIGITAL PROCESSING RESOURCES IN COMMUNICATION WITH THE FIRST AND SECOND DIGITAL PROCESSING RESOURCES VIA THE COMMUNICATIONS NETWORK

FIG. 38

3900. PROJECTION FUNCTION
(PARENTHETICAL ELEMENTS ARE OPTIONAL TO PRACTICE OF INVENTIVE METHOD):

(3901. PROJECTION FUNCTION IS EXECUTED AT LEAST IN PART IN ACCORDANCE WITH A TRACKED POSITION OF THE USER'S EYES, FACE OR HEAD)

(3902. POSITION OF USER'S EYES, FACE OR HEAD ARE TRACKED BY EXECUTING A TRACKING FUNCTION)

(3903. EXECUTING A PROJECTION FUNCTION COMPRISES EXECUTING A FIELD OF VIEW CALCULATION, WHEREIN A FACE DEPTH VALUE, REPRESENTING A DISTANCE BETWEEN A RESPECTIVE USER'S FACE AND A DISPLAY DEVICE ASSOCIATED WITH THE USER, IS CALCULATED AND UTILIZED IN THE FIELD OF VIEW CALCULATION, TO ENABLE A SELECTED VIRTUAL CAMERA PERSPECTIVE TO BE ACCURATELY DISPLAYED ON THE USER'S DISPLAY DEVICE)

(3904. THE PROJECTION FUNCTION TRANSFORMS A PLURALITY OF POINTS COMPRISING A DISPARITY MAP, SUCH THAT THE DISPARITY MAP IS PROJECTED BY THE PROJECTION FUNCTION)

(3905. PROJECTING A DISPARITY MAP UTILIZES A RASTER TECHNIQUE)

(3906. PROJECTING A DISPARITY MAP UTILIZES A RAY TRACING TECHNIQUE)

(3907. PROJECTING A DISPARITY MAP UTILIZES A COMBINATION OF A RASTER TECHNIQUE AND A RAY TRACING TECHNIQUE)

FIG. 39

4000. CALIBRATION DATA (PARENTHETICAL ELEMENTS ARE OPTIONAL TO PRACTICE OF INVENTIVE METHOD):

(4001. CAPTURE IMAGES OF THE SCENE UTILIZING MORE THAN TWO CAMERAS, WHEREIN MORE THAN TWO CAMERAS ARE CALIBRATED TO THE SAME EPIPOLAR PLANE)

(4002. CALIBRATION DATA IS GENERATED SO AS TO DISTRIBUTE ALIGNMENT ERROR BETWEEN CAMERAS SHARING AN EPIPOLAR PLANE)

(4003. CALIBRATION DATA IS GENERATED SO AS TO EVENLY DISTRIBUTE ALIGNMENT ERROR BETWEEN ALL CAMERAS SHARING AN EPIPOLAR PLANE)

(4004. CAPTURING AND GENERATING DATA ARE EXECUTED ON ONE OR MORE DIGITAL PROCESSING ELEMENTS WITHIN ONE OR MORE DIGITAL PROCESSING RESOURCES, AND CALIBRATION DATA IS GENERATED DURING AN INITIALIZATION PHASE OF ONE OR MORE DIGITAL PROCESSING ELEMENTS)

(4005. CAPTURING AND GENERATING DATA ARE EXECUTED ON ONE OR MORE DIGITAL PROCESSING ELEMENTS WITHIN ONE OR MORE DIGITAL PROCESSING RESOURCES, AND CALIBRATION DATA IS GENERATED DURING MANUFACTURE OF ONE OR MORE DIGITAL PROCESSING ELEMENTS)

(4006. CAPTURING AND GENERATING DATA ARE EXECUTED ON ONE OR MORE DIGITAL PROCESSING ELEMENTS WITHIN ONE OR MORE DIGITAL PROCESSING RESOURCES, AND CALIBRATION DATA IS ESTABLISHED PRIOR TO MANUFACTURE OF ONE OR MORE DIGITAL PROCESSING ELEMENTS)

(4007. GENERATING OF SYNTHETIC IMAGE IS EXECUTED ON A DIGITAL PROCESSING RESOURCE, AND THE CALIBRATION DATA IS RECEIVED FROM A COMMUNICATIONS NETWORK IN COMMUNICATION WITH THE DIGITAL PROCESSING RESOURCE)

(4008. GENERATING OF SYNTHETIC IMAGE IS EXECUTED ON DIGITAL PROCESSING RESOURCE, AND DIGITAL PROCESSING RESOURCE HAS ASSOCIATED THEREWITH A DIGITAL STORE PRE-LOADED WITH CALIBRATION DATA, WITHOUT REQUIRING THE RECEIVING OF CALIBRATION DATA FROM A SOURCE EXTERNAL TO THE DIGITAL PROCESSING RESOURCE AT RUNTIME)

(4009. EACH CAMERA IMAGE ORIGINATES FROM A CAMERA CALIBRATED AGAINST AT LEAST ONE EPIPOLAR PLANE FOR WHICH AT LEAST ONE NATIVE DISPARITY MAP IS PRODUCED)

(4010. GENERATING A RECONSTRUCTED IMAGE COMPRISES RAY-TRACING INTO A SET OF PROJECTIONS OF DISPARITY MAPS BASED ON THE PROVIDED CALIBRATION DATA, THEREBY TO PRODUCE CAMERA IMAGE UV SAMPLE COORDINATES AND SAMPLE WEIGHTS)

FIG. 40

4100. MULTIPLE VIRTUAL CAMERA POSITIONS
(PARENTHETICAL ELEMENTS ARE OPTIONAL TO PRACTICE OF INVENTIVE METHOD):

(4101. SELECT AT LEAST TWO RESPECTIVE VIRTUAL CAMERA POSITIONS, & GENERATE PLURALITY OF RECONSTRUCTED IMAGES, COMPRISING RECONSTRUCTED IMAGES CORRESPONDING TO SELECTED VIRTUAL CAMERA POSITIONS)

(4102. THE SELECTED VIRTUAL CAMERA POSITIONS CORRESPOND TO RESPECTIVE RIGHT AND LEFT EYE POSITIONS OF A STEREO DISPLAY DEVICE)

(4103. SELECTED VIRTUAL CAMERA POSITIONS CORRESPOND TO RESPECTIVE INPUTS OF A LIGHT FIELD DISPLAY DEVICE)

(4104. DISPLAY DEVICE IS IN A HEAD MOUNTED DISPLAY (HMD) STRUCTURE)

(4105. THE CAPTURING OF DATA IS EXECUTED IN ASSOCIATION WITH AT LEAST ONE DIGITAL PROCESSING RESOURCE CONFIGURED TO TRANSMIT DATA, THE GENERATING OF A SYNTHETIC IMAGE IS EXECUTED IN AT LEAST ONE DIGITAL PROCESSING RESOURCE CONFIGURED TO RECEIVE DATA, AND A GIVEN RECEIVING DIGITAL PROCESSING RESOURCE CAN SELECT AT LEAST ONE VIRTUAL CAMERA POSITION)

(4106. GENERATING A RECONSTRUCTED IMAGE COMPRISES RASTERIZING A MESH OF PROJECTED POLYGONS DISPLACED BY THE DISPARITY MAP FROM ONE OF THE CAMERAS AND THE PROVIDED CALIBRATION DATA, THEREBY TO PRODUCE CAMERA IMAGE UV SAMPLE COORDINATES AND SAMPLE WEIGHTS)

(4107. A NATIVE DISPARITY MAP FOR A GIVEN EPIPOLAR PLANE IS STORED IN RECTIFIED, UNDISTORTED (RUD) IMAGE SPACE, BASED ON AN ORIGIN POINT OF A FIRST CAMERA ON THE EPIPOLAR PLANE, WITH EACH DISPARITY VALUE INDICATING A PIXEL OFFSET ALONG THE EPIPOLAR AXIS TO A MATCHING IMAGE FEATURE IN AN IMAGE CAPTURED BY A SECOND CAMERA ON THE EPIPOLAR PLANE, DISPLACED FROM THE FIRST CAMERA)

(4108. THE PIXEL OFFSET REPRESENTED BY A GIVEN DISPARITY VALUE IS EXPRESSED IN THE SAME COORDINATE SYSTEM AS THAT UTILIZED BY THE MAP IN WHICH THE DISPARITY VALUE IS STORED)

FIG. 41

DISPARITY MAP EXPANSION, CONTINUED
(PARENTHETICAL ELEMENTS ARE OPTIONAL TO PRACTICE OF INVENTIVE METHOD):

EXECUTE DISPARITY MAP EXPANSION, CONTINUED:

(4205. MAINTAIN STATUS INDICATOR FOR A GIVEN VALUE IN THE OUTPUT DISPARITY MAP TO INDICATE WHETHER THE GIVEN VALUE IS CONSIDERED FINAL; AND PREFER FINAL VALUES TO NON-FINAL VALUES)

(4206. PREFER VALUES INDICATING GREATER DISPARITY TO VALUES INDICATING LESS DISPARITY)

(4207. GENERATING A RECONSTRUCTED IMAGE COMPRISES UTILIZING A NATIVE DISPARITY MAP OR AN EXPANDED DISPARITY MAP PER EACH CAMERA)

(4208. IF A NATIVE DISPARITY MAP IS AVAILABLE FOR A CAMERA IN AT LEAST ONE ASSOCIATED EPIPOLAR PLANE, USE THAT NATIVE DISPARITY MAP; OTHERWISE, GENERATE AN EXPANDED DISPARITY MAP)

(4209. GENERATE, FOR EACH CAMERA FOR WHICH A NATIVE DISPARITY MAP IS NOT AVAILABLE IN ANY EPIPOLAR PLANE AGAINST WHICH IT IS CALIBRATED, AN EXPANDED DISPARITY MAP FROM A NATIVE DISPARITY MAP IN AN ASSOCIATED SHARED EPIPOLAR PLANE)

(4210. GENERATE DISPARITY VALUES IN A RAY-TRACING OPERATION)

(4211. GENERATE UV COORDINATES IN A RAY-TRACING OPERATION)

(4212. RAY-TRACING OPERATION GENERATES UV COORDINATES FOR INSTANCES IN WHICH A GIVEN RAY MISSES ALL AVAILABLE DISPARITY MAPS, THEREBY TO PROVIDE A DEFAULT HIT RESOLUTION)

(4213. DISPARITY MAP EXPANSION IS EXECUTED BY A DIGITAL PROCESSING RESOURCE ASSOCIATED WITH A TRANSMITTING DIGITAL PROCESSING SUBSYSTEM THAT TRANSMITS ANY OF THE CALIBRATION DATA, IMAGE DATA OR AT LEAST ONE NATIVE DISPARITY MAP)

(4214. DISPARITY MAP EXPANSION IS EXECUTED BY A DIGITAL PROCESSING RESOURCE ASSOCIATED WITH A RECEIVING DIGITAL PROCESSING SUBSYSTEM THAT RECEIVES ANY OF: THE CALIBRATION DATA, IMAGE DATA REPRESENTATIVE OF THE CAMERA IMAGES, OR AT LEAST ONE NATIVE DISPARITY MAP)

(4215. DISPARITY MAP EXPANSION IS EXECUTED BY A DIGITAL PROCESSING RESOURCE ASSOCIATED WITH A COMMUNICATIONS NETWORK THAT CONVEYS ANY OF: THE CALIBRATION DATA, IMAGE DATA REPRESENTATIVE OF THE CAMERA IMAGES, OR AT LEAST ONE NATIVE DISPARITY MAP)

FIG. 42B

4300. TRANSMITTING AND RECEIVING SUBSYSTEMS
(PARENTHETICAL ELEMENTS ARE OPTIONAL TO PRACTICE OF INVENTIVE METHOD):

(4301. COMPUTATIONALLY SOLVING THE STEREO CORRESPONDENCE PROBLEM TO GENERATE NATIVE DISPARITY MAPS IS EXECUTED BY A DIGITAL PROCESSING RESOURCE ASSOCIATED WITH A TRANSMITTING DIGITAL PROCESSING SUBSYSTEM THAT TRANSMITS ANY OF: THE CALIBRATION DATA, IMAGE DATA REPRESENTATIVE OF THE CAMERA IMAGES, OR AT LEAST ONE NATIVE DISPARITY MAP)

(4302. COMPUTATIONALLY SOLVING THE STEREO CORRESPONDENCE PROBLEM TO GENERATE NATIVE DISPARITY MAPS IS EXECUTED BY A DIGITAL PROCESSING RESOURCE ASSOCIATED WITH A RECEIVING DIGITAL PROCESSING SUBSYSTEM THAT RECEIVES ANY OF: THE CALIBRATION DATA, IMAGE DATA REPRESENTATIVE OF THE CAMERA IMAGES, OR AT LEAST ONE NATIVE DISPARITY MAP)

(4303. COMPUTATIONALLY SOLVING THE STEREO CORRESPONDENCE PROBLEM TO GENERATE NATIVE DISPARITY MAPS IS EXECUTED BY A DIGITAL PROCESSING RESOURCE ASSOCIATED WITH A COMMUNICATIONS NETWORK THAT CONVEYS ANY OF: THE CALIBRATION DATA, IMAGE DATA REPRESENTATIVE OF THE CAMERA IMAGES, OR AT LEAST ONE NATIVE DISPARITY MAP)

FIG. 43

4400. DISPARITY VALUE/ DISPARITY MAP PROCESS EXECUTION
(PARENTHETICAL ELEMENTS ARE OPTIONAL TO PRACTICE OF INVENTIVE METHOD):

(4401. COMPUTATIONAL OPERATION FOR SOLVING THE STEREO CORRESPONDENCE PROBLEM IS EXECUTED ON RAW IMAGE SENSOR DATA)

(4402. COMPUTATIONAL OPERATION FOR SOLVING THE STEREO CORRESPONDENCE PROBLEM IS EXECUTED ON NATIVE IMAGE BUFFERS WITH BAYER PATTERN REMOVED)

(4403. AT LEAST ONE CAMERA CAPTURES COLOR IMAGES)

(4404. CAMERA IMAGE DATA COMPRESSED PRIOR TO TRANSMISSION, & DECOMPRESSED AFTER BEING RECEIVED)

(4405. DISPARITY MAPS COMPRESSED PRIOR TO TRANSMISSION, & DECOMPRESSED AFTER BEING RECEIVED)

(4406. DISPARITY MAP COMPRESSION UTILIZES A DISCRETE COSINE TRANSFORM)

(4407. THE COMPRESSION IS LOSSLESS)

(4408. MULTIPLE DISPARITY MAPS ARE ENCODED TOGETHER TO REDUCE COMPUTATIONAL COST)

(4409. MULTIPLE DISPARITY MAPS ARE ENCODED TOGETHER TO IMPROVE COMPRESSION EFFICIENCY)

(4410. DISPARITY MAP VALUES ARE QUANTIZED VALUES WITH A SELECTED BIT DEPTH, THE BIT DEPTH BEING DEPENDENT ON CAMERA RESOLUTION AND PHYSICAL CAMERA SEPARATION)

(4411. A TOKEN, REPRESENTATIVE OF VALUES FOR BACKGROUND PIXEL DISPARITY, IS ENCODED WITH A SELECTED SMALL NUMBER OF BITS)

FIG. 44

4500. CAMERA/PORTAL CONFIGURATIONS
(PARENTHETICAL ELEMENTS ARE OPTIONAL TO PRACTICE OF INVENTIVE METHOD):

4501. ARRAY GIVEN SET OF CAMERAS IN A SELECTED CONFIGURATION:

(4502. CONFIGURATION COMPRISES AT LEAST ONE EPIPOLAR PLANE, AND AT LEAST ONE PAIR OF CAMERAS, AND WHEREIN A GIVEN CAMERA CAN BE A MEMBER OF AT LEAST ONE PAIR OF CAMERAS)

(4503. CONFIGURATION COMPRISES AT LEAST TWO PAIRS OF CAMERAS, AND WHEREIN A GIVEN CAMERA CAN BE A MEMBER OF AT LEAST TWO PAIRS OF CAMERAS)

(4504. CONFIGURATION COMPRISES (A) AN EPIPOLAR PLANE FOR EACH PAIR OF CAMERAS, AND (B) A PLURALITY OF PAIRS OF CAMERAS, THE PLURALITY OF PAIRS OF CAMERAS COMPRISING: EACH CAMERA PAIRED WITH, RESPECTIVELY, ONE OF EACH OF THE OTHER CAMERAS IN THE CONFIGURATION OF CAMERAS, SUCH THAT THE NUMBER OF PAIRS OF CAMERAS EXCEEDS THE NUMBER OF CAMERAS)

(4505. CONFIGURATION COMPRISES ONE EPIPOLAR PLANE, AND THE NUMBER OF PAIRS OF CAMERAS IS LESS THAN OR EQUAL TO THE NUMBER OF CAMERAS)

(4506. CONFIGURATION COMPRISES AT LEAST ONE PAIR OF CAMERAS IN WHICH EACH CAMERA COMPRISES A SENSOR, AND EACH CAMERA PAIR HAS A CAMERA PAIR BASELINE; AND THE CALIBRATION DATA COMPRISES DATA REPRESENTATIVE OF: (1) THE LENGTH OF A CAMERA PAIR BASELINE, (2) THE ORIENTATION OF THE CAMERA PAIR, (3) THE ORIENTATION OF EACH CAMERA SENSOR WITH RESPECT TO THE CAMERA PAIR, AND (4) THE ORIENTATION OF A GIVEN CAMERA SENSOR WITH RESPECT TO THE AT LEAST ONE EPIPOLAR PLANE)

(4507. CONFIGURATION COMPRISES AT LEAST TWO PAIRS OF CAMERAS, EACH CAMERA PAIR HAVING A CAMERA PAIR BASELINE, AND WHEREIN THE RESPECTIVE BASELINE LENGTHS OF AT LEAST TWO PAIRS OF CAMERAS ARE UNEQUAL)

(4508. GENERATE SHARED DISPARITY MAP BASED ON DISPARITY VALUES GENERATED FROM EACH OF AT LEAST TWO CAMERA PAIRS, WHEREIN DISPARITY VALUES GENERATED FROM A CAMERA PAIR ARE SCALED SO AS TO NORMALIZE THE DISPARITY DATA FOR INCLUSION IN THE SHARED DISPARITY MAP)

(4509. CONFIGURATION COMPRISES AT LEAST TWO PAIRS OF CAMERAS: GENERATE A SHARED DISPARITY MAP BASED ON DISPARITY DATA GENERATED FROM EACH OF THE AT LEAST TWO CAMERA PAIRS, THE SHARED DISPARITY MAP HAVING A SELECTED RESOLUTION, WHEREIN, FOR AT LEAST ONE CAMERA PAIR, THE RESOLUTION OF AT LEAST ONE CAMERA IS UNEQUAL TO THE RESOLUTION OF THE SHARED DISPARITY MAP)

(4510. SCALE DISPARITY DATA GENERATED FROM A CAMERA PAIR FOR INCLUSION IN THE SHARED DISPARITY MAP)

(4511. CONFIGURATION COMPRISES AT LEAST ONE PAIR OF CAMERAS IN WHICH THE CAMERAS IN THE PAIR HAVE UNEQUAL RESOLUTIONS)

(4512. SCALE OUTPUT DATA FROM ONE CAMERA IN AN UNEQUAL-RESOLUTION PAIR TO ALIGN WITH THE RESOLUTION OF OUTPUT DATA FROM THE OTHER CAMERA IN THE PAIR)

(4513. CONFIGURATION COMPRISES AT LEAST TWO PAIRS OF CAMERAS, EACH CAMERA PAIR HAVING A CAMERA PAIR BASELINE, AND EACH CAMERA HAVING HORIZONTAL AND VERTICAL AXES, AND WHEREIN FOR AT LEAST ONE CAMERA PAIR, THE CAMERA PAIR BASELINE IS NOT ALIGNED WITH EITHER THE HORIZONTAL OR VERTICAL AXIS OF A GIVEN CAMERA OF THE PAIR)

FIG. 45A

CAMERA/PORTAL CONFIGURATIONS, CONTINUED (4514. OUTPUT DATA FROM AT LEAST ONE CAMERA IN A CAMERA PAIR IS ROTATED TO GENERATE DISPARITY VALUES)

(4515. EACH CAMERA PAIR HAS AN EPIPOLAR LINE BETWEEN CAMERAS IN THE PAIR, AND DISPARITY VALUES ARE GENERATED IN A MANNER SO AS TO ACCOUNT FOR THE SLOPE OF THE EPIPOLAR LINE BETWEEN CAMERAS IN THE PAIR)

(4516. IN THE SELECTED CONFIGURATION, ALL CAMERAS SHARE THE SAME EPIPOLAR PLANE)

(4517. ALL CAMERAS HAVE SAME PHYSICAL RESOLUTION, AND BASELINE LENGTH FOR EACH CAMERA PAIR IS THE SAME)

(4518. DISPARITY VALUES GENERATED FOR ANY OF THE CAMERA PAIRS ARE INDICATIVE OF A DISTANCE BETWEEN A SCENE FEATURE AND THE ARRAY OF CAMERAS, AND FURTHER COMPRISING: COMPUTATIONALLY SELECTING, FROM AMONG DISPARITY VALUES GENERATED FOR ANY OF THE CAMERA PAIRS, THE MOST RELIABLE DISPARITY VALUE)

(4519. CONFIGURATION IS OCTAGONAL, ALL CAMERAS SHARE THE SAME EPIPOLAR PLANE, AND ALL CAMERAS HAVE THE SAME PHYSICAL RESOLUTION)

(4520. GENERATE ENHANCED DISPARITY MAP EXPANDER KERNEL TO ACCOUNT FOR THE BASELINE ORIENTATION OF AN OCTAGONAL CONFIGURATION BY INCORPORATING A 2D LINE ALGORITHM)

(4521. 2D LINE ALGORITHM IS BRESENHAM'S LINE ALGORITHM)

(4522. COMPUTATIONALLY ROTATE CAMERA OUTPUT BUFFERS TO FACILITATE APPLICATION OF A DISPARITY MAP EXPANDER KERNEL THAT OPERATES IN A STANDARD CARDINAL ORIENTATION)

(4523. CONFIGURATION COMPRISES A SET OF PRIMARY CAMERAS AND A SET OF SECONDARY CAMERAS; A GIVEN PRIMARY CAMERA IS PAIRED WITH A SECONDARY CAMERA; AND A GIVEN PRIMARY CAMERA IS ALSO PAIRED WITH AT LEAST ONE OTHER PRIMARY CAMERA)

(4524. A GIVEN SECONDARY CAMERA HAS A LOWER PHYSICAL RESOLUTION THAN THAT OF THE PRIMARY CAMERA WITH WHICH IT IS PAIRED)

(4525. THE SECONDARY CAMERAS ARE UTILIZED TO GENERATE DISPARITY VALUES AND NOT RGB IMAGE DATA)

(4526. A PIXEL DISPARITY COMPUTED FOR AN IMAGE FEATURE WITH RESPECT TO A GIVEN CAMERA PAIR IS NORMALIZED SO THAT DISPARITY INFORMATION CAN BE USED ACROSS CAMERA PAIRS)

(4527. DISPARITY VALUES ARE NORMALIZED WITH RESPECT TO THE LENGTH OF A GIVEN CAMERA PAIR'S EPIPOLAR LINE OR BASELINE)

(4528. CAMERA ARRAY CONFIGURATION IS SUBSTANTIALLY RECTILINEAR)

(4529. CAMERA ARRAY CONFIGURATION IS SUBSTANTIALLY SQUARE)

(4530. CAMERA ARRAY CONFIGURATION IS NON-RECTILINEAR)

FIG. 45B

4700. DETERMINING STEREO CORRESPONDENCE:

4701. COMPUTATIONALLY SELECT, IN A FIRST INPUT IMAGE, A FEATURE COMPRISING ONE OR MORE IMAGE PIXELS

4702. COMPUTATIONALLY SEARCH, IN A SECOND INPUT IMAGE, FOR A CORRESPONDENCE TO THE FEATURE

4703. COMPUTE AT LEAST ONE DISPARITY VALUE FOR THE FEATURE, BASED ON DIFFERENCES BETWEEN THE CORRESPONDING PERSPECTIVES OF THE FIRST AND SECOND INPUT IMAGES

4704. SHIFT DISPARITY VALUES BY AN AMOUNT BASED ON (A) THE MAGNITUDE OF THE DISPARITY VALUES AND (B) SEPARATION BETWEEN THE CORRESPONDING PERSPECTIVES OF THE FIRST AND SECOND INPUT IMAGES

FIG. 47

4800. EXEMPLARY RAY TRACING METHOD FOR RECONSTRUCTION:

4801. USE A DIGITAL PROCESSING ELEMENT TO READ A DISPARITY MAP FOR AT LEAST ONE OF THE PHYSICAL CAMERAS, THE DISPARITY MAP CONTAINING DISPARITY VALUES STORED THEREIN, WHEREIN THE DISPARITY MAP REPRESENTS A COMPUTATIONAL SOLUTION TO THE STEREO CORRESPONDENCE PROBLEM BETWEEN AT LEAST TWO CAMERAS IN A SHARED EPIPOLAR PLANE

4802. USE A DIGITAL PROCESSING ELEMENT TO READ CALIBRATION DATA REPRESENTATIVE OF A CAMERA'S RESPECTIVE CONFIGURATION AND REPRESENTATIVE OF AT LEAST ONE EPIPOLAR PLANE CONFIGURATION SHARED AMONG CAMERAS, WHEREIN AN EPIPOLAR PLANE IS SHARED BETWEEN AT LEAST TWO CAMERAS

4803. USING, AS AN INPUT, THE CALIBRATION DATA FOR AT LEAST ONE CAMERA FOR WHICH A DISPARITY MAP IS READABLE, COMPUTATIONALLY PROJECT THE DISPARITY MAP FOR THE AT LEAST ONE CAMERA INTO A SELECTED WORLD SPACE TO GENERATE A SCENE REPRESENTATION, THE SCENE REPRESENTATION COMPRISING A PLURALITY OF RECTANGLES, THE PLURALITY OF RECTANGLES COMPRISING ONE RECTANGLE PER EACH PIXEL IN THE DISPARITY MAP, WHEREIN A GIVEN RECTANGLE IS AT A SELECTED DISTANCE FROM THE CENTER OF PROJECTION OF THE RESPECTIVE CAMERA ALONG ITS PRINCIPAL RAY BASED ON THE ASSOCIATED DISPARITY, WITH A SELECTED SIZE EQUIVALENT TO THAT OF THE PIXEL PROJECTED ONTO A PLANE AT THE RESPECTIVE SELECTED DISTANCE, SUCH THAT, PROJECTED BACK ONTO THE CAMERA'S VIEW PLANE, THE PLURALITY OF RECTANGLES REPRESENTS A RENDERING OF THE DISPARITY MAP USED TO CREATE THE RECTANGLES

FIG. 48

4900. EXEMPLARY RAY TRACING METHOD FOR RECONSTRUCTION:

4901. RECEIVE (1) A SET OF SOURCE IMAGES OF THE SCENE CAPTURED BY AT LEAST TWO PHYSICAL CAMERAS EACH HAVING A PHYSICAL VIEW OF THE SCENE, EACH IMAGE COMPRISING A SET OF PIXELS, AND EACH PHYSICAL CAMERA HAVING ASSOCIATED FRUSTUM PLANES, INCLUDING DEFINED NEAR AND FAR PLANES, (2) DISPARITY MAPS CORRESPONDING TO THE IMAGES CAPTURED BY THE AT LEAST TWO PHYSICAL CAMERAS, AND (3) CALIBRATION DATA REPRESENTATIVE OF (I) EACH OF THE PHYSICAL CAMERAS FROM WHICH THE IMAGES ORIGINATE AND (II) A SELECTED VIRTUAL CAMERA CONFIGURATION

4902. FOR A GIVEN IMAGE PIXEL, GENERATE AT LEAST ONE RAY BASED ON THE VIRTUAL CAMERA CONFIGURATION REPRESENTED BY THE CALIBRATION DATA

4903. COMPUTATIONALLY INTERSECT THE RAY WITH THE FRUSTUM PLANES OF THE PHYSICAL CAMERAS, INCLUDING THE DEFINED NEAR AND FAR PLANES, TO ESTABLISH A SELECTED SEGMENT OF THE RAY TO BE TRACED AGAINST EACH OF THE DISPARITY MAPS

4904. COMPUTATIONALLY PROJECT THE PARAMETRIC INTERSECTIONS OF THE RAY ONTO THE CAMERA IMAGE PLANES TO ESTABLISH START AND END POSITIONS FOR 2D LINE TRACES THROUGH THE DISPARITY MAPS AND ASSOCIATED DISTANCE FUNCTION PARAMETERS

4905. ITERATIVELY STEP THROUGH THE DISPARITY MAPS AND EXECUTING A RAY-TRACING OPERATION, EACH RAY-TRACING OPERATION GENERATING A DEPTH VALUE AND A SET OF UV COORDINATES

4906. MERGE THE GENERATED DEPTH VALUES AND UV COORDINATES INTO A BLEND MAP, THE BLEND MAP COMPRISING A 2D ARRAY OF ELEMENTS CONTAINING UV COORDINATES, EACH ELEMENT CORRESPONDING TO AT LEAST ONE PIXEL IN AN OUTPUT IMAGE

4907. USE THE BLEND MAP TO SAMPLE FROM AT LEAST ONE SOURCE IMAGE

FIG. 49

5000. MESH-BASED RECONSTRUCTION METHOD:

5001. READ A NATIVE DISPARITY MAP FOR A FIRST PHYSICAL CAMERA HAVING A PHYSICAL VIEW OF A SCENE, THE DISPARITY MAP CONTAINING DISPARITY VALUES STORED THEREIN, THE DISPARITY MAP REPRESENTING A COMPUTATIONAL SOLUTION TO THE STEREO CORRESPONDENCE PROBLEM BETWEEN AT LEAST TWO CAMERAS IN A SHARED EPIPOLAR PLANE

5002. READ EITHER A NATIVE DISPARITY MAP OR AN EXPANDED DISPARITY MAP FOR A SECOND PHYSICAL CAMERA HAVING A PHYSICAL VIEW OF THE SCENE

5003. USING AT LEAST THE NATIVE DISPARITY MAP FOR THE FIRST CAMERA, EXECUTE THE FOLLOWING:

5003A. GENERATE QUAD PATCH VERTEX VALUES TO FORM A VERTEX ARRAY, INCLUDING GENERATING A REGULAR GRID OF VERTICES FORMING PAIRS OF ADJACENT TRIANGLES THAT FORM, PAIR-WISE, RESPECTIVE SQUARE QUADS, WHEREIN EACH VERTEX HAS (A) AN ASSOCIATED NORMALIZED COORDINATE WITHIN THE DISPARITY MAP FOR THE FIRST CAMERA, AND (B) A DISPARITY VALUE, WHEREIN THE DISPARITY VALUE CAN BE USED TO RE-PROJECT THE RESPECTIVE VERTEX TO A NEW LOCATION BASED ON A SELECTED PROJECTION FUNCTION

5003B. EXECUTE A SELECTED TRANSFORMATION OF THE QUAD PATCH VERTICES

5003C. GENERATE PER-FRAGMENT DISPARITY REFERENCE VALUES AND UV COORDINATE VALUES CORRESPONDING TO THE FIRST CAMERA

5003D. GENERATE UV COORDINATES FOR AN IMAGE OBTAINED BY THE SECOND CAMERA

5003E. EXECUTE WEIGHTED SUMMATION OF SAMPLES FROM CAMERA IMAGES CAPTURED BY EACH OF THE FIRST AND SECOND CAMERAS

5003F. GENERATE AN INPUT TO A RASTERIZATION DEPTH TEST, THEREBY PROJECTING THE DISPARITY MAP FROM FIRST CAMERA INTO ANOTHER, SELECTED PROJECTION FOR RECONSTRUCTION OF A SYNTHETIC IMAGE FROM THE PERSPECTIVE OF A VIRTUAL CAMERA

FIG. 50

5100. SAMPLE WEIGHTING METHOD:

5101. RECEIVE, AS AN INPUT, A SAMPLE REQUEST INTO A SET OF RESPECTIVE CAMERA IMAGES, ONES OF THE SAMPLE REQUESTS COMPRISING A UV COORDINATE INTO A RESPECTIVE CAMERA IMAGE IN RECTIFIED, UNDISTORTED (RUD) SPACE AND A WEIGHTING VALUE

5102. GENERATE COLOR VALUES DEFINING A COLOR TO BE DISPLAYED ON A DISPLAY DEVICE AT A RESPECTIVE PROJECTED POINT OF THE DISPLAY OF THE DISPLAY DEVICE, AS PART OF A RECONSTRUCTED SYNTHETIC IMAGE DRAWN ON THE DISPLAY OF THE DISPLAY DEVICE, IN ACCORDANCE WITH A WEIGHTED SUMMATION OF A PLURALITY OF CAMERA IMAGE SAMPLES AS DEFINED BY:

$$R = \sum_{i=0}^{n} W_i C_i$$

WHERE $R$ IS THE RECONSTRUCTED IMAGE COLOR TO BE DRAWN AT THE PROJECTED COORDINATE OF THE DISPLAY OF THE DISPLAY DEVICE; $N$ IS THE NUMBER OF INPUT SOURCE CAMERA IMAGES BEING INTEGRATED; $W_i$ IS THE WEIGHT OF THE CONTRIBUTION FROM THE GIVEN CAMERA, GIVEN BY A SELECTED WEIGHTING FUNCTION; AND $C_i$ IS A COLOR SAMPLE FROM THE GIVEN CAMERA; AND WHEREIN $W_i$ IS GENERATED BY EXECUTING A SELECTED SAMPLE WEIGHTING FUNCTION.

FIG. 51

IMAGE RECONSTRUCTION FOR VIRTUAL 3D

CROSS-REFERENCE TO RELATED APPLICATIONS AND INCORPORATION BY REFERENCE

This patent application is a 35 USC 371 National Stage of commonly-owned PCT Patent App. PCT/US18/19243 filed 22 Feb. 2018, which claims the priority benefit of commonly owned U.S. Provisional Application for Patent Ser. No. 62/462,307 filed 22 Feb. 2017. The present patent application is also a continuation-in-part of commonly owned PCT patent application PCT/US16/23433 filed 21 Mar. 2016, entitled "Virtual 3D Methods, Systems And Software", published as WO/2016/154123, which claims the priority benefit of U.S. Provisional Application for Patent Ser. No. 62/136,494 filed 21 Mar. 2015; and the present patent application is also a continuation-in-part of U.S. Pat. App. 15/560,019 filed 20 Sep. 2017 (U.S. Pat. No. 10,551,913), which is a 371 National Phase of PCT/US16/23433; each of the above-listed patent applications being incorporated by reference herein as if set forth herein in its entirety, including all text and drawings thereof.

This patent application is also related to commonly owned PCT patent application PCT/US16/32213 entitled "Facial Signature Methods, Systems and Software", published as WO/2016/183380, which is incorporated by reference herein as if set forth herein in its entirety, including all text and drawings thereof.

BACKGROUND OF THE INVENTION

It would be desirable to provide methods, systems, devices and computer software/program code products that enable reconstruction of synthetic images of a scene from the perspective of a virtual camera having a selected virtual camera position, based on images of the scene captured by a number of actual, physical cameras.

It would also be desirable to provide such functions at reasonable computational cost, and in a manner easily accommodated within the digital processing capabilities and form factors of modern mobile devices such as tablet computers and smartphones, as well as the form factors of laptops, PCs, computer-driven televisions, computer-driven projector devices, and the like, which does not dramatically alter the economics of building such devices, and which is viable within current or near current communications network/connectivity architectures.

The present invention provides methods, systems, devices and computer software/program code products that enable the foregoing aspects and others. Embodiments and practices of the invention are collectively referred to herein as image reconstruction or simply "reconstruction" methods, systems and software, and will also be discussed in connection with the virtual 3D ("V3D") subject matter of the above-listed, commonly owned patent applications incorporated by reference herein. Overall methods, systems or digital processing pipelines and networks incorporating the reconstruction aspects of the invention and the V3D aspects described in the above listed, commonly owned patent applications incorporated by reference herein are collectively referred to herein as V3D, and the reconstruction aspects of the invention may utilize certain V3D aspects as well. Aspects, examples, embodiments and practices of the invention, whether in the form of methods, devices, systems or computer software/program code products, will next be described in greater detail in the following Detailed Description of the Invention, in conjunction with the attached drawing figures.

SUMMARY OF THE INVENTION

The present invention provides methods, systems, devices, and computer software/program code products suitable for a wide range of applications, including, but not limited to: facilitating video communications and presentation of image and video content in telecommunications applications; facilitating video communications and presentation of image and video content for virtual reality (VR), augmented reality (AR) and head-mounted display (HMD) systems; enabling accurate, reliable identification or'authentication of a human user, in a secure, difficult to forge manner; and generating image input streams for a control system of an autonomous vehicle.

Methods, systems, devices, and computer software/program code products in accordance with the invention are suitable for implementation or execution in, or in conjunction with, commercially available computer graphics processor configurations and systems including one or more display screens for displaying images, cameras for capturing images, and graphics processors for rendering images fin storage or for display, such as on a display screen, and for processing data values for pixels in an image representation. The cameras, graphics processors and display screens can be of a form provided in commercially available smartphones, tablets and other mobile telecommunications devices, as well as in commercially available laptop and desktop computers, which may communicate using commercially available network architectures including client/server and client/network/cloud architectures.

In the aspects of the invention described below and hereinafter, the algorithmic image processing methods described are executed by digital processors, which can include graphics processor units, including GPGPUs such as those commercially available on cellphones, smartphones, tablets and other commercially available telecommunications and computing devices, as well as in digital display devices and digital cameras. Those skilled in the art to which this invention pertains will understand the structure and operation of digital processors, GPGPUs and similar digital graphics processor units.

While a number of the following aspects are described in the context of one-directional ("half-duplex") configurations, those skilled M the art will understand that the invention further relates to and encompasses providing bi-directional, full-duplex configurations of the claimed subject matter.

One aspect of the present invention relates to methods, systems and computer software/program code products that enable remote reconstruction of synthetic images of a scene, based on images captured from the scene, from the perspective of as virtual camera having a selected virtual camera position. This aspect comprises capturing images of a scene, utilizing at least two cameras, each having a respective physical camera view of the scene, wherein each camera captures at least one camera image of the scene and generates corresponding image data representative of the respective camera image of the scene; obtaining calibration data representative of each camera's respective configuration and representative of at least one epipolar plane configuration shared among cameras, wherein an epipolar plane is shared between at least two cameras; generating at least one native disparity map for a given epipolar plane, wherein generating a native disparity map comprises computationally solving the stereo correspondence problem between at least two cameras in a shared epipolar plane, using rectified images from the at least two cameras, and generating disparity values stored the native disparity map; transmitting, for remote use in reconstruction of images of the scene, the calibration data, image data representative of the camera images, and at least one native disparity map; receiving, remote from the cameras having a physical camera view of the scene, the calibration data, image data representative of the camera images and at least one native disparity map; and generating, based on the calibration data, image data representative of the camera images and at least one native disparity map, a synthetic, reconstructed image of the scene from the perspective of a virtual camera having a selected virtual camera position, the selected virtual camera position being unconstrained by the physical position of any of the cameras having an actual view of the scene; the generating of a reconstructed image comprising: utilizing a selected rasterizing technique, selected ray-tracing technique, or a selected combination of a rasterizing technique and a ray-tracing technique, to generate camera image UV sample coordinates and sample weights to generate the reconstructed image from the perspective of the virtual camera.

Another aspect of the present invention relates to such methods, systems and computer software/program code products comprising: capturing images of a scene, utilizing at least two cameras, each having a respective physical camera view of the scene, wherein each camera captures at least one camera image of the scene and generates corresponding image data representative of the respective camera image of the scene, and wherein an epipolar plane is shared between at least two cameras; generating at least one native disparity map far a given epipolar plane, wherein generating a native disparity map comprises computationally solving the stereo correspondence problem between at least two cameras in a shared epipolar plane, using rectified images from the at least two cameras, and generating disparity values stored in the native disparity map; transmitting, for remote use in reconstruction of images of the scene, image data representative of the camera images, and at least one native disparity map; receiving the image data and at least one native disparity map, reading calibration data representative of each camera's respective configuration and of at least one epipolar plane configuration shared among cameras; and generating, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene; the generating of a reconstructed image comprising: utilizing a selected rasterizing technique, selected ray-tracing technique, or a selected combination of a rasterizing technique and a ray-tracing technique, to generate camera image UV sample coordinates and sample weights to generate the reconstructed image from the perspective of the virtual camera.

Still another aspect of the present invention relates to such methods, systems and computer software/program code products comprising: capturing images of a scene, utilizing at least two cameras, each having a respective physical camera view of the scene, wherein each camera captures at least one camera image of the scene and generates corresponding image data representative of the respective camera image of the scene, and wherein an epipolar plane is shared between at least two cameras; transmitting, for remote use in reconstruction of images of the scene, image data representative of the camera images, the image data comprising lossless data from native camera image buffers; receiving the image data; reading calibration data representative of each camera's respective configuration and of at least one epipolar plane configuration shared among cameras; generating, using the image data, at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map; generating, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene; the generating of a reconstructed image comprising: utilizing a selected rasterizing technique, selected ray-tracing technique, or a selected combination of a rasterizing technique and a ray-tracing technique, to generate camera image UV sample coordinates and sample weights to generate the reconstructed image from the perspective of the virtual camera.

Yet another aspect of the present invention relates to such methods, systems and computer software/program code products comprising: capturing images of a scene, utilizing at least two cameras, each having a respective physical camera view of the scene, wherein each camera captures at least one camera image of the scene and generates corresponding image data representative of the respective camera image of the scene, and Wherein an epipolar plane is shared between at least two cameras; generating at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map; transmitting, for remote use in reconstruction of images of the scene, image data representative of the camera images, and at least one native disparity map; receiving the image data and at least one native disparity map; reading calibration data representative of each camera's respective configuration and of at least one epipolar plane configuration shared among cameras; and generating, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene; the generating of a reconstructed image comprising: utilizing a selected rasterizing technique, selected ray-tracing technique, or a selected combination of a rasterizing technique and a ray-tracing technique, to generate camera image UV sample coordinates and sample weights to generate the reconstructed image from the perspective of the virtual camera; wherein the capturing, generating of native disparity map and transmitting are executed in a transmitting digital processing resource, and the receiving, reading and generating of synthetic, reconstructed image are executed in a receiving digital processing resource at least in part remote from the transmitting digital processing resource.

Another aspect of the present invention relates to such methods, systems and computer software/program code products comprising: capturing images of a scene, utilizing at least two cameras, each having a respective physical camera view of the scene, wherein each camera captures at least one camera image of the scene and generates corresponding image data representative of the respective camera image of the scene, and Wherein an epipolar plane is shared between at least two cameras; generating at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map; and transmitting, for remote use in reconstruction of images of the scene, image data representative of the camera images, and at least one native disparity map; the capturing, generating of native disparity map and transmitting being executed by a transmitting digital processing resource, and the image data and at least one native disparity map being configured so that a receiving digital processing resource configured to receive the image data and at least one native disparity map, and configured to read calibration data representative of each camera's respective configuration and of at least one epipolar plane configuration shared among cameras, can generate, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene.

Still another aspect of the present invention relates to such methods, systems and computer software program code products comprising: receiving, from a transmitting digital processing resource, image data representative of images of a scene captured by at least two respective cameras, each having a respective physical camera view of the scene, each camera being configured to capture at least one camera image of the scene and generate corresponding image data representative of the respective camera image of the scene, wherein an epipolar plane is shared between at least two cameras; receiving, from the transmitting digital processing resource, at least one native disparity map for a given epipolar plane, wherein the native disparity map comprises a computational solution to the stereo correspondence problem between at least two cameras in a shared epipolar plane, using rectified images from the at least two cameras, with associated disparity values stored in the native disparity map; reading calibration data representative of each camera's respective configuration and of at least one epipolar plane configuration shared among cameras; and generating, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene; the generating of a reconstructed image comprising: utilizing a selected rasterizing technique, selected ray-tracing technique, or a selected combination of a rasterizing technique and a ray-tracing technique, to generate camera image UV sample coordinates and sample weights to generate the reconstructed image from the perspective of the virtual camera.

Another aspect of the present invention relates to methods, systems and computer software/program code products that enable capture of images of a given scene and remote reconstruction, based on the captured images, of synthetic images of the scene from the perspective of a virtual camera having a selected virtual camera position, such that the synthetic images, when displayed on a display device to a human user remote from the given scene, give the user the visual impression of looking through the display device as a physical window to the scene, as if the user were present at the scene. This aspect comprises: capturing images of a scene, utilizing at least two cameras, each having a respective physical camera view of the scene, wherein each camera captures at least one camera image of the scene and generates corresponding image data representative of the respective camera image of the scene; obtaining calibration data representative of each camera's respective configuration and representative of at least one epipolar plane configuration shared among cameras, wherein an epipolar plane is shared between at least two cameras; generating at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map; transmitting, for remote use in reconstruction of images of the scene, the calibration data, image data representative of the camera images, and at least one native disparity map; receiving, remote from the cameras having a physical camera view of the scene, the calibration data, image data representative of the camera images and at least one native disparity map; and generating, based on the calibration data, image data representative of the camera images and at least one native disparity map, a synthetic, reconstructed image of the scene from the perspective of a virtual camera having a selected virtual camera position, the selected virtual camera position being unconstrained by the physical position of any of the cameras having an actual view of the scene; the generating of a reconstructed image comprising:

(a) utilizing a selected rasterizing technique, selected ray-tracing technique, or a selected combination of a rasterizing technique and a ray-tracing; technique, to generate camera image UV sample coordinates and sample weights to generate the reconstructed image from the perspective of the virtual camera, and (b) executing a projection function for transforming a point in a disparity map generated from image data from the cameras into a coordinate on the display device, to accurately accommodate differences in position and field of view of the reconstructed image, as displayed on the display device, from that of the camera images captured from the remote scene, thereby to enable a selected virtual camera perspective to be accurately displayed on the display device.

In another aspect, the projection function is executed at least in part in accordance with a tracked position of the user's eyes, face or head.

In another aspect, the position of the user's eyes, face or head are tracked by executing a tracking function.

In yet another aspect, first and second digital processing resources, respectively corresponding to digital processing devices associated with respective first and second users, are configured to communicate via a communications network to form a duplex configuration, wherein the capturing, of images, obtaining calibration data, generating at least one native disparity map, transmitting image data, receiving image data, and generating of synthetic reconstructed images are executable in a duplex configuration by the first and second digital processing resources, or by other digital processing resources in communication with the first and second digital processing resources via the communications network.

In another aspect of the invention, executing a projection function comprises a field of view calculation, and wherein a face depth value, representing a distance between a respective user's face and a display device associated with the user, is calculated and utilized in the field of view calculation, to enable a selected virtual camera perspective to be accurately displayed on the user's display device.

In another aspect, the projection function transforms a plurality of points comprising a disparity map, such that the disparity map is projected by the projection function.

In another aspect, projecting a disparity map utilizes a raster technique.

In still another aspect, projecting a disparity map utilizes a ray tracing technique.

In yet another aspect of the invention, projecting a disparity map utilizes a combination of a raster technique and a ray tracing technique.

Another aspect comprises capturing images of the scene utilizing more than two cameras, wherein more than two cameras are calibrated to the same epipolar plane.

In another aspect, calibration data is generated so as to distribute alignment error between cameras sharing an epipolar plane.

In still another aspect, calibration data is generated so as to evenly distribute alignment error between all cameras sharing an epipolar plane.

In another aspect of the invention, the capturing and generating are executed on one or more digital processing elements within one or more digital processing resources, and calibration data is generated during an initialization phase of one or more digital processing elements.

In another aspect, the capturing and generating are executed on one or more digital processing elements within one or more digital processing resources, and calibration data is generated during manufacture of one or more digital processing elements.

In yet another aspect, the capturing and generating are executed on one or more digital processing elements within one or more digital processing resources, and calibration data is established prior to manufacture of one or more digital processing elements.

In another aspect of the invention, the generating of a synthetic image is executed on a digital processing resource, and the calibration data is received from a communications network in communication with the digital processing resource.

In another aspect, the generating of a synthetic image is executed on a digital processing resource, and wherein the digital processing resource has associated therewith a digital store pre-Loaded with the calibration data, without requiring the receiving of calibration data from a source external to the digital processing resource at runtime.

In another aspect of the invention, each camera image originates from a camera calibrated against at least one epipolar plane for which at least one native disparity map is produced.

In yet another aspect, generating a reconstructed image comprises ray-tracing into a set of projections of disparity maps based on the provided calibration data, thereby to produce camera image UV sample coordinates and sample weights.

Another aspect of the invention comprises selecting at least two respective virtual camera positions, and generating a plurality of reconstructed images, comprising reconstructed images corresponding to the selected virtual camera positions.

In another aspect, the selected virtual camera positions correspond to respective right and left eye positions of a stereo display device.

In a further aspect, the selected virtual cam positions correspond to respective inputs of a light field display device.

In another aspect, the display device is in a head mounted display (HMD) structure.

In still another'aspect of the invention, (a) the capturing is executed in al least one digital processing resource configured to transmit data, (b) the generating of a synthetic image is executed in at least one digital processing resource configured to receive data, and (c) a given receiving digital processing resource can select at least one virtual camera position.

In another aspect, generating a reconstructed image comprises rasterizing a mesh of projected polygons displaced by the disparity map from one of the cameras and the provided calibration data, thereby to produce camera image UV sample coordinates and sample weights.

In another aspect, a native disparity map for a given epipolar plane is stored in rectified, undistorted (RUD) image space, based on an origin point of a first camera on the epipolar plane, with each disparity value indicating a pixel offset along the epipolar axis to a Matching image feature in an image captured by a second camera on the epipolar plane, displaced from the first camera.

In still another aspect of the invention, the pixel offset represented by a given disparity value is expressed in the same coordinate system as that utilized by the map in which the disparity value is stored.

Another aspect comprises executing disparity map expansion, to avoid computational costs associated with generating a native disparity map for a given camera.

In a further aspect of the invention, executing disparity map expansion comprises: computing a displacement value, based on a virtual camera position in an epipolar plane; reading input disparity values from an input disparity map; shifting disparity values read from the input disparity map into an output disparity map, the disparity values being shifted by an amount computed as a function of the disparity value and the virtual camera position; and generating additional disparity values to fill unassigned values in the output disparity map; thereby generating an expanded disparity map.

In another aspect, executing disparity map expansion further comprises: maintaining a status indicator for a given value in the output disparity map to indicate whether the given value is considered final; and preferring final values to non-final values.

A further aspect of the invention comprises: preferring values indicating greater disparity to values indicating less disparity.

In another aspect, generating a reconstructed image comprises utilizing a native disparity map or an expanded disparity map per each camera.

Another aspect comprises: if a native disparity map is available for a camera in at least one associated epipolar plane, using that native disparity map; otherwise, generating an expanded disparity map.

Another aspect of the invention comprises generating, for each camera for which a native disparity map is not available in any epipolar plane against which it is calibrated, an expanded disparity map from a native disparity map in an associated shared epipolar plane.

In another aspect, disparity values are generated in a ray-tracing operation.

In still another aspect, UV coordinates are generated in a ray-tracing operation.

In another aspect of the invention, the ray-tracing operation generates UV coordinates for instances in which a given ray misses all available disparity maps, thereby to provide a default hit resolution.

In another aspect, disparity map expansion is executed by a digital processing resource associated with a transmitting digital processing subsystem that transmits any of the calibration data, image data or at least one native disparity map.

In another aspect of the invention, disparity map expansion is executed by a digital processing resource associated with a receiving digital processing subsystem that receives any of the calibration data, image data representative of the camera images, or at least one native disparity map.

In a further aspect, disparity map expansion is executed by a digital processing resource associated with a communications network that conveys any of the calibration data, image data representative of the camera images, or at least one native disparity map.

In another aspect, computationally solving; the stereo correspondence problem to generate native disparity maps is executed by a digital processing resource associated with a transmitting digital processing subsystem that transmits any of: the calibration data, image data representative of the camera images, or at least one native disparity map.

In another aspect of the invention, computationally solving the stereo correspondence problem to generate native disparity maps is executed by a digital processing resource associated with a receiving digital processing subsystem that receives any of: the calibration data, image data representative of the camera images, or at least one native disparity map.

In yet another aspect, computationally solving the stereo correspondence problem to generate native disparity maps is executed by a digital processing resource associated with a communications network that conveys any of: the calibration data, image data representative of the camera images, or at least one native disparity map.

In another aspect, a computational operation for solving the stereo correspondence problem is executed on raw image sensor data.

In another aspect, a computational operation for solving the stereo correspondence problem is executed on native image buffers with Bayer pattern removed.

In a further aspect of the invention, at least one camera captures color images.

In another aspect, camera image data is compressed prior to transmission, and decompressed after being received.

In another aspect, disparity maps are compressed prior to transmission, and decompressed after being received.

In another aspect of the invention, the compression utilizes a discrete cosine transform.

In still another aspect, the compression is lossless.

In another aspect of the invention, multiple disparity maps are encoded together, to reduce computational cost.

In still another aspect, multiple disparity maps are encoded together, to improve compression efficiency.

In a further aspect of the invention, disparity map values are quantized values with a selected bit depth, the bit depth being dependent on camera resolution and physical camera separation.

In another aspect, a token, representative of values for background pixel disparity, is encoded with a selected small number of bits.

In another aspect, a given set of cameras is arrayed in a selected configuration.

In yet another aspect, the selected configuration comprises at least one epipolar plane, and at least one pair of cameras, and wherein a given camera can be a member of at least one pair of cameras.

In another aspect of the invention, the selected configuration comprises at least two pairs of cameras, and wherein a given camera can be a member of at least two pairs of cameras.

In another aspect, the selected configuration comprises (a) an epipolar plane for each pair of cameras, and (b) a plurality of pairs of cameras, the plurality of pairs of cameras comprising: each camera paired with, respectively, one of each of the other cameras in the configuration of cameras, such that the number of pairs of cameras exceeds the number of cameras.

In still another aspect, the selected configuration comprises one epipolar plane, and the number of pairs of cameras is less than or equal to the number of cameras.

In another aspect of the invention, (a) the selected configuration comprises at least one pair of cameras in which each camera comprises a sensor, and each camera pair has a camera pair baseline, and (b) the calibration data comprises data representative of (1) the length of a camera pair baseline, (2) the orientation of the camera pair, (3) the orientation of each camera sensor with respect to the camera pair, and (4) the orientation of a given camera sensor with respect to the at least one epipolar plane.

In another aspect, the selected configuration comprises at least two pairs of cameras, each camera pair having a camera pair baseline, and wherein the respective baseline lengths of at least two pairs of cameras are unequal.

Another aspect of the invention comprises generating a shared disparity map based on disparity values generated from each of at least two camera pairs, and wherein disparity values generated from a camera pair are scaled so as to normalize the disparity data for inclusion in the shared disparity map.

In another aspect, the selected configuration comprises at least two pairs of cameras, and further comprising: generated a shared disparity map based on disparity data generated from each of the at least two camera pairs, the shared disparity map having a selected resolution, and further wherein, for at least one camera pair, the resolution of at least one camera is unequal to the resolution of the shared disparity map.

In another aspect of the invention, disparity data generated from a camera pair is scaled for inclusion in the shared disparity map.

In another aspect, the selected configuration comprises at least one pair of cameras it which the cameras in the pair have unequal resolutions.

In still another aspect of the invention, output data from one camera in the pair is scaled to align with the resolution of output data from the other camera in the pair.

In another aspect, the selected configuration comprises at least two pairs of cameras, each camera pair having a camera pair baseline, and each camera having horizontal and vertical axes, and further wherein for at least one camera pair, the camera pair baseline is not aligned with either the horizontal or vertical axis of a given camera of the pair.

In another aspect of the invention, output data from at least one camera in the camera pair is rotated to generate disparity values.

In another aspect, each camera pair has an epipolar line between cameras in the pair, and wherein disparity values are generated in a manner so as to account for the slope of the epipolar line between cameras in the pair.

In yet another aspect, in the selected configuration, all cameras share the same epipolar plane. In another aspect of the invention, all cameras have the same physical resolution, and the baseline length for each camera pair is the same.

In a further aspect of the invention, disparity values generated for any of the camera pairs are indicative of a distance between a scene feature and the array of cameras, and further comprising: computationally selecting, from among disparity values generated for any of the camera pairs, the most reliable disparity value.

In still another aspect, the selected configuration is octagonal, all cameras share the same epipolar plane, and all cameras have the same physical resolution.

Another aspect of the invention comprises generating an enhanced disparity map expander kernel to account for the baseline orientation of an octagonal configuration by incorporating a 2D line algorithm.

In another aspect, the 2D line algorithm is Bresenham's line algorithm.

Another aspect of the invention comprises computationally rotating camera output buffers to facilitate application of a disparity map expander kernel that operates in a standard cardinal orientation.

In another aspect, the configuration comprises a set of primary cameras, and a set of secondary cameras, wherein a given primary camera is paired with a secondary camera, and wherein a given primary camera is also paired with at least one other primary camera.

In another aspect of the invention, a given secondary camera has a lower physical resolution than that of the primary camera with which it is paired.

In another aspect, the secondary cameras are utilized to generate disparity values and not RGB image data.

In still another aspect of the invention, a pixel disparity computed for an image feature with respect to a given camera pair is normalized so that disparity information can be used across camera pairs.

In another aspect of the invention, disparity values are normalized with respect to the length of a given camera pair's epipolar line or baseline.

In a further aspect, the camera array configuration is substantially rectilinear.

In another aspect of the invention, the camera array configuration is substantially square.

In another aspect, the camera array configuration is non-rectilinear.

One aspect of the present invention relates to methods, systems and computer software/program code products for generating an output, expanded disparity map from an input, native disparity map, the input, native disparity map containing input disparity values representative of a solution to the stereo correspondence problem between at least one pair of physical cameras in a shared epipolar plane. This aspect comprises: reading input disparity values from the input, native disparity map; computing a displacement value, based on a virtual camera position in the epipolar plane; and shifting disparity values read from the input disparity map into an output disparity map, the disparity values being Shifted by an amount computed, by a digital processor, as a function of the disparity value and the virtual camera position; thereby executing an expansion and generating an output, expanded disparity map.

One aspect of the present invention relates to methods, systems and computer software/program code products for determining stereo correspondence between first and second input images, each input image having a corresponding perspective. This aspect comprises: computationally selecting, in a first input image, a feature comprising one or more image pixels; computationally searching, in a second input image, for a correspondence to the feature; computing at least one disparity value for the feature, based on differences between the corresponding perspectives of the first and second input images; and shifting disparity values by an amount based on (a) the magnitude of the disparity values and (b) separation between the corresponding perspectives of the first and second input images.

One aspect of the present invention relates to ray-tracing methods, systems and computer software/program code products for reconstruction of synthetic images of a physical scene from the perspective of a virtual camera having a selected virtual camera position, based on images of the scene captured by at least two physical cameras, each having a respective physical camera view of the scene. This aspect comprises: using a digital processing element to read a disparity map for at least one of the physical cameras, the disparity map containing disparity values stored therein, the disparity map representing a computational solution to the stereo correspondence problem between at least two cameras in a shared epipolar plane; using a digital processing element to read calibration data representative of camera's respective configuration and representative of at least one epipolar plane configuration shared among cameras, wherein an epipolar plane is shared between at least two cameras, and utilizing, as an input, the calibration data for at least one camera for which a disparity map is readable, computationally projecting the disparity map for the at least one camera into a selected world space to generate a scene representation, the scene representation comprising a Plurality of rectangles, the plurality of rectangles comprising one rectangle per each pixel in the disparity map, wherein a given rectangle is at a selected distance from the center of projection of the respective camera along its principal ray based on the associated disparity, with a selected size equivalent to that of the pixel projected onto a plane at the respective selected distance, such that, projected back onto the camera's view plane, the plurality of rectangles represents a rendering of the disparity map used to create the rectangles.

One aspect of the present invention relates to ray-tracing methods, systems and computer software/program code products for generating a synthetic, reconstructed image of a physical scene from the perspective of a virtual camera. This aspect comprises: receiving (1) a set of source images of the scene captured by at least two physical cameras each having a physical view of the scene, each image comprising a set of pixels, and each physical camera having associated frustum planes, including defined near and far planes, (2) disparity maps corresponding to the images captured by the at least two physical cameras, and (3) calibration data representative of (i) each of the physical cameras from which the images originate and (ii) a selected virtual camera configuration; for a given image pixel, generating at least one ray based on the virtual camera configuration represented by the calibration data; computationally intersecting the ray with the frustum planes of the physical cameras, including the defined near and far planes, to establish a selected segment of the ray to be traced against each of the disparity maps; computationally projecting the parametric intersections of the ray onto the camera image planes to establish start and end positions for 2D line traces through the disparity maps and associated distance function parameters; iteratively stepping through the disparity maps and executing a ray-tracing operation, each ray-tracing operation generating a depth value and a set of UV coordinates; merging the generated depth values and UV coordinates into a blend map, the blend map comprising a 2D array of elements containing UV coordinates, each element corresponding to at least one pixel in an output image; and utilizing the blend map to sample from at least one source image.

One aspect of the present invention relates to mesh-based methods, systems and computer software/program code products for reconstructing a synthetic image of a scene from the perspective of a virtual camera having a, selected virtual camera position, based on images of the scene captured by at least first and second physical cameras each having a respective physical view of the scene. This aspect comprises: reading a native disparity map for a first physical camera having a physical view of a scene, the disparity map containing disparity values stored therein, the disparity map representing computational solution to the stereo correspondence problem between at least two cameras in a shared epipolar plane; reading either a native disparity map or an expanded disparity map for a second physical camera having a physical view of the scene; and utilizing at least the native disparity map for the first camera, executing the following:

A. generating quad patch vertex values to form a vertex array, wherein generating quad patch vertex values comprises computationally generating a regular grid of vertices forming pairs of adjacent triangles that form, pair-wise, respective square quads, wherein each vertex has (a) an associated normalized coordinate within the disparity map for the first camera, and (b) a disparity value, wherein the disparity value can be used to re-project the respective vertex to a new location based on a selected projection function;

B. executing a selected transformation of the quad patch vertices;

C. generating per-fragment disparity reference values and UV coordinate values corresponding to the first camera;

D. generating UV coordinates for an image obtained by the second camera;

E. executing a weighted summation of samples from camera images captured by each of the first and second cameras; and F. generating an input to a rasterization depth test;

thereby projecting the disparity map from the first camera into another, selected projection for reconstruction of a synthetic image from the perspective of a virtual camera.

One aspect of the present invention relates to sample weighting methods, systems and computer software/program code products for reconstruction of synthetic images of a scene from the perspective of a virtual camera having a selected virtual camera position, based on images of the scene captured by at least two physical cameras, each having a respective physical camera view of the scene. This aspect comprises: receiving, as an input, a sample request into a set of respective camera images, ones of the sample requests comprising a UV coordinate into a respective camera image in Rectified, Undistorted (RUD) space and a weighting value; and generating color values defining a color to be displayed at a display device at a respective projected point of the display of the display device, as part of a reconstructed synthetic image drawn on the display of the display device, in accordance with a weighted summation of a plurality of camera image samples as defined by:

$$R = \sum_{i=0}^{n} W_i C_i,$$

where R is the reconstructed image color to be drawn at the projected coordinate of the display of the display device; a is the number of input source camera images being integrated; $W_i$ is the weight of the contribution from the given camera, given by a selected weighting function; and $C_i$ is a color sample from the given camera; and wherein $W_i$ is generated by executing a selected sample weighting function.

The invention enables the features described herein to be provided at reasonable computational cost, and in a manner easily accommodated within the digital processing capabilities and form factors of modern mobile devices such as tablets and smartphones, as well as the form factors of laptops, PCs, computer-driven televisions, computer-driven projector devices, and the like, does not dramatically alter the economics of building such devices, and is Viable within current or near-current communications network/connectivity architectures.

These and other aspects, examples, embodiments and practices of the invention, whether in the form of methods, devices, systems or computer software/program code products, will be discussed in greater detail below in the following Detailed Description of the Invention and in connection with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIGS. 16A-16C are diagrams illustrating exemplary portal configurations according to an aspect of the invention.

FIGS. 31-51 are flowcharts depicting exemplary methods in according with practices of the invention.

DETAILED DESCRIPTION OF THE INVENTION

Roadmap

The following detailed description of the invention is organized as follows:
1. Overview
2. Disparity Maps
3. Expanded Disparity Maps
4. Portal Projection
5. Ray-Tracing Projections of Disparity Maps
6. Mesh-Based Reconstruction/Rasterizing Projections of Disparity Maps
7. Sample Weighting
8. Digital Processing Environment in Which Invention Can Be Implemented
9. Conclusion Overview This provisional application describes methods, systems, and computer program code products (software) that enable reconstruction of synthetic images based on actual images captured by one or more physical cameras having a view of a scene, and in particular, adapted for use in connection with the virtual 3D (V3D) methods, systems and computer code products (software) described in co-pending, commonly owned PCT Applications PCT/US16123433 and PCT/US16/32213, each incorporated herein by reference as if set forth in their entireties herein, including all the text and drawings thereof, The reconstruction methods, systems and computer program code products (software) of the invention are variously referred to herein as "the reconstructor", "the reconstruction method", "the reconstruction system" and the like.

Exemplary practices of the present reconstruction invention can be implemented in a network connected system (for example, a telecommunications system), in which physical cameras having a view of a remote scene are connected with a remote display device having a display element, which configuration may be half-duplex or full-duplex, and in which, by way of example, and not by way of limitation.

Figure 1:
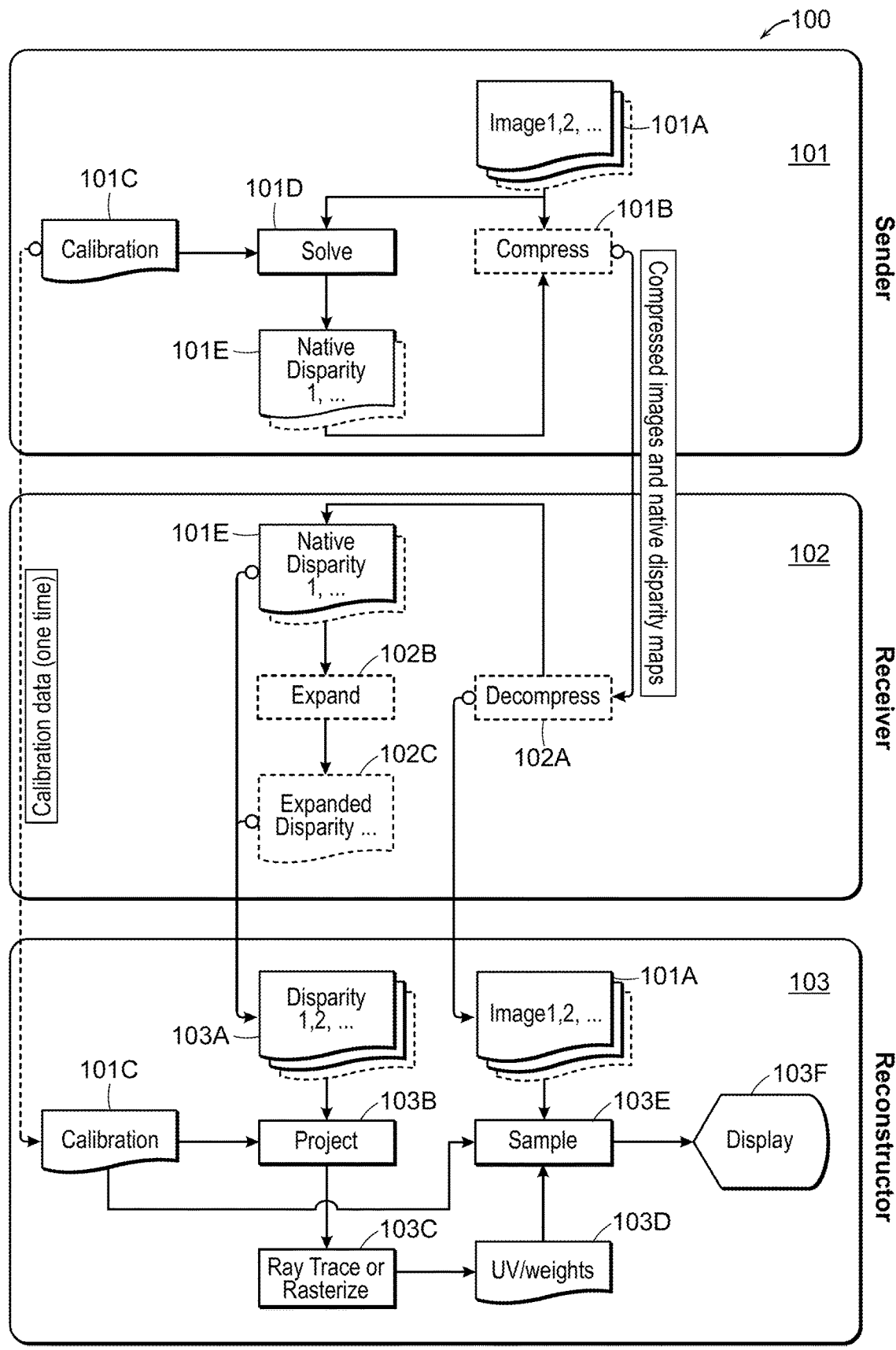
FIG. 1 is a functional diagram of a system according to an exemplary practice of the invention.

FIG. 1 is a functional diagram of a remote scene display system 100 according to an exemplary practice of the invention. System 100 comprises three stages: a sender stage 101 for assembling data with respect to a remote three-dimensional scene, a receiver stage 102 for receiving and processing the data assembled by the sender stage 101, and a reconstructor stage 103 for reconstructing and displaying the remote three-dimensional scene.

The sender 101:
1. Captures and sends two or more (optionally, color) camera images (101A). Optionally, the captured images may be compressed (101B).
2. Transmits calibration data 101C describing each camera's intrinsic/extrinsic configuration and the shared epipolar plane configuration, (in an exemplary practice of the invention, calibration data 101C is generated only one time for a given array of cameras.)
3. Solves (101D) the "stereo correspondence problem" in at least one epipolar plane with each plane including two or more camera pairs (where some cameras may be calibrated against multiple planes); and compresses and sends the resulting native disparity map(s) 101E (compression is optional).

It is noted that there is an effective constraint: each camera image 101A must originate from a camera that is calibrated against at least one epipolar plane for which at least one native disparity map 101E is produced.

The receiver 102:

1. Decompresses (102A) the (color) camera images (if previously compressed).

2. Decompresses (102A) the native disparity map(s) 101E.

3. Produces expanded disparity map(s) from native disparity map(s) in an associated shared epipolar plane for each camera for which a native disparity map is not available in any of the epipolar planes it is calibrated against. In other words: if a native disparity map is available for a camera in at least one of its associated epipolar planes that native disparity map is used, otherwise an expanded disparity map is produced by the reconstructor 103.

The reconstructor 103 uses the disparity data (native or expanded) 103A, and calibration data to generate projection data 103B that, as indicated by box 103C, either:

a. Rasterizes a mesh of projected polygons displaced by the disparity map from one of the cameras and the provided calibration data to produce camera image UV sample coordinates and sample weights to produce a reconstructed image from a virtual camera's perspective; OR b. Ray-traces into a set of projections of disparity maps based on the provided calibration data and produces camera image UV sample coordinates and sample weights to produce a reconstructed image from a virtual camera's perspective.

(Effective constraint: The reconstructor requires a disparity map (either native or expanded) per each camera image to be able to sample from that image. The reconstructor could potentially produce disparity values/UV fill-in values as part of the trace.)

As further discussed below, according to a further aspect of the invention, the output of box 103C is used in a UV/Weight process that is used, together with the image data 101A and the calibration data 101C, to generate a sample 103E that is then provided to display 103F.

Figure 2:
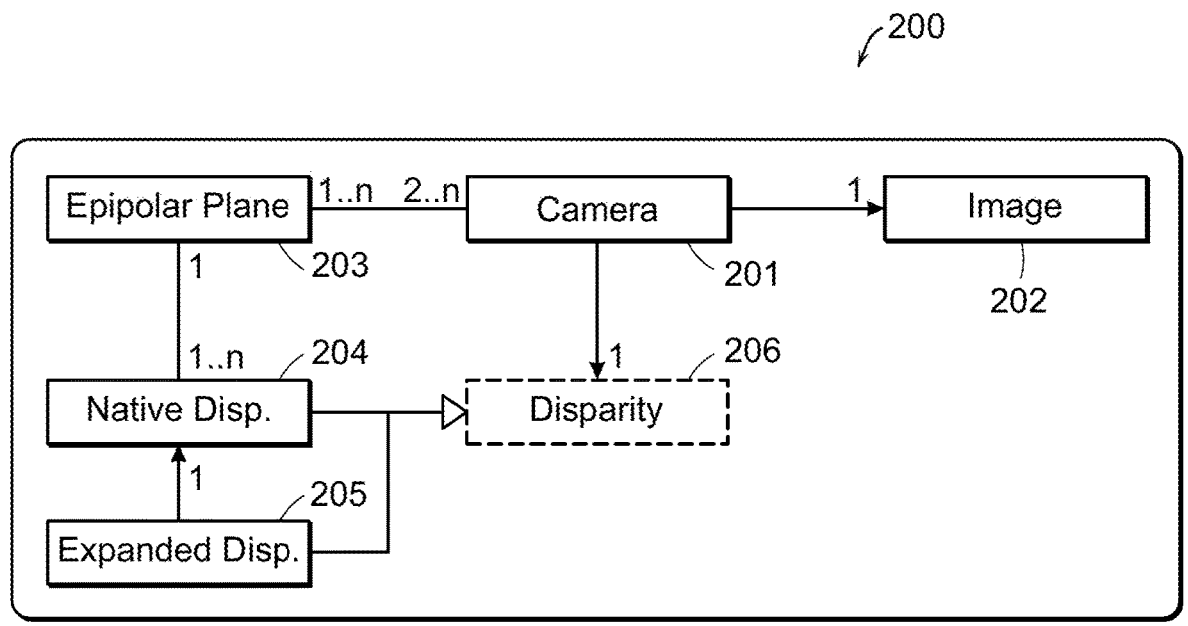
FIG. 2 is a functional diagram of a system according to an exemplary practice of the invention for the generation of disparity data.

FIG. 2 is a functional diagram of a system 200 according to an exemplary practice of the invention for the generation of disparity data. A camera 201 (i.e., one of a plurality of cameras) captures image data 202. The epipolar plane 203 is determined based on the respective positions and orientations of the plurality of cameras. The native disparity data 204 or the expanded disparity data 205 are then used to provide the disparity data 206 used to reconstruct the image, as described below.

The following sections describe methods, techniques, systems and computer program products (software) that execute aspects (3.) and (4.) noted above for the receiver.

Disparity Maps

This document uses the terms "Native Disparity Map," "Expanded Disparity Map" and "Fully-Expanded Disparity Map," as follows:

A "Native Disparity Map" is evaluated by solving the stereo-correspondence problem between at least two cameras in a shared epipolar plane using rectified images from those cameras. In accordance with an exemplary practice of the invention, disparity maps are stored in rectified space using the origin of the primary camera with each disparity value indicating the offset along the epipolar axis to the matching image feature in the opposing camera's image(s), i.e., the pixel offset the disparity represents is expressed in the same coordinate system as the map the values are stored in.

This document describes a disparity map as "dense" if it contains an amount of disparity data greater than a selected threshold, for a Oven plurality of corresponding two-dimensional images captured from a three-dimensional scene. A disparity map is said to be "sparse" if it contains an amount of disparity data less than a selected threshold. A dense disparity map may, for example, provide complete disparity data for a given plurality of corresponding two-dimensional images captured from a three-dimensional scene.)

An "Expanded Disparity Map" is derived from a native disparity maps using an expansion method.

A "Fully-Expanded Disparity Map" is an expanded disparity map that represents the perspective of an opposing camera. Expanding a disparity map to the position of an opposing camera is less computationally expensive than creating a native disparity map for the opposing camera's data.

These above-described aspects are depicted, by way of example, in FIGS. 1 and 2.

Expanded Disparity Maps

Figure 3:
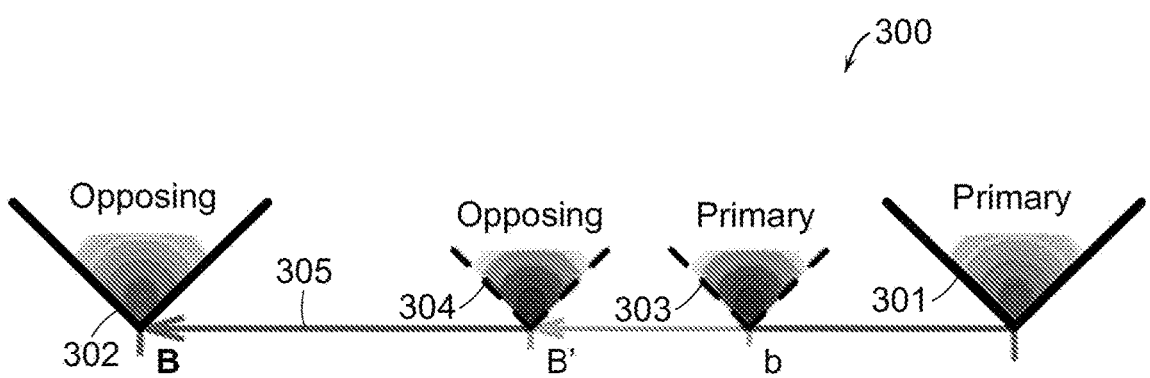
FIG. 3 is a diagram illustrating the generation of an expanded disparity map.

Introduction:

FIG. 3 is a diagram illustrating the generation of an expanded disparity map 300 according to an exemplary aspect of the invention.

This document uses the term "expanding a disparity map" to refer to the process of, in accordance with an exemplary practice of the invention, using the (native) disparity map evaluated for the primary camera of one stereo-pair 301 (primary) and 302 (opposing) to create an approximation of a disparity map that would have been evaluated for the primary camera of another virtual stereo-pair 303 (primary) and 304 (opposing) which shares the epipolar plane 305 of the original pair 301 and 302.

Expansion is an approximation in that we only consider the scene as seen by the original camera pair, rather than would have been evaluated for the actual images seen by the actual image pair. In the absence of those actual images, however, that limitation, and the approximation, is accepted.

These aspects are depicted in FIGS. 1 and 2, and discussed above.

The basic relationship between a stereo-pair, the scene observed, and the resulting disparity is given by the following expression:

$$d_{(u,v)} = \frac{f * B}{z_{(u,v)}}$$

where $f$ is the focal length of the cameras, B is the baseline of the stereo-pair, z is the distance of the scene element observed for a specific primary camera rectified image coordinate and d is the resulting disparity (coordinate delta) for that image coordinate.

Solving the stereo-correspondence problem means measuring d, for each rectified image coordinate, from the images obtained from as stereo-pair instead of having direct knowledge of the associated z value. The relationship is useful, as we know $f$ to be constant for each rectified image in the epipolar plane, and z to be constant for each primary camera rectified image coordinate.

Thus, a change in baseline will simply result in a linear scale on the disparity values. Similarly, a change in primary camera position results in each value in the map being offset by a fraction of its own value along the epipolar axis.

That fraction is t=B/b, where B is the baseline of the original stereo-pair and b is the position along the baseline, 1.0 for the opposing camera in a pair producing what we call a fully-expanded disparity map.

Figure 4:
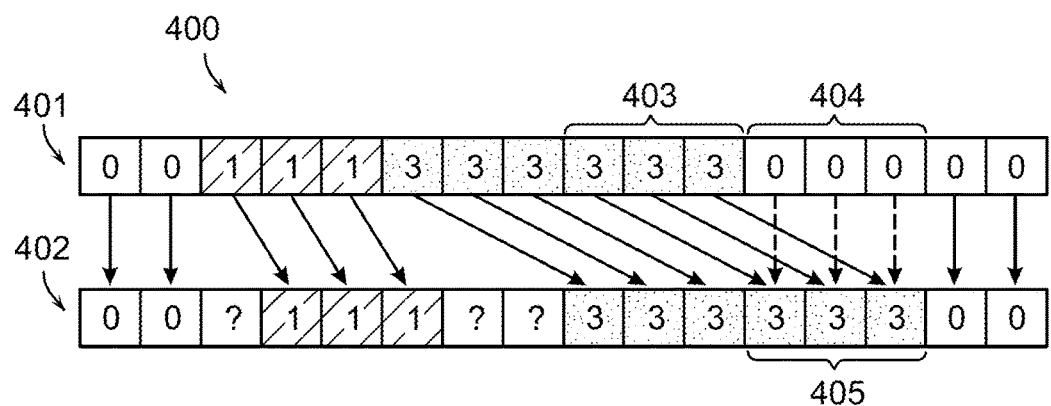
FIG. 4 depicts a (full/sparse) trivial expansion of a single row of disparity values into a corresponding single row of expanded disparity values in accordance with an exemplary practice of the invention.

FIG. 4 depicts a (full/sparse) trivial expansion 400 of a single row of disparity values 401 into a corresponding single row of expanded disparity values 402, in accordance with an exemplary practice of the invention. Each individual disparity value is offset (i.e., shifted horizontally to the right in the example of FIG. 4) by its own value, and where multiple values compete for the same target location, the higher disparity values take priority. By way of example, the values in cell groups 403 and 404 in the upper row 401 are competing for the same group of cells 405 in the lower row 402. According to the invention, lower cells 405 are populated with the higher value, i.e., "3."

More particularly, FIG. 4 shows a single row expanded for a virtual stereo pair of the original baseline, with the primacy camera located at the position of the original opposing camera (a value of 1.0 for the above-mentioned fraction). This is also referred to herein as a fully-expanded map.

Figure 5:
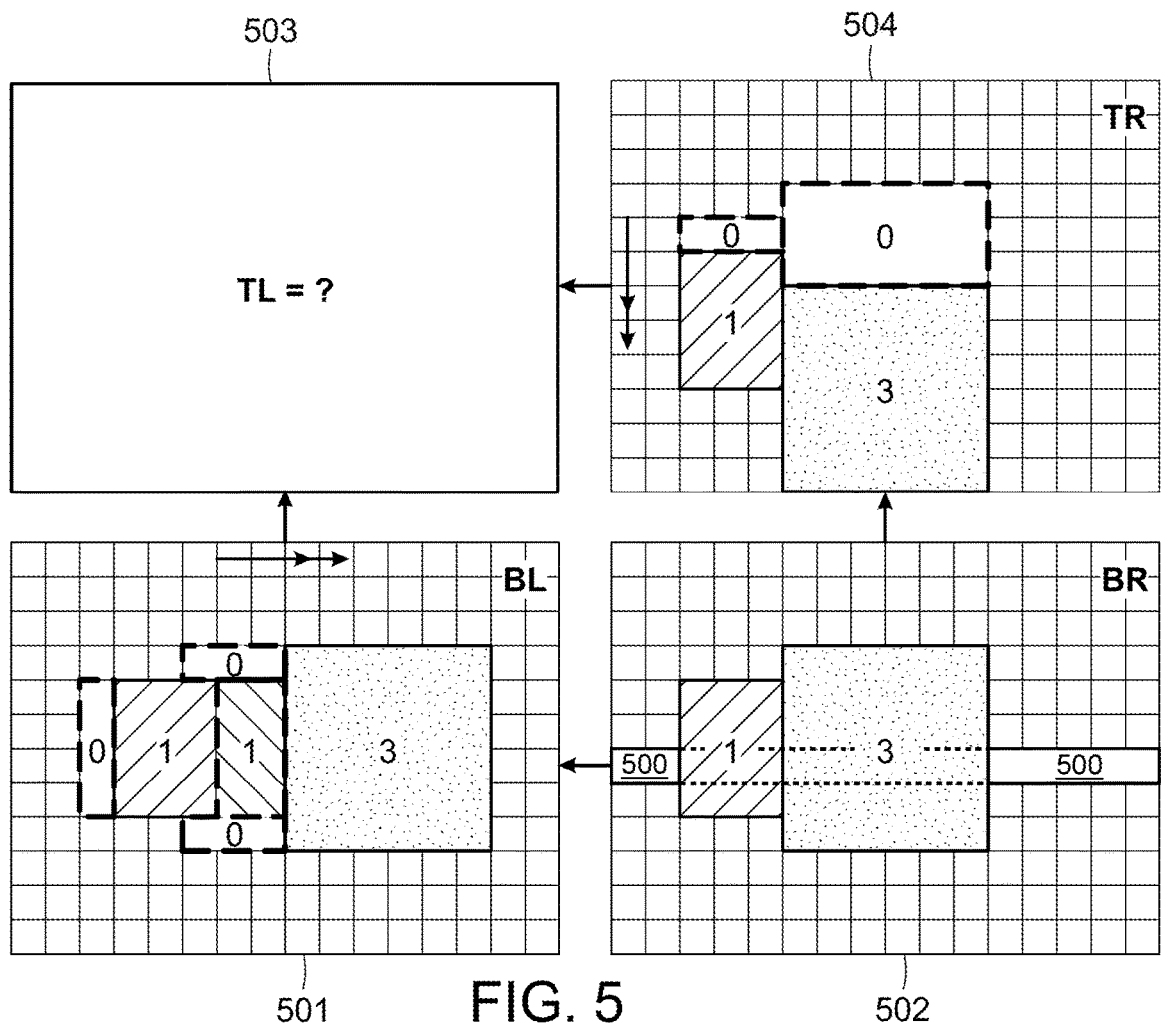
FIG. 5 shows an example, in accordance with the invention, of fully-expanded disparity data along both axes of a four-camera rectangle configuration.

Next, FIG. 5 shows an example, in accordance with the invention, of fully-expanded disparity maps along both axes of a four-camera rectangle configuration, in which the cameras are referred to as Bottom Left (BL) 501, Bottom Right (BR) 502, Top Left (TL) 503 and Top Right (TR) 504.

In FIG. 5, the BR disparity map 502 is a native disparity map, as defined above, and is used to derive expanded disparity maps for cameras BL and TR. The BR disparity map 502 comprises a first block of disparity values having a value of "1" and a second set of disparity values having a value of "3" located along a two-dimensional array. The row marked by numeral 500 is used for a number of the single-row examples discussed in this document. The expansion process can be repeated on a second (optionally orthogonal) axis to produce a disparity map from the perspective of a virtual camera that is displaced both horizontally and vertically.

The BL and TR (dense) fully-expanded disparity maps 501, 504 are derived from the BR native disparity map 502 using, for example, a fill-in algorithm in accordance with the invention. Fill-in algorithms in accordance with the invention are discussed below.

As shown in FIG. 5, derivation of the BL disparity map from the BR disparity map results in a rightward shift of the disparity values along the x-axis. As also shown in the example of FIG. 5, the "1" disparity values are shifted to the right by one cell. The "3" disparity values are shifted horizontally to the right by three cells. Derivation of the TR disparity map from the BR disparity map results in a vertically upward shift of the disparity values along the y-axis. The "1" disparity values are shifted upward by one cell. The "3" disparity values are shifted upward by three cells. In the depicted practice of the invention, the resulting gap between the "1" disparity values and the "3" disparity values are filled in with "1" values.

In both the BL and TR disparity maps, the shifting of the "1" disparity values by one cell and the shifting of the "3" disparity values by three cells results in a gap that is populated with "1" values. The "0" value blocks, outlined using broken lines, indicate those portions of the disparity map that are vacated by the shilling of the "1" and "3" disparity values. In the depicted practice of the invention, the vacated cells are filled in with "0" values.

Figure 6:
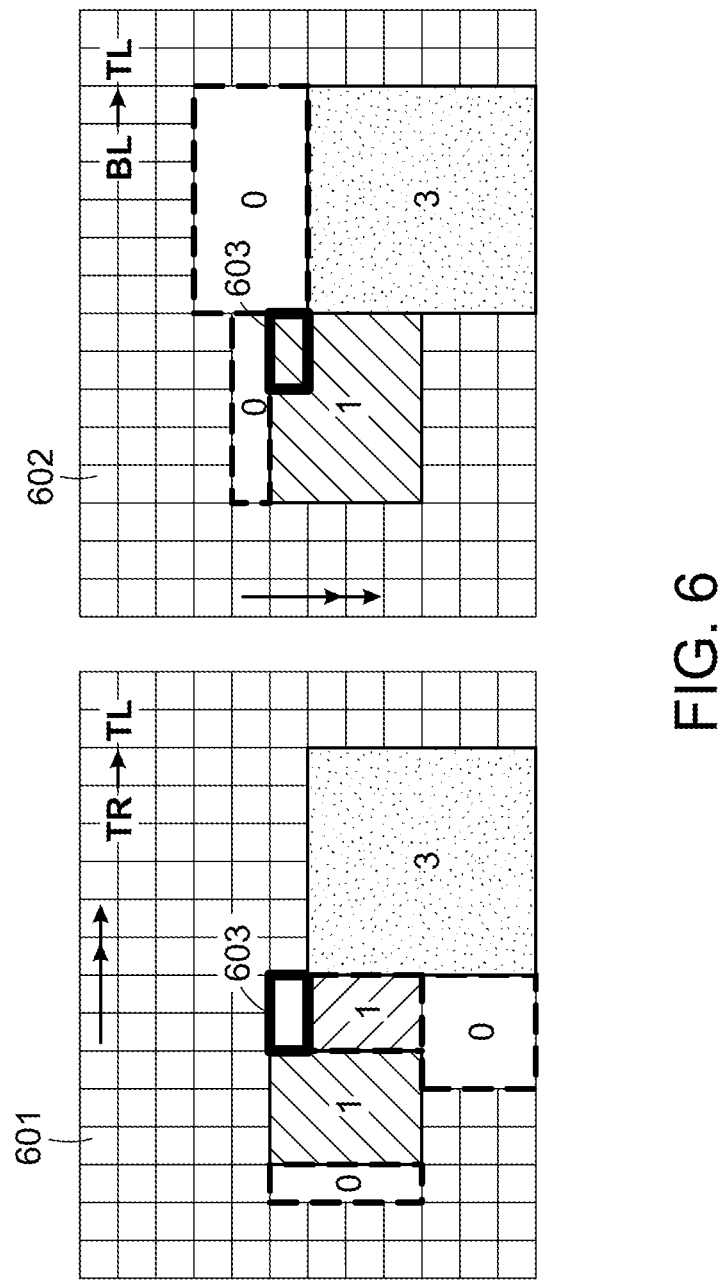
FIG. 6 is a diagram illustrating how an expanded disparity map for the top-left camera in FIG. 5 can be derived either by expanding the top-right disparity map or bottom-left disparity map.

FIG. 6 is a diagram illustrating how an expanded disparity map for the TL camera can be derived, in accordance with an exemplary practice of the invention, either by expanding the TR disparity map 601 or the BL disparity map 602. The TR-to-TL expansion 601 is shown at the left side of FIG. 6. The BL-to-TL expansion 602 is shown at the right side. The order of processing of the two axes may be significant when using filled in values to produce a dense map. In particular, FIG. 6 shows a (dense) fully-expanded disparity map derived from both the TR and fully-expanded disparity maps using a simple fill-in algorithm. As shown, each path results in a slightly different result, as highlighted by block 603.

Problem (and Solutions Provided by the Invention)

While producing one type of sparse disparity map (as shown, for example in FIG. 4) is relatively simple, there is, in the general case, insufficient information contained in the source map to deterministically derive a dense target map. Essentially, the mapping between source and target disparity map is not bijective, such that:

(a) Multiple source disparity values may map to a single destination map location, (b) Some destination map location may have no corresponding value in the source map.

As indicated by block 401 in FIG. 4, issue (a) can be resolved by simply selecting the largest disparity (closest distance to camera) value. As indicated by block 402 in FIG. 4, the resolution of issue (b) is FIG. 4 is far less obvious: disparity values are filled in based on a strategy optimizing for the specific use-case or implementation.

In addition, when expanding to an arbitrary position somewhere between the physical camera positions, fractional disparity displacements must be handled correctly. For example, if the virtual camera is placed halfway between the corresponding two physical cameras, a disparity value of 3 would need to be displaced by 1.5 pixels, but this is typically not actually possible (see, e.g., FIG. 5), and thus, in accordance with the invention, rounded offsets are used.

By way of example, FIG. 5 depicts fractional expansion 500, in accordance with the invention, with a factor of 0.5. The boxed regions 501 and 502 show the fractional positions. The values of each cell in the array indicated the actual offsets, after being rounded down.

FIG. 6 depicts fractional expansion 600, in accordance with the invention, with a factor of 0.75 The highlighted regions show the fractional offsets the graphic underneath the actual rounded (down) offsets.

Disparity Expansion Goals and Solution(s)

In handling expansion aspects, principal goals of an exemplary practice of the invention are to provide high performance and to minimize visual discontinuities.

In providing solutions in this regard in accordance with the invention, a number of assertions and assumptions are made, as follows:

1. The source map is dense and accurate. (In practice, the dense source map will already contain filled-in disparity values, as the solver does itself not directly produce a dense map; and in practice, the solver process will contain some degree of inaccuracy, based on a variety of parameters.)

Figure 7:
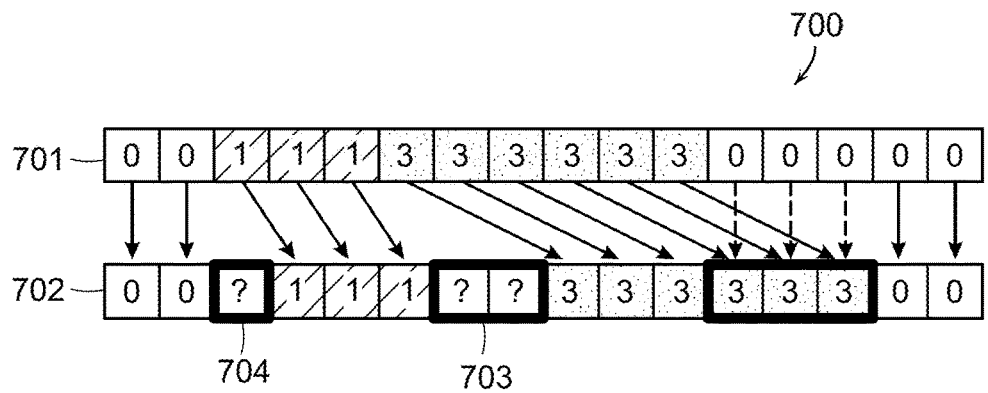
FIG. 7 is an example of disparity data having a potential positive disparity discontinuity along the direction of expansion, in which a portion of the background has been revealed.

2. FIG. 7 is a diagram of a disparity map expansion 700, in which a single row of disparity data 701 is expanded, resulting in expanded disparity map data 702, Blocks 703

(populated with question marks) illustrate that is possible to have a positive disparity discontinuity along the direction of expansion, such as going from 1 to 3, which would mean that a portion of the background has been revealed. Block 704 illustrates that a discontinuity also arises going from 0 to 1. Any disparity value filled into the gap produced in the target map, if that coordinate does not map to another disparity value in the source map, must be equal to or smaller than the larger value to either side of the disparity discontinuity. Thus, block 703 must be, populated either with "1" values (equal to the value immediately to the left) or "3" values (equal to the value immediately to the right). Block 703 must be populated either with "0" values (equal to the value immediately to the left) or "1" values (equal to the value immediately to the right).

3. In addition, it is possible to establish a lower bound for such values so as to minimize visual discontinuities. As visual integrity is best maintained by continuous UV velocity in the camera image space, this means continuing the disparity value (and optionally gradient) from the smaller value of either side of the disparity discontinuity is best.

4. Values generated for gaps are given lower priority than are directly mapped values (i.e., knowing beats guessing).

5. Small disparity discontinuities are considered to represent connected objects; i.e., large discontinuities are considered to reveal background while small discontinuities are attributed to the quantized nature of the disparity map and are assumed to approach zero at infinite resolution.

Figure 8:
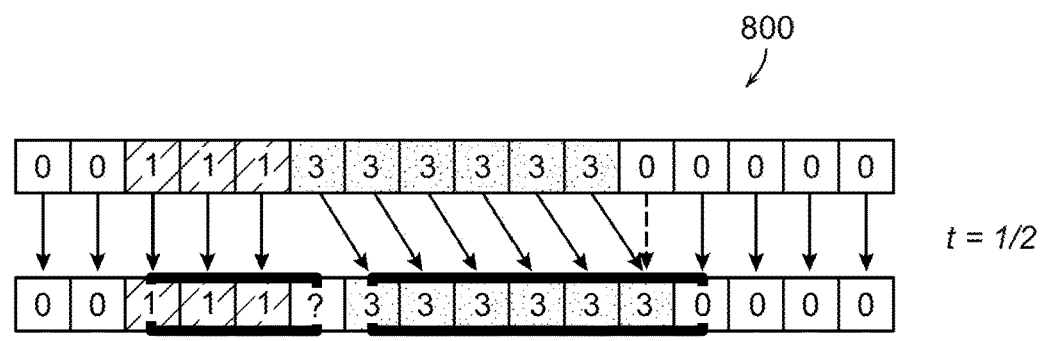
FIGS. 8 and 9 are disparity data illustrating the rounding of fractional positions down to the nearest integer.
Figure 9:
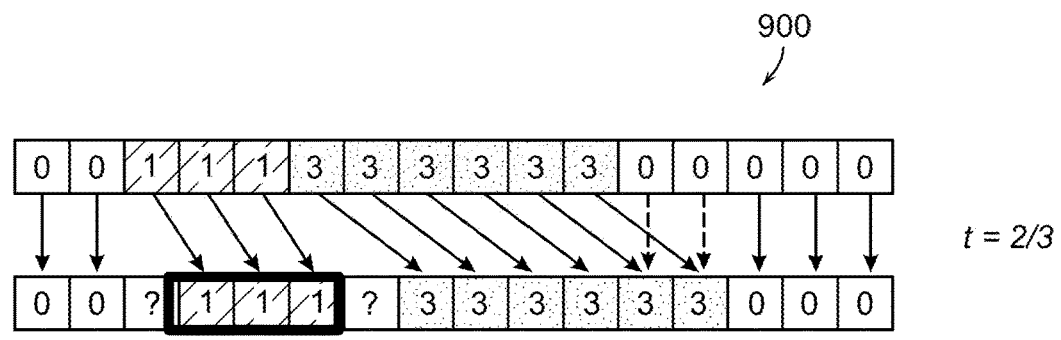

Exemplary Expansion Method:

In an exemplary practice of the invention, expansion proceeds as follows:

As the process (and the associated digital processing resource) iterates and scans through the input disparity map, each input value is written to the output map as a final value at a location displaced from its source location by its own value multiplied by the fractional virtual camera position along the epipolar axis. Fractional positions are rounded down to the nearest integer. FIG. 8 is a diagram of a disparity data expansion 800, in which the virtual camera position has a fractional value of ½. FIG. 9 is a diagram of a disparity data expansion 900, in which the virtual camera position has a fractional value of ⅔.

Whenever a positive disparity discontinuity is discovered, for example, if the next disparity value along the epipolar line is larger than the previous one, a gap would usually occur in the output disparity map. The process fills that gap with values of the smaller disparity on either side of the discontinuity.

Figure 10:
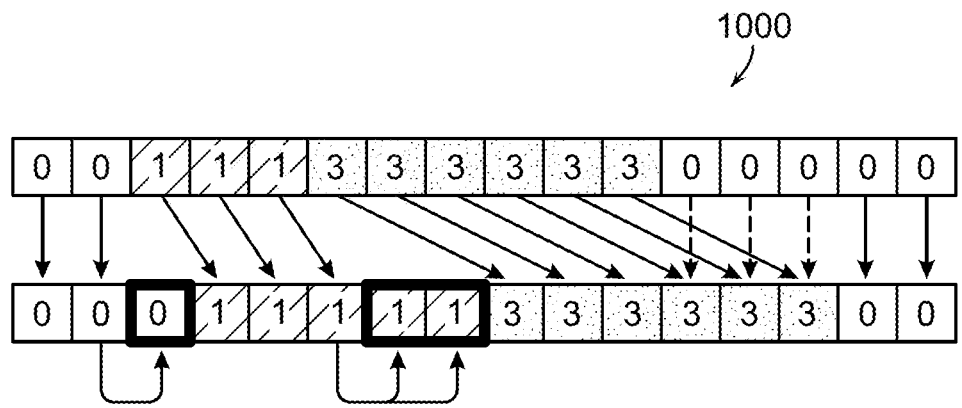
FIG. 10 shows an exemplary expansion, in accordance with the invention, of gaps filled in with "background" values.

FIG. 10 shows an exemplary expansion 1000, in accordance with the invention, of gaps filled in with "background" values. Writing a value to the output map in this example means to max-reduce the value into the map, with non-final values being replaced by final values, irrespective of disparity value.

Figure 11:
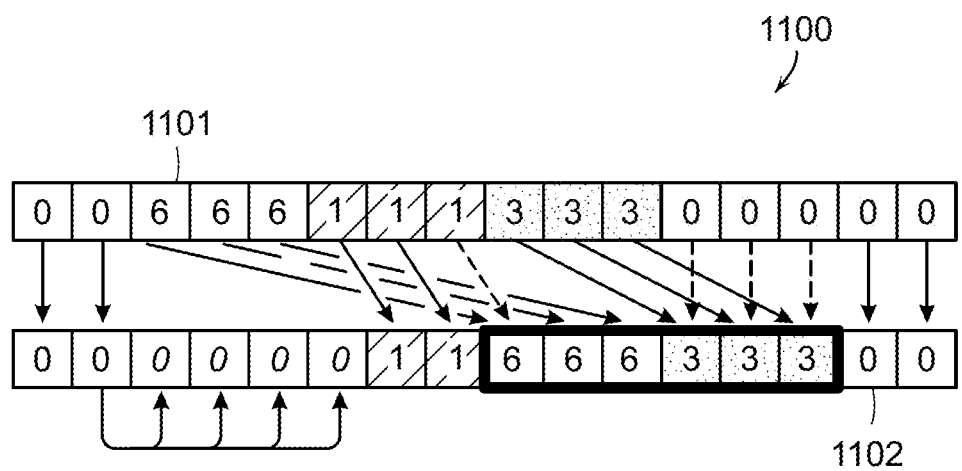
FIG. 11 shows an exemplary expansion, in accordance with the invention, of values max-reduced into the output map.

FIG. 11 shows an exemplary expansion 1100, in accordance with the invention, of values max-reduced into the output map. In the bolded region, a value of 6 "wins" over 1, and 3 wins over 0 (zero). In addition, the final values of 6 would win over the non-final filled-in 1's, irrespective of value.

If the delta of the discontinuity is smaller than a certain threshold, indicating a continuous surface, final values (i.e., values designated as final) are written; otherwise, as the process is essentially making an educated guess with regards to the actual background disparity, non-final values are written.

Figure 12:
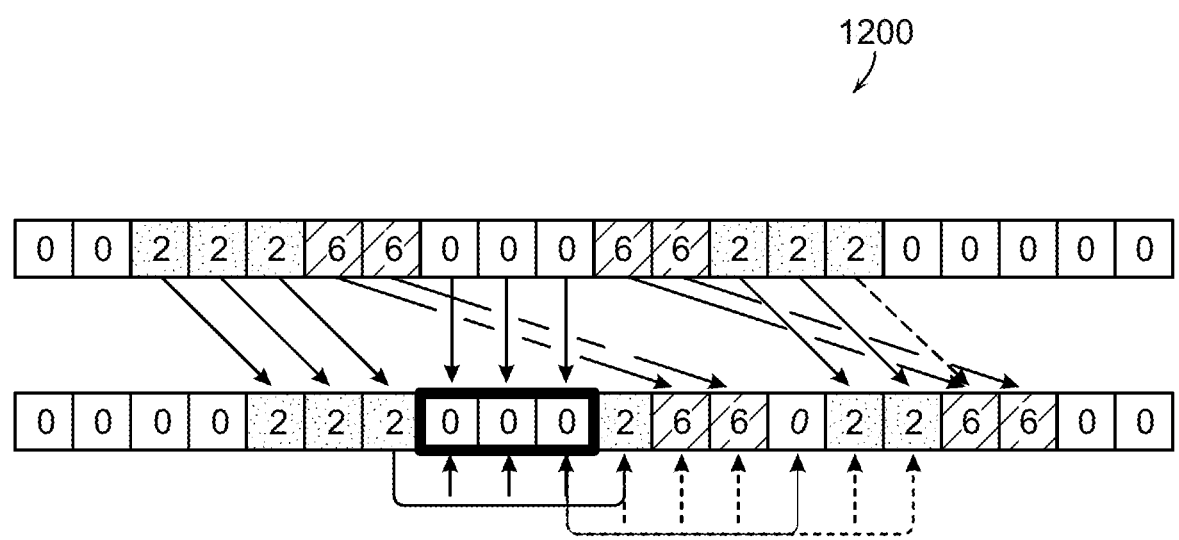
FIG. 12 depicts an example, in accordance with the invention, of final values overriding non-final values irrespective of value. In the highlighted regions, the non-final, filled-in 2's are overwritten by the smaller, but final, 0's (zeroes).

FIG. 12 depicts an example of a disparity data expansion 1200, in accordance with the invention, of final values overriding non-final values irrespective of value. In the highlighted regions, the non-final, filled-in 2's are overwritten by the smaller, but final, 0's (zeroes).

The threshold value determines what the expansion algorithm considers to be a continuous vs. a discontinuous surface. This is value can be a constant established based on the properties of the system, e.g. the separation between cameras, the pixel resolution, and other factors. It can also be adjusted by a process external to the expansion.

Figure 13:
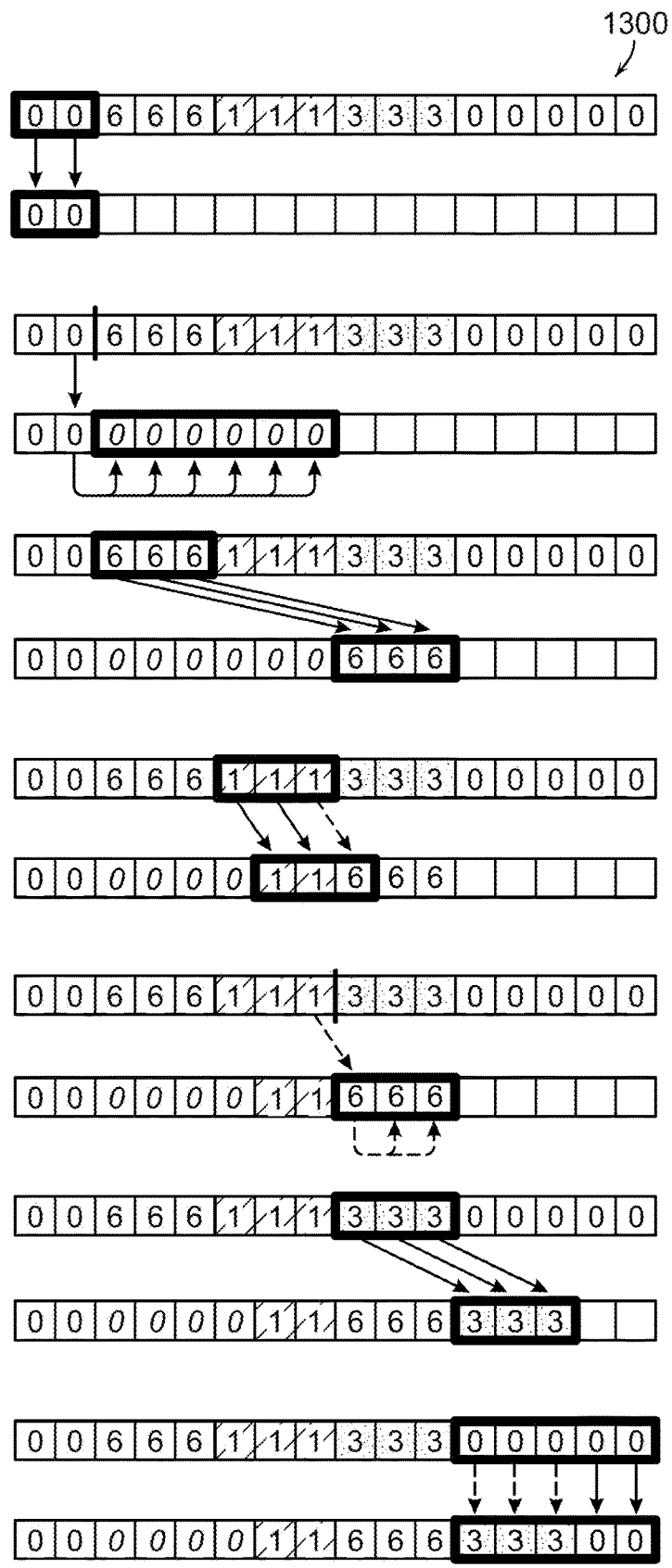
FIG. 13 is a diagram providing a step-by-step illustration of an exemplary expansion method in accordance with the invention.

These aspects are further illustrated in FIG. 13, which is a step-by-step illustration of an exemplary expansion 1300 in accordance with the invention. In particular, the example depicted in FIG. 13 expands the input values 1101 set forth in the top row of FIG. 11 into the output values 1102 set forth in the bottom row of FIG. 11.

Expansion Masking:

Another exemplary aspect of the invention is referred to herein as expansion masking. In accordance with this aspect of the invention, the disparity map values are shifted with regard to the virtual camera position as described above. However, instead of relying on assumptions to fill in the unknown disparity values revealed by a change in perspective, the method, system or computer program code (software) product executing a method in accordance with the invention attempts to identify stereo correspondence between the revealed region and data from an additional camera sharing the same epipolar plane. An exemplary practice of the invention implements the expansion masking aspect as follows:

Input to the method is a dense disparity map and virtual camera position given as a fractional position between the physical camera positions.

Output of the method is a dense disparity map, optionally with overrun equivalent to the maximum valid disparity value at (e.g.) the right/bottom, capturing values displaced beyond the domain of the input map.

Each scanline (rove or column), equivalent to stepping along one of the epipolar axis, is processed independently. For the CPU implementation each scanline is processed by a single thread of execution, with each thread naming a state-based loop (to maximize thread coherency) producing one output value per iteration (though the output value may be discarded if a higher priority value already exists at the target location).

The method or system assumes that the input disparity map is native to a camera at virtual camera position (0.0, 0.0). In one exemplary practice, which employs 4 physical cameras arrayed in a substantially rectangular configuration, the bottom-right camera is designated to be at virtual camera position (0.0, 0.0), the bottom-left camera at position (1.0, 0.0), the top-right camera at position (0.0, 1.0) and the top-left camera at position (1.0, 1.0).

In an exemplary practice attic invention, the state for each loop consists of the following:

1. An input iterator tracking the location where input disparity values are read from the input map. This Aerator monotonically increases (incl. +0) as the loop progresses.

2. An output iterator tracking the location where output disparity values are written to the output map. This iterator may increase or decrease (values are max-reduced into the output map) in value as the loop progresses. By taking the larger of the values between the existing value in the output map and the value being written, the effect is to give foreground objects with larger disparity values higher priority over background objects with smaller values.

3. The input disparity value from the previous iteration, which is used to identify positive/negative disparity discontinuities.

4. A skip value tracking how many output values must be filled in for positive disparity discontinuities in the output map.

5. A skip accumulator used for correctly handling fractional disparities.

6. Optionally, if a blend map is produced along with the output disparity map, the current blend value for each camera. (Blend maps, in accordance with exemplary practices of the invention, are discussed in greater detail below.)

The initial state is:

1. The input iterator is zero—pointing to the first value in the input scanline.

2. The output iterator is zero—pointing to the first value in the output scanline.

3. The previous disparity value is set from the input map scanline at index zero. This ensures that a sensible value, considering the goal for UV velocity consistency, is available to be filled in if that disparity value is non-zero.

4. The skip value is zero, indicating no disparity discontinuities have occurred yet.

5. The skip accumulator is zero, indicating no disparity discontinuities have occurred yet.

6. The blend values are zero, however their initial value does not matter.

Additionally, the output disparity map must be initialized to zero. The disparity value encodes the actual disparity value (0 . . . 127, bits 0 . . . 6) as well as a "final value" bit (bit 7) into a single 8-bit value. The final value bit indicates if a value is guessed or known. This allows for efficient max-reduction into the output map.

In each loop iteration (excluding blend map generation):

1. If we are currently skipping over a positive disparity discontinuity (skip value>0):
    a. Decrease the skip value by one.
    b. Use previous disparity value, which represents the value read immediately before the disparity discontinuity occurred (i.e., the lower bound), as the current disparity value.

2. Otherwise (skip value<=0):
    a. (Re-)read the input disparity value at the input iterator position.
    b. Evaluate the actual disparity displacement by multiplying the disparity value with the fractional virtual camera position. For example, a disparity value of 3 for a virtual camera position halfway between two physical camera positions must be displaced by 3.0×0.5=1.5 pixels.
    c. Reduce the resulting fractional disparity displacement by the skip accumulator value to derive the effective disparity discontinuity taking into account any fractions that may have previously been rounded off.
    d. Round down the result and store it in the skip value.
    e. Accumulate the skip value into the skip accumulator.
    f. If a positive disparity discontinuity has been found (skip value>0):
        i. Decrease the skip value by one.
        ii. Use the previous disparity, which represents the value read immediately before the disparity discontinuity occurred (i.e., the sower bound), as the current disparity value.
        iii. If the disparity discontinuity (difference between current and previous disparity value) is less than a certain threshold set the final value bit in the current disparity value.
    g. Otherwise (skip value<=0):
        i. If the skip value is less than zero decrease the output aerator position by the skip value.
        ii. Use the input disparity from the current iteration as the current disparity value and set the final value bit.
        iii. Advance the input aerator by one position.
    h. Update the previous disparity value with the input disparity value read in this iteration.

3. Max-reduce, i.e. write the larger of the current disparity value and the value existing in the buffer, into the output map at the output Aerator position.

4. Increase the output iterator by one.

If a blend map is to be generated as well, assuming, for this example, the disparity map is native to the bottom-right (BR) camera in a 4-camera substantially rectangular camera array configuration, we can derive a mask for pixels from the left/top and right/bottom camera image as follows:

1. Pixels in the left/top image should be masked for disparity values that are at full expansion covered by another, greater, disparity value that is displaced to the same location. The mask applies independent of the actual virtual camera position to which a specific disparity map is expanded to. This is only relevant if the disparity map is the integration of multiple stereo axis (such as through a voting algorithm) as otherwise every pixel must have bad a corresponding pixel in the opposite image to even produce a valid disparity value, 2. Pixels in the right/bottom image are masked for all filled-in disparity values in the gaps produced by positive disparity discontinuities. Every other pixel in the right/bottom image is assumed to match with its native disparity value.

While disparity expansion can, be considered to be separable with respect to the two axes, even if the order of axis processing is significant, for blend map generation this is not the case for more than two camera images. However, for moving the camera along a single axis in the epipolar plane, with no change of the field of view, even if multiple axes were integrated to form the native disparity map, generating a blend map and disparity map for the virtual camera position in this way is very efficient.

Figure 14:
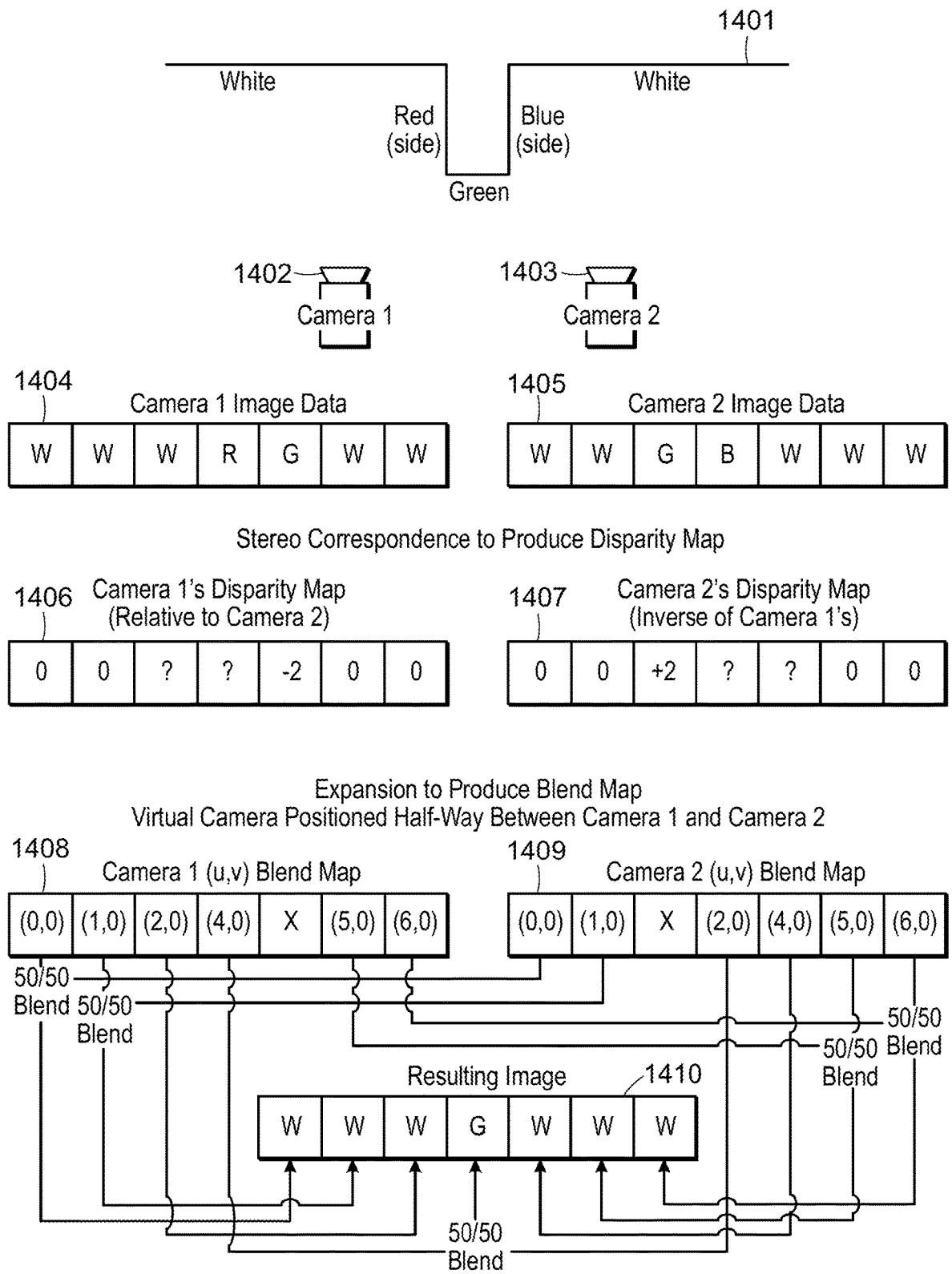
FIG. 14 depicts an exemplary practice of a blend map in accordance with an aspect of the invention.

Blend Maps:

FIG. 14 depicts an exemplary practice of a blend map technique in accordance with an aspect of the invention. The top of FIG. 14 shows a diagrammatic representation of a portion of an exemplary scene 1401 and first and second cameras 1402 and 1403 that capture respective image data 1404 and 1405. The images sourced from cameras 1403 and 1404 are rectified to the epipolar plane. (The technique may be practiced with more than two cameras.)

Stereo correspondence is used to produce respective first and second disparity maps 1406 and 1407. (Camera 1's disparity map 1406 is relative to Camera 2. Camera 2's disparity map 1407 is the inverse of Camera 1's disparity map. The disparity maps 1406 and 1407 are each expanded to produce respective blend maps 1408 and 1409. Each blend map comprises a two-dimensional array of elements, each element in each array comprising one or more UV coordinates corresponding to a group of one or more pixels in a resulting output image 1410. The group of pixels in the output image could be, by way of example, a single pixel, a 2×2 block composed of 4 pixels, a 3×3 block composed of 9 pixels, a 4×4 block composed of 16 pixels, or a contiguous group of pixels of another size or shape. In this example, the first UV coordinate of an element corresponds to a first image, the second UV coordinate corresponds to a different image, and subsequent UV coordinates correspond to further images.

In an exemplary practice, two UV coordinates correspond to two images, and the virtual camera perspective can be moved along an epipolar line connecting the perspectives of the images. Alternatively, three or more images can be used, and the relative proximity between the virtual camera perspective and the perspectives of the images is used in conjunction with the blend map.

The generating of an image from a virtual camera perspective can include adjusting UV coordinates, the coordinates adjusted by an amount computed as a function of a corresponding disparity value. The generating can also include indicating, with a mask indication, UV coordinates that are determined to map to features that are not visible in other input images. This determination can be informed by the status indicator from a disparity map.

In addition, the generating of an image from a virtual camera perspective can include, for each pixel in the image, reading at least one UV coordinate pair from a corresponding element in the blend map; scaling each UV coordinate based on the virtual camera perspective; sampling color information from one or more images sourced from one or more cameras; and blending the color information based on the virtual camera perspective.

Further, the mask indication can be used to cause the UV coordinate to be rejected such that the blending does not utilize information from the corresponding image.

The exemplary practice of the invention shown in FIG. 14 includes two cameras (Camera 1 and Camera 2) that generate respective image data based on their view of a scene in this example, a simple scene containing an object consisting of two white planar surfaces and a projecting feature having a green camera-facing surface and respective red and blue side surfaces. As indicated in FIG. 14, respective camera image data is processed by a stereo correspondence operation to generate respective disparity maps, wherein Camera 2's disparity map is the inverse of Camera 1's. An expansion operation is executed to produce a blend map, with the virtual camera positioned halfway between Camera 1 and Camera 2, as depicted in FIG. 14.

Portal Projection

Within the V3D system described in detail in PCT Applications PCT/US16/23433 and PCT/US16/32213 incorporated herein by reference, a significant application of the method, system, or computer program code (software) product is to provide, for a human user viewer, the visual impression that the display device they are using is a portal, or a pane of glass, that allows them to look "through" the portal into another space. A particular example allows the user to look through the portal with the visual impression of looking directly at a remote user, with natural-appearing eye contact, as would be useful in a video-call or videoconference, even if no physical camera has a direct eye contact line of sight to the remote user.

The image reconstruction techniques, methods, systems and computer code products (software) of the present invention enable the reconstruction of aa synthetic image and the drawing or rendering of the synthetic image onto the display element of a display device, such that it matches what would be seen in reality from that point of view or perspective.

This means that the position and field of view of the reconstructed image will be entirely different from those of the physical cameras that captured the remote scene.

The purpose of the projection function of the present invention is to transform a point in a disparity map generated from the remote cameras into a coordinate on the local user/viewer's display. Specifically, as inputs, the projection function takes a point in the remote disparity map ($P_{xy}$ and $\Delta$), a desired virtual camera origin ($V_{xyz}$), a display portal size ($D_{xy}$) and calibration information relating to the remote camera configuration ($C_{xy}$, $f$ and T).

The projection function is intended to used within the reconstruction pipeline of the invention, regardless of whether rasterized polygons or ray tracing is employed for the visibility calculation.

Projection Function Inputs:

$V_{xyz}$: Virtual camera origin location (mm, relative to camera square center, assuming, for this example, a square array).

$P_{xy}$: Coordinate in BR camera image (camera units).

$C_{xy}$: Principle'point of BR camera image (camera units).

$f$: Focal length of BR camera image (camera units).

$\Delta$: Disparity value (camera units).

T: Camera baseline (mm, cameras assumed, for purposes of this, example, to be arranged in a square array).

$D_{xy}$: Display size (mm, assumed centered relative to camera square center).

Note that while for purposes of simplicity in this example, we describe a substantially square array of physical cameras, it would be simple to extend this example, and, the formula set forth below, to operate with non-square arrays of cameras.

Projection Function Output:

N: Normalized device coordinate of point as projected onto the display.

Figure 15:
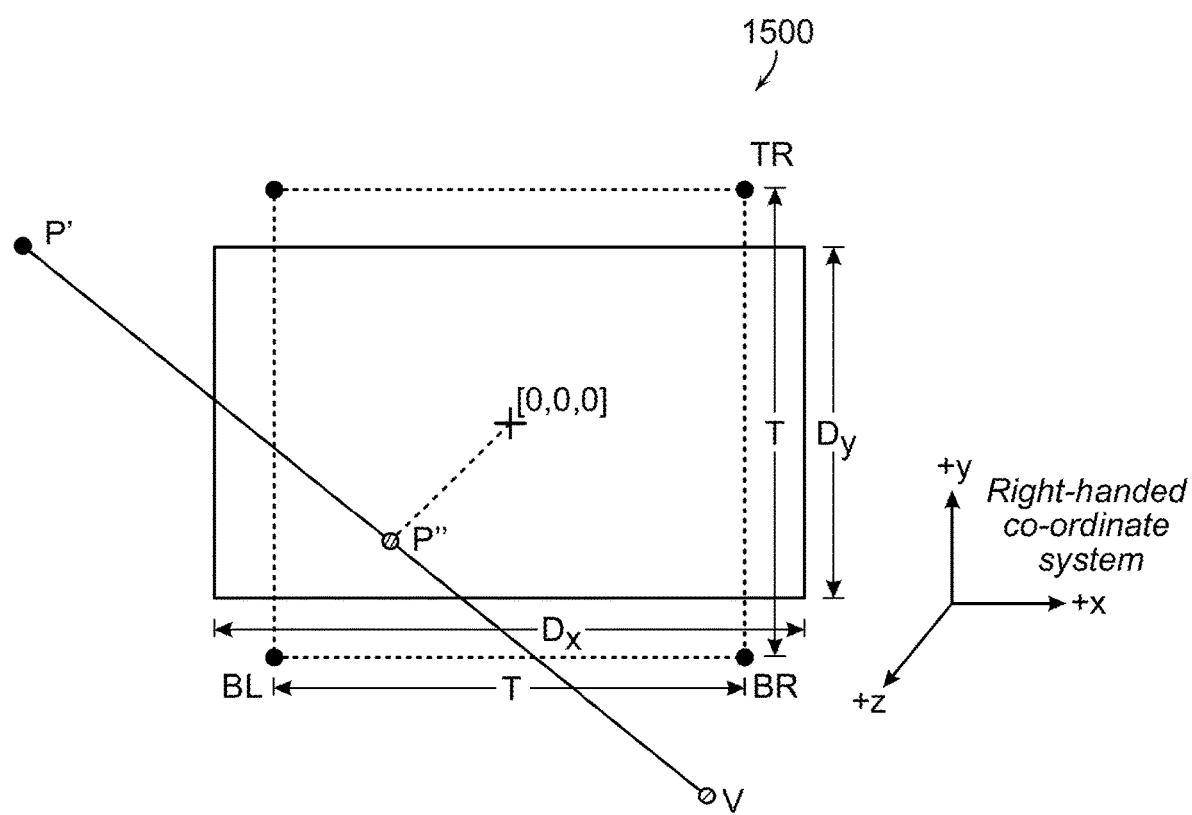
FIG. 15 illustrates a portal projection function in accordance with an exemplary practice of the invention.

Projection Function Illustration and Equations;

FIG. 15 illustrates a portal protection function 1500 in accordance with an exemplary practice of the invention. FIG. 15 depicts an example of a square array of physical cameras, including cameras designated Top Right (TR), Bottom Right (BR) and Bottom Left (BL) having a separation distance of T, and a camera square center depicted by a crosshair and denominated at position [0,0,0], and the exemplary rectangular display element having dimensions $D_Y$ and $D_X$; the portal projection function being given by the following equations:

3D coordinate of point in scene (P') (in mm, relative to camera square center);

$$P'_{xy} = \frac{T(P+C)}{\Delta} + \left[\frac{-T}{2}, \frac{T}{2}\right]$$

$$P'_z = \frac{Tf}{\Delta}$$

2D coordinate of point as projected on the camera baseline plane (P")(mm, relative to camera square center):

$$P'' = V_{xy} + \frac{V_z(V_{xy} - P'_{xy})}{P'_z - V_z}$$

Normalized device coordinate of point on the display (N);

$$N = \frac{2P''}{D}.$$

Variations on Portal Configurations and Processing

Portal Configurations:

Those skilled in the art will appreciate that a wide range of variations of portal/display device/camera array configurations can be utilized in connection with the present invention, and the above-described portal projection and expansion techniques utilized therewith.

By way of example, FIG. 16A shows a portal/display/camera configuration 1601 in accordance with the invention including 4 cameras arranged in a square configuration. In this example configuration, all cameras may share the same epipolar plane, and all cameras have the same physical resolution. The length of the baseline for each utilized camera pair is the same.

Also in this configuration, disparities observed in any of the utilized pairs are indicative of the distance between the portal and the observed feature, and the most reliable disparity value can be chosen.

FIG. 16B shows a portal/display/camera configuration 1602 in accordance with the invention including 8 cameras arranged octagonally. As in FIG. 16A, in this example configuration all camera may share the same epipolar plane, and all cameras have the same physical resolution.

While the length of the baseline for pairs 2-3, 4-5, 7-6, & 1-8 may be similar, the orientation of the baseline means that a stereo correspondence solver kernel or a disparity map expander kernel designed to operate predominantly in a cardinal direction will be insufficient.

The kernel can be enhanced to account for the difference by incorporating a 2-dimensional line algorithm, e.g. Bresenham's algorithm, or the camera output buffers can be rotated to facilitate the execution of a kernel that operates in a cardinal direction.

FIG. 16C shows a portal/display/camera configuration 1603 in accordance with the invention including 8 cameras including 4 major cameras and 4 minor cameras. As in FIGS. 16A and 16B, in this example configuration 1603 all camera may share the same epipolar plane. In this configuration the minor cameras have a lower resolution than the major cameras. In addition, the minor cameras may forego color information because their purpose is primarily disparity measurement and RGB (color) data from the minor cameras may go unused.

In this configuration, the pixel disparity computed for an image feature with respect to a given camera pair must be normalized so that disparity information is useable across camera pairs. For example, a camera with half the vertical and half the horizontal resolution effectively will report half the disparity, as counted in pixels. In addition, the disparity values must be normalized with respect to the length of the camera pair's epipolar line or the camera pair's baseline. Therefore, a camera pair whose separation baseline is one quarter the separation baseline of another camera pair will report one quarter the disparity of the second camera pair.

Variations on Processing:

A number of variations in the processing operations described herein are also possible. For example, the invention can be practiced without the requirement to generate and transmit calibration data. The invention can be practiced by transmitting lossless data from the cameras respective native image buffers, eliminating the need to generate and transmit native disparity maps.

The invention can be practiced in an asymmetric configuration, in which one side only transmits, and the other only receives. In this regard, the invention can be embodied in a transmit-only structure, or, alternatively, in a receive-only structure.

Still further, the invention can be practiced in a full-duplex configuration, with first and second digital processing resources corresponding to digital processing devices associated with respective first and second users, the devices being configured to communicate via a communications network to form a duplex configuration, wherein the various functions of the invention are executable by the first and second digital processing resources, or by other digital processing resources in communication with the first and second digital processing resources via the communications network.

The projection function can be executed at least in part in accordance with a tracked position of a user's eyes, face or head, which may be tracked by executing a tracking function. (Tracking functions are described in the above-listed, commonly-owned PCT applications incorporated herein by reference.)

In addition, executing a projection function may include a field of view calculation; and a face depth value, representing a distance between a respective user's face and a display device associated with the user, is calculated and utilized in the field of view calculation to enable a selected virtual camera perspective to be accurately displayed on the user's display device.

Images can be captured utilizing more than two cameras, wherein more than two cameras are calibrated to the same epipolar plane; and calibration data can be generated so as to distribute alignment error between cameras sharing an epipolar plane, or, more particular, to evenly distribute alignment error between all cameras sharing an epipolar plane.

The image capturing and generating aspects of the invention can be executed on one or more digital processing elements within one or more digital processing resources, where calibration data is generated during an initialization phase of the one or more digital processing elements. Alternatively, the calibration data can be generated during manufacture of one or more digital processing elements, or established prior to manufacture; or the calibration data could be received from a communications network in communication with the digital processing resource. As another alternative, the digital processing resource may have an associated digital store pre-loaded with the calibration data, without requiring the receiving of calibration data from a source external to the digital processing resource at runtime.

Other practices of the invention could include selecting at least two respective virtual camera positions, and generating a plurality of reconstructed images, including reconstructed images corresponding to the selected virtual camera positions. The virtual camera positions could correspond to respective right and left eye positions of a stereo display device, or respective inputs of a light field display device; and the display device can be part of a head mounted display (HMD) structure, The invention can also be practiced such that data capture is executed in at least one digital processing resource configured to transmit data, the generating of a synthetic image is executed in at least one digital processing resource configured to receive data, and a given receiving digital processing resource can select at least one virtual camera position.

Data compression techniques can also be selected, to include, among other possibilities, a discrete cosine transform. Lossless compression could also be used and, in particular, disparity maps could be losslessly compressed. Still further, multiple disparity maps can be encoded together, to reduce computational cost, and/or to improve compression efficiency.

Still other variations are possible, and within the scope of the invention. By way of example, the input disparity map can be rotated prior to reading of the map; and/or the output disparity map can be rotated subsequent to the expansion operation. In an exemplary practice, the rotation of the output disparity map is the inverse of the rotation of the input disparity map.

In an exemplary practice of the invention, the direction of execution is based on configuration information. In another, the direction of execution is determined by the spatial relationship between two or more cameras.

Where first and second expansion operations are executed, the generating of disparity values can occur after the shifting of disparity values for the second expansion. Generating disparity values can include selecting between candidate disparity values from the input disparity map.

As for expansion masking, this can include calculating disparity information from the results of the stereo correspondence identification; and outputting the resulting disparity information into the output disparity map.

Still further, an exemplary practice of the invention takes the form of determining stereo correspondence between images, by selecting, in a first input image, a feature comprising one or more pixels; searching, in a second input image, for a correspondence to the feature; computing one or more disparity values for the feature, based on the difference in perspective between the input images; and shifting the disparity values by an amount based on the magnitude of the disparity values and the separation between the perspectives of the first input image and the second input image. This could also include outputting discontinuity indications associated with pixels from which disparity values were shifted in the first map; or outputting discontinuity indications associated with pixels to which disparity values were shifted in the second map.

As a further variation, the discontinuity indications can be used in a subsequent stereo correspondence determination with a third input image; and/or considered when determining final disparity information between stereo correspondence determinations between two or more pairs of input images; and/or weighted and considered along side error information produced by the searching.

The invention can also include adjusting UV coordinates, where the coordinates are adjusted by an amount computed as a function of a corresponding disparity value and the virtual camera location. The process can also include blending the pixel information utilizing relative weights based on the virtual camera perspective, and the pixel information can include color information.

The invention can also include generating two or more intermediate expanded disparity maps, by executing an expansion wherein the virtual camera position is displaced along a vector, the vector being different for each intermediate expanded disparity map; and combining the intermediate expanded disparity maps to produce one or more output expanded disparity maps. The vectors along which the virtual camera position are displaced can be aligned with cardinal directions, e.g., x, y, z; and the combining can use status information pertaining to the elements in the intermediate expanded disparity maps.

Ray-Tracing Projections, of Disparity Maps

While disparity map expansion as described herein is useful for generating disparity maps for virtual camera perspectives that are constrained to the epipolar plane, it is less suitable for handling occlusion changes that occur when the virtual camera may move freely and projection occurs onto a virtual display, leading to varying fields of view, depending on the virtual camera position. This is where the ray-tracing methods of the present invention can be employed.

Figure 17:
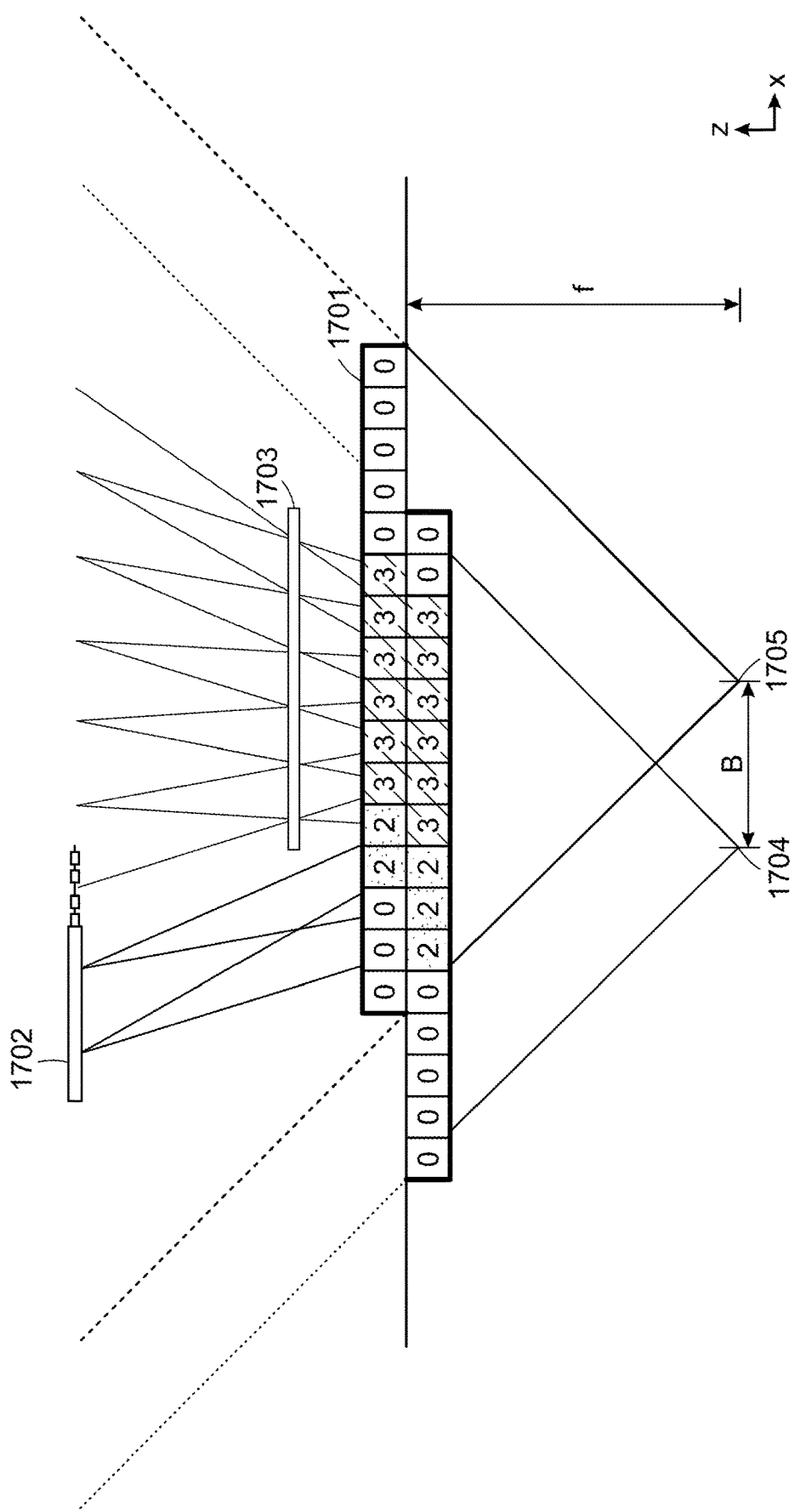
FIG. 17 is a diagram illustrating the projection of disparity maps in accordance with an aspect of the invention.

Projecting Disparity Maps:

Knowing the calibration data of the physical camera(s) for which there are either native or expanded disparity map(s), a system in accordance with the invention can project those maps into world space to produce a scene consisting of one rectangle each per pixel in the disparity map. The rectangle is placed at a distance from the center of projection of the camera along its principal ray based on the associated disparity and a size equivalent to the pixel projected onto a plane at that distance, as shown in FIG. 17. When projected back onto the camera's view plane the rectangles would result in a rendering of the exact disparity map used to create them.

Figure 18:
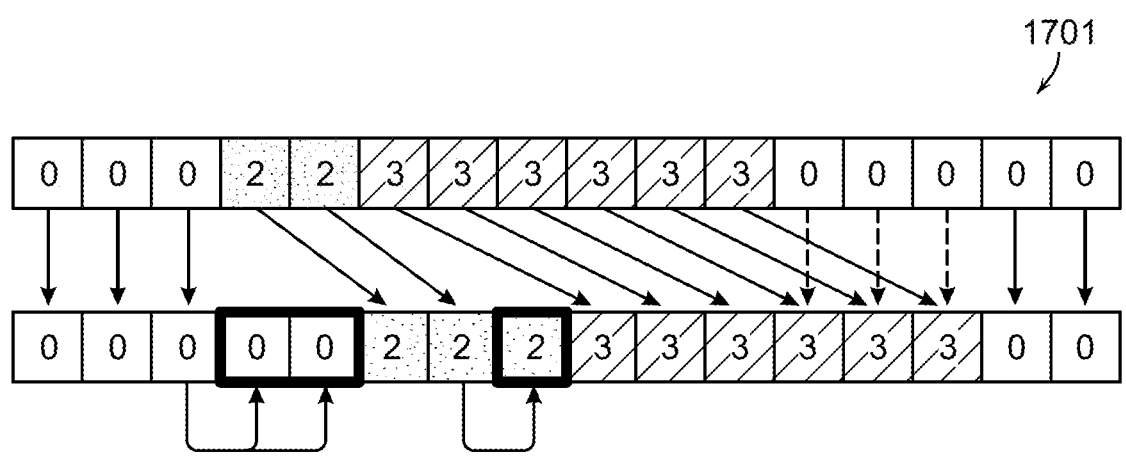
FIG. 18 shows the disparity row used in FIG. 17.

In particular, in the example of FIG. 17, a single row of disparity values 1701 is projected into world space (as rectangles 1702 and 1703) from a camera stereo-pair with baseline B and focal length f (The focal point of each camera is represented by vertices 1704 and 1705) The numbers tables represent the disparity values for each of the cameras. FIG. 18 shows the disparity row 1701 used in the example of FIG. 17.

Figure 19:
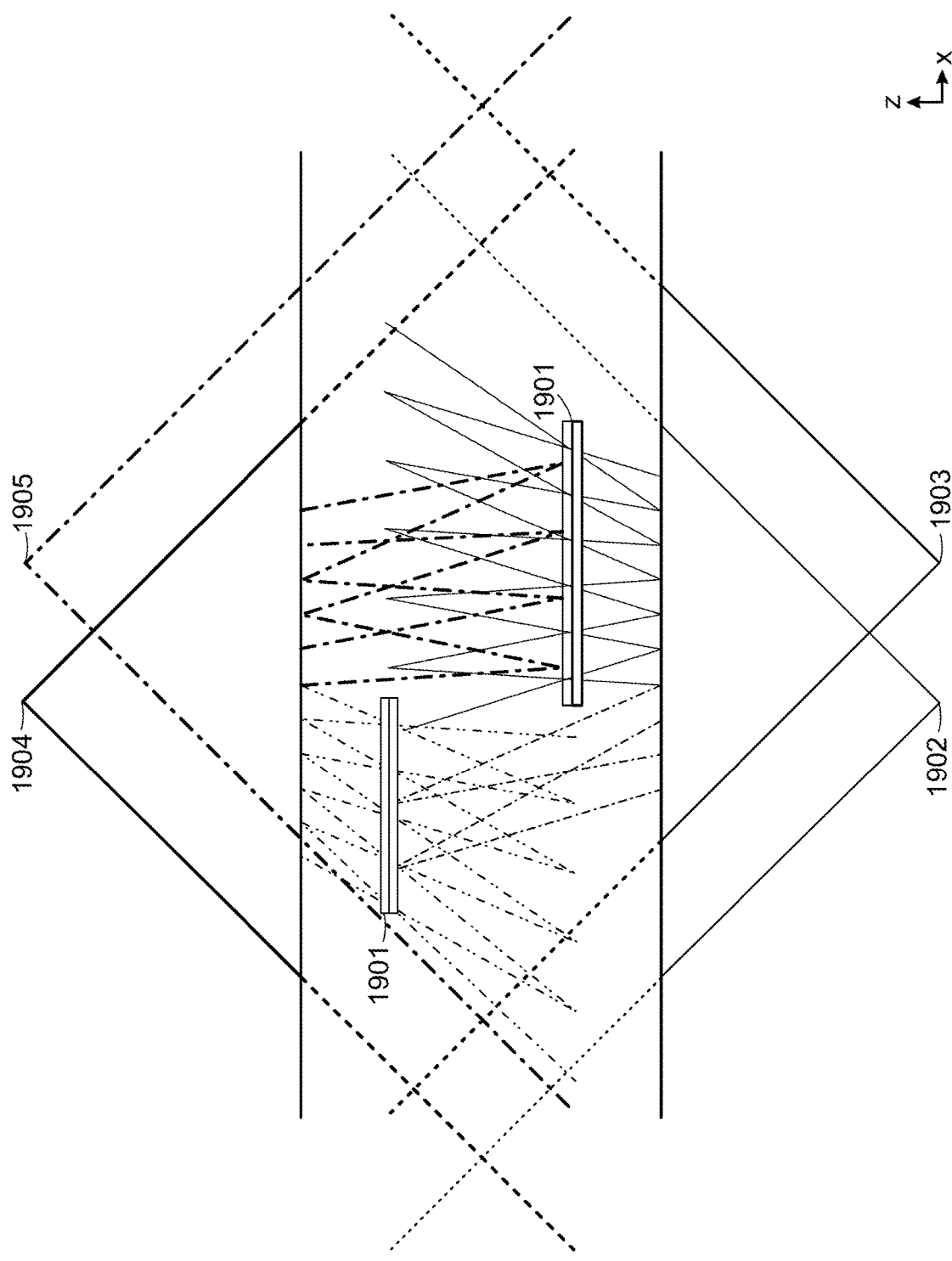
FIG. 19 shows a diagram illustrating a method according to an aspect of the invention for constructing a scene by integrating data from multiple perspectives.

This method of constructing a scene, in accordance with the invention, is very flexible in terms of integrating data from multiple perspectives, as it only relies on a shared world space, as shown in FIG. 19, which depicts a single row of disparity values (collectively 1901) projected into world space from two camera stereo-pairs 1902/1903 and 1904/1905 located opposite each other. The small offset between the projections (see central portion of FIG. 19) is due to the quantized nature of disparity values.

Figure 20:
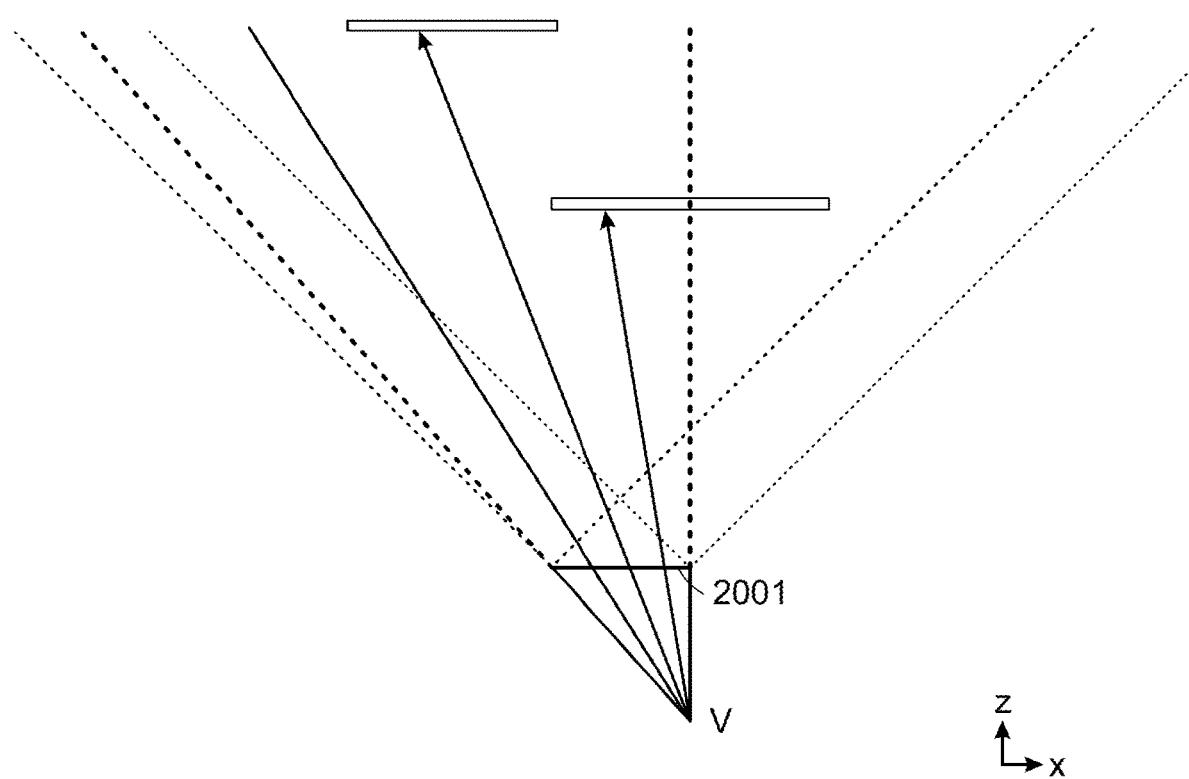
FIG. 20 shows a few example rays originating from a virtual camera V into the scene introduced in FIG. 19.

Tracing Projected Disparity Maps:

Given the foregoing, a system in accordance with an exemplary practice of the invention can then trace arbitrary rays into the scene and test for intersections with the rectangles, as shown in FIG. 20, and use those intersections to compute UV coordinates into the camera images) by projecting the intersection back onto the respective camera's image plane.

FIG. 20 shows a few example rays originating from a virtual camera V into the scene introduced in FIG. 19. The virtual camera's view plane 2001 in the example of FIG. 20 is aligned with the stereo axis of the physical camera-pair, but this is not a requirement. The virtual camera may also use a custom lens model and/or other "non-linear" ray distribution models.

While it is possible to trace arbitrary rays, there are of course limits as to which rays have a chance of successfully intersecting with the sparse scene created for any particular physical camera configuration, but a further exemplary practice of the invention can create an approximation of a dense scene using fill-in strategies, as discussed below. Alternatively, the system can exploit the constraints typically placed on a real-world physical camera setup, in typical applications and systems, to optimize an otherwise computationally expensive tracing process. Further examples of these aspects are provided elsewhere in this document.

Figure 21:
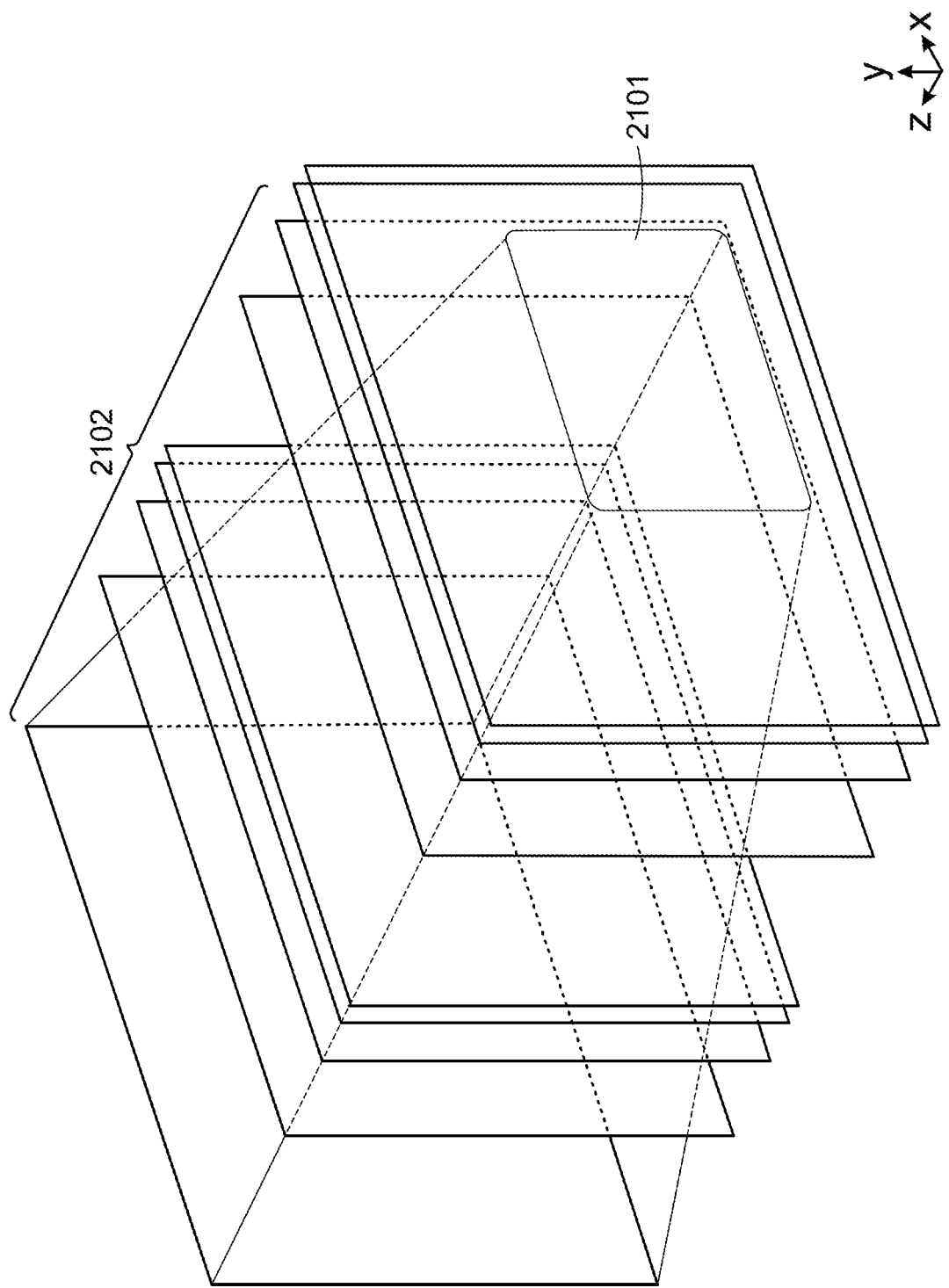
FIG. 21 is a diagram depicting a series of planes parallel to the view plane of the camera, located at distances, from the center of projection, representing each valid disparity.

Ray Vs. Disparity Planes:

In accordance with the invention, one approach to tracing the scene is to calculate the intersections of each ray with all possible planes parallel to the view plane of each of the camera and located at distances from the center of projection equivalent to all valid disparities, as shown in FIG. 21, which depicts a series of planes 2102 parallel to the view plane of the camera 2101, located at distances, from the center of projection, representing each valid disparity.

Figure 22:
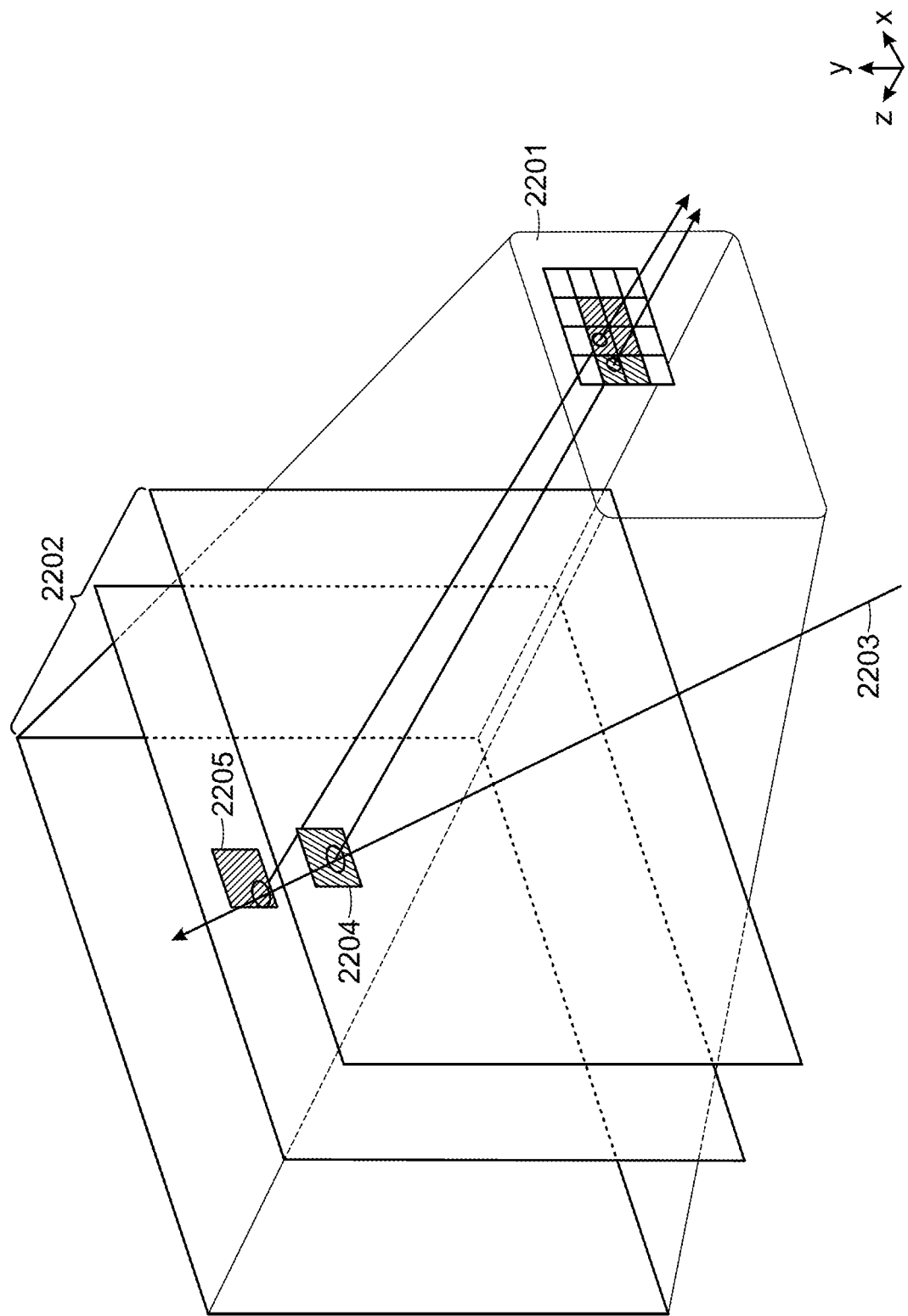
FIG. 22 is a diagram depicting an arbitrary ray intersecting with the disparity planes.

These intersections can then be projected back onto each compatible camera's view plane to look up the disparity stored at that location and compare the value against the disparity value associated with the plane from which the intersection was projected; and if they match, an intersection has occurred, as shown in FIG. 22, which depicts a camera view plane 2201, disparity planes 2202, and an arbitrary ray 2203 intersecting with the disparity planes 2202. Intersections are projected onto the camera's image plane to look up disparity values for "depth" comparison. The image UV coordinate can be derived from the same projected coordinate if the above intersection test succeeds.

This is equivalent to tracing the scene of projected rectangles 2204, 2205, as we have thus defined the projection in such a way that a rendering of the scene would result in the source disparity map.

If executed "brute force" this results in a constant cost, linear to the number of valid disparities. However, a number of optimizations can be implemented in practice. These optimizations include: establish a starting distance, tracing front to back, using hierarchical disparity-interval maps, and the like. These aspects are discussed in greater detail elsewhere in this document. In general, this approach should be faster when the ray is almost perpendicular to the planes, resulting in projected intersection with adjacent disparity planes to be greater than one pixel apart when projected onto the camera image plane.

Figure 23:
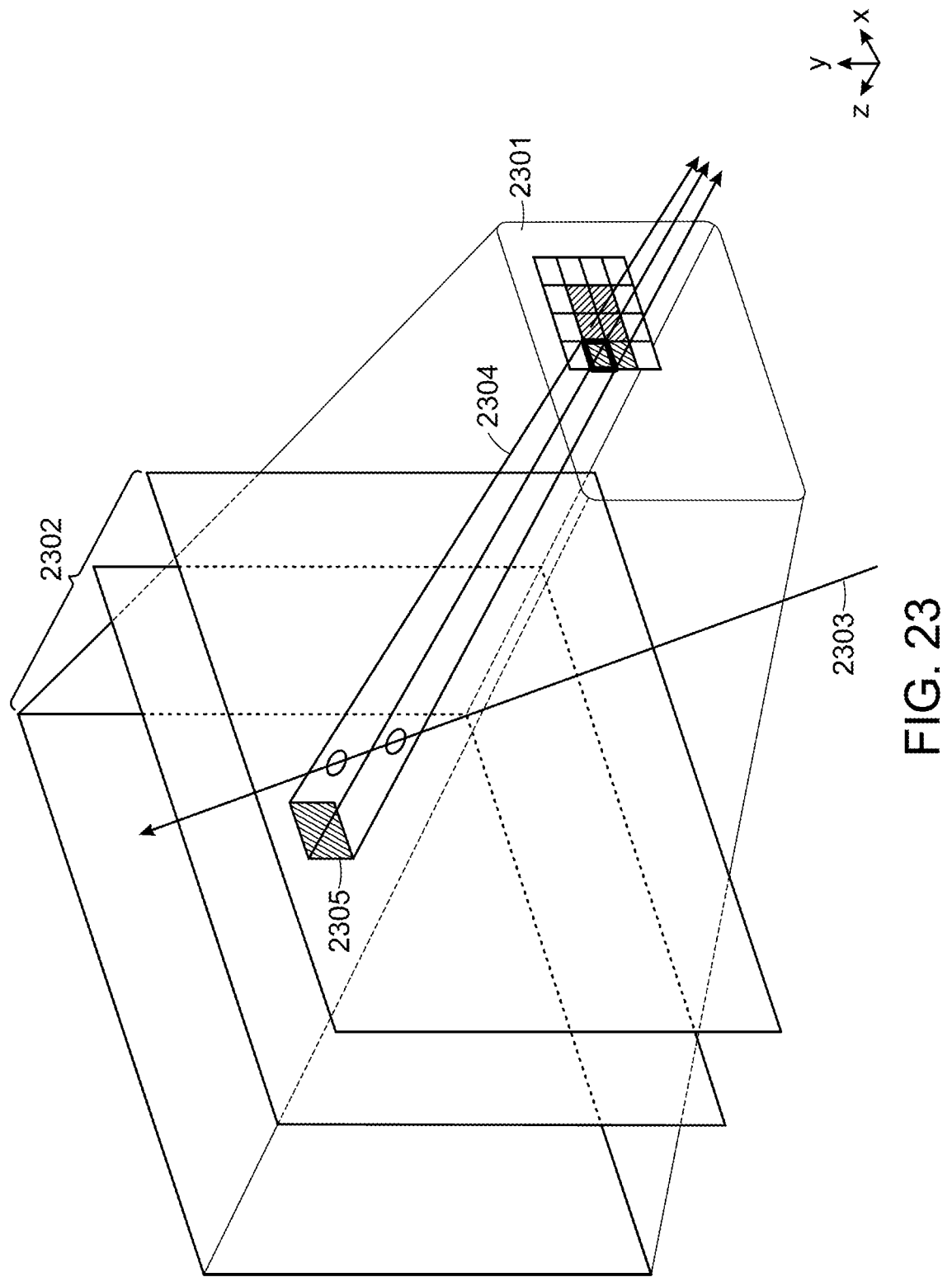
FIG. 23 is a diagram depicting an arbitrary ray intersecting with the frustum of a disparity pixel.

Ray Vs. Disparity Frustums:

In accordance with the invention, another approach to tracing the scene is to calculate all reasonable (considering min/max depth) intersections between the frustums of each disparity pixel and the ray, then checking if the disparity associated with a frustum is contained in the disparity range between the closest and furthest intersection between my and frustum, as depicted in FIG. 23, which shows a camera view plane 2301, disparity planes 2302, and an arbitrary ray 2303 intersecting with the frustum 2304 of a disparity pixel 2305. In the example shown in FIG. 23, the ray 2303 misses the disparity distance.

If executed "brute force" the computational cost of this approach is linear to the image resolution. Again, a number of optimizations can be implemented in practice, which can include one or more of the following: establish a starting distance, project the ray into the camera plane and trace against the 2D pixel grid, tracing front to back, or utilizing interval maps. In general, this approach should be faster when the ray is closer to orthogonal to the view plane, such that ray-plane intersections would be expected to be less than one pixel apart when projected onto the image plane. For an application such as V3D video-conferencing, such as in the above-listed, commonly-owned PCT patent applications, we expect this to be the case for the majority of rays, as the virtual camera is expected to be generally positioned near the center of the display at a distance resulting in a field of view smaller than that of the physical cameras.

Ray Frustum vs. Disparity Frustum:

An even more accurate, but computationally costly approach would be to trace the frustum of each virtual camera pixel against the frustums of a physical camera pixels. The significant additional computational cost of this approach may not be worth the expected improvement in image quality given the quantization and fill-in of data that happens in earlier steps of the image processing pipeline. (See, description of such portions of the pipeline, set forth in the above-listed, commonly-owned PCT applications incorporated herein by reference.) Most of the optimizations applicable to the other approaches described above can still be used, however, and these can include, for example, reframing the intersection as a 2D problem (piecewise-polygon vs. pixel grid). However, even with such optimizations, the computational cost will still be relatively higher than that of the other approaches discussed above (e.g., Ray vs. Disparity Planes or Ray vs. Disparity Frustums).

Optimization Strategies

Starting Distance:

As an optimization, an exemplary practice of the invention can employ a mesh based approach to establish a starting distance for each virtual camera ray. This approach will benefit all methods discussed above. The idea is to render a dense mesh that conservatively approximates the scene geometry using traditional rasterizer methods. This yields a starting distance for the ray tracing operation, skipping any empty space to the first possible intersection along the ray. The mesh is generated by projecting disparity maps, much in the same way as described above, but as a fully-connected mesh, then rendering that mesh from the perspective of the virtual camera as a "distance from camera" pass, emitting one ray for each output pixel with the interpolated starting distance.

Figure 24:
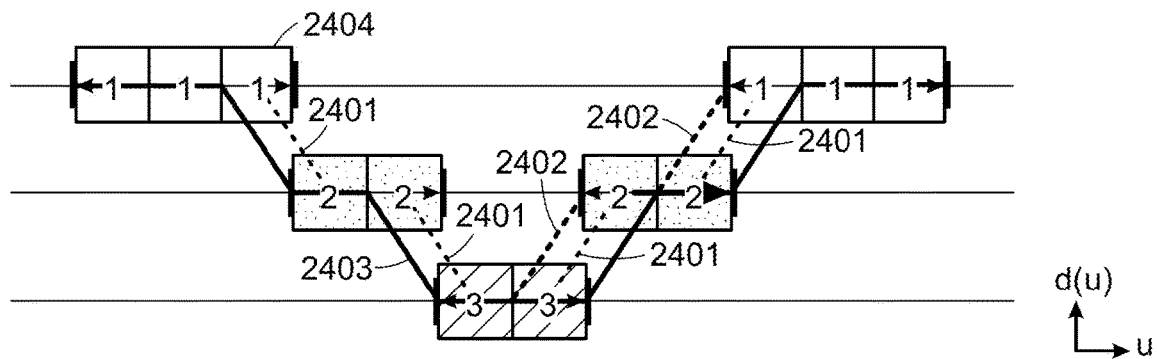
FIG. 24 shows various forms of acceleration meshes employed in a practice of the invention.

To create a fully-connected mesh without inserting connecting elements at a disparity discontinuity, or going to the other extreme of inserting all possible connecting elements and then configuring them as degenerate triangles where not needed, an exemplary practice of the invention places mesh vertices at the edges of disparity pixels and uses the maximum of the disparities values adjacent to each vertex to create a conservative approximation of disparity distance, as shown in FIG. 24.

In particular, FIG. 24 shows various forms of acceleration meshes employed in this practice of the invention to establish a starting distance. The first dotted mesh 2401 places vertices at the center of disparity pixels 2404, which is not conservative near positive or negative disparity discontinuity. The second dotted mesh 2402 places vertices at the edges of disparity pixels 2404, and it is conservative on positive but not negative discontinuities. The solid red mesh uses the maximum of adjacent disparities to produce a conservative mesh on all types of discontinuities.

Translating the 3D Ray-Frustum intersection Problem into a 2D Trace:

Exemplary practices of the invention utilize an efficient stepping strategy that avoids duplicate disparity interval tests, based on the following insights:

1. The frustum planes for each disparity pixel, as seen from the originating camera, are equivalent to the grid between pixels.

2. The ray can be projected onto a camera's view plane as a 2D-line and associated distance function with the distance function representing the distance from view plane the original ray would have at the same parametric position.

Figure 25:
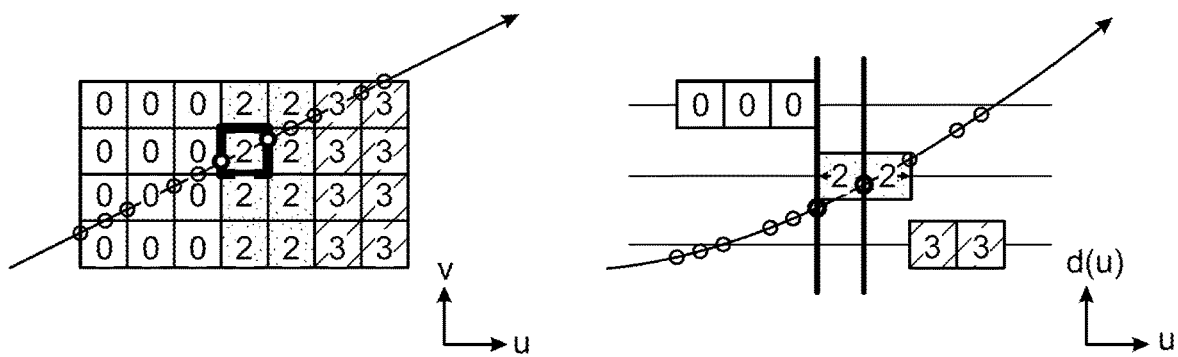
FIG. 25 is a diagram illustrating a ray tracing technique in which a two-dimensional line is passed through a pixel grid to find all relevant frustum intersections.

With dial established we can replace the ray vs, frustum problem with intersecting the 2D-line with the pixel grid to find all relevant frustum intersections. Specifically, each disparity pixel boundary will yield two (possibly identical) intersections in UV space, one each shared with the previous and next iteration, with the 2D-line. Then using the distance function, we can establish the distance from the camera plane at those intersections and compare the resulting interval against the disparity value of the pixel to test if an intersection has occurred (see FIG. 25) as well as where inside the pixel the intersection has occurred or an approximation thereof using only the interval and where the disparity value is positioned in it. As intersections are shared between adjacent disparity pixels only half the interval state, i.e. one new intersection, needs to be re-evaluated each step. These aspects are shown in FIG. 25, which depicts a frustum vs. ray intersection as a 2D problem. One disparity pixel and its associated frustum planes and intersections are highlighted in both the left-side graphic (in image plane space) and right-side graphic (showing the distance function vs. the u-coordinate).

This trace operation can be implemented very efficiently. Stepping the pixel grid is executed by, at each iteration, calculating the distance to both the next horizontal and vertical intersection, then picking the closer one. The first intersection is established by taking one step backwards from the ray start position first then moving forward from there (see FIG. 26) until the ray end or image boundary is reached.

Figure 26:
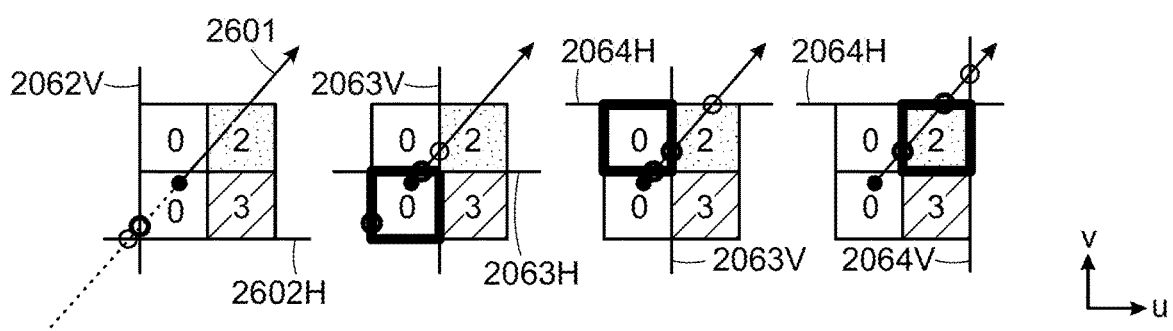
FIG. 26 is a series of diagrams providing a step-by-step illustration of the ray tracing technique.

In particular, FIG. 26 depicts tracing in two dimensions, step by step. First, the initial intersection is found by going backwards from the start of ray 2601. Then, stepping forward towards the ray end, the next horizontal and vertical frustum planes are shown, respectively, as lines 2602H-2604H and 2062V-2604V, with the closer one shown in magenta at each iteration. The closer intersection is marked in red, the farther one in blue. Disparity values that are compared against the ray distance interval between its two ray intersections are highlighted in red at each iteration.

The ray start is either the intersection of the ray with the camera near plane (equivalent to the highest possible disparity value that is or can be measured, based on the physical setup of the camera pair) or one of the camera frustum side planes, whichever is furthest from the image plane, or an even more optimal starting position can be found, using a starting distance optimization such as the ones described above.

The ray end is the intersection with a defined far plane (defined based on the particular application of the method, the closest distance that will get quantized to a disparity value of 0 (zero), or other parameters) or the image boundary. As a performance/quality tradeoff, the far plane can be moved artificially closer and the disparity distances beyond that compressed onto the far plane.

Figure 27:
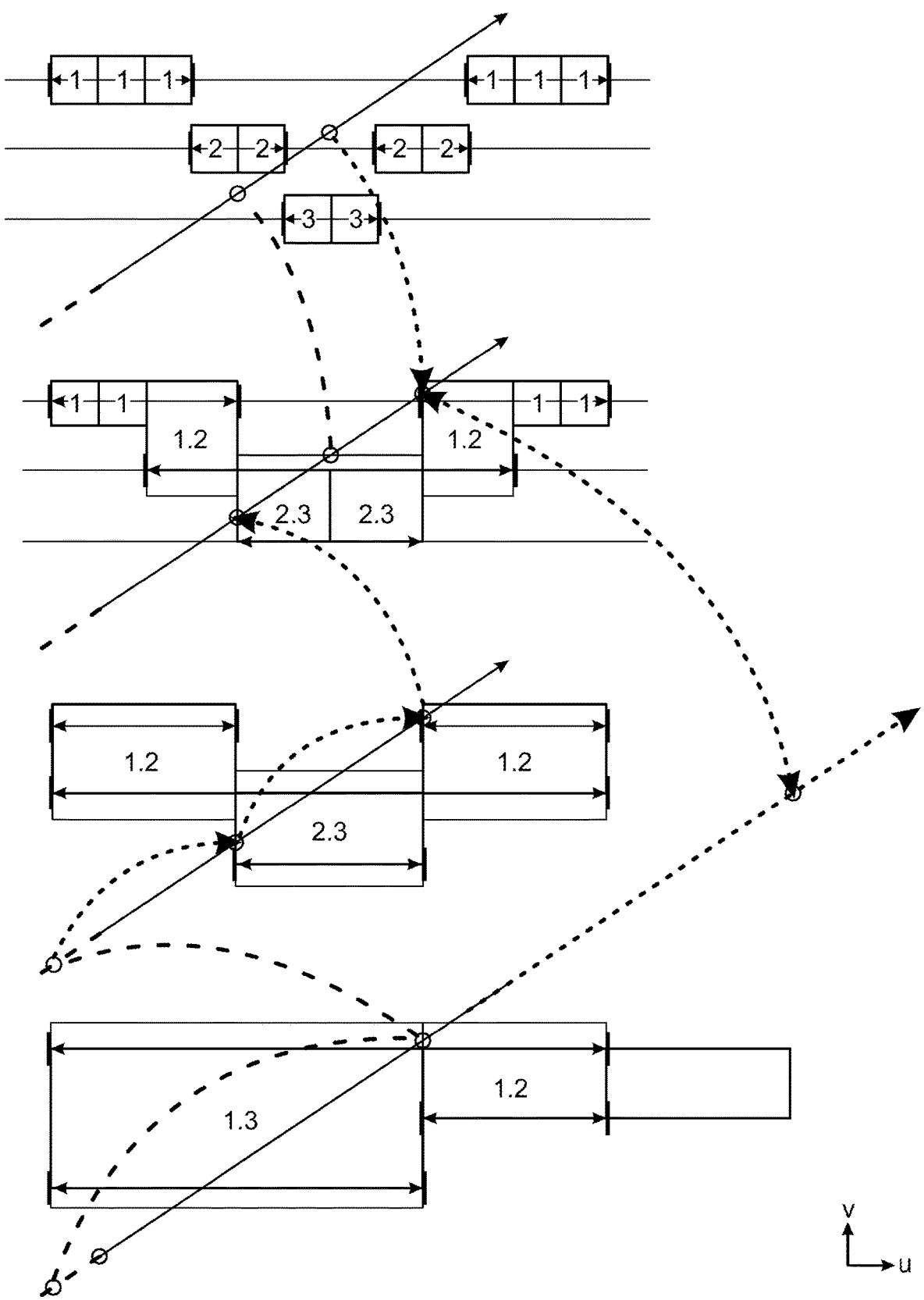
FIG. 27 is a series of diagrams illustrating a technique for creating hierarchical interval maps according to a further aspect of the invention.

Interval Maps:

This practice of the invention involves creating hierarchical interval maps, each storing a minimax disparity range; and using the hierarchy to take larger steps if the ray distance is not found, by testing, in the interval; otherwise moving down one level in the hierarchy and testing again. This could potentially replace the start optimization with a more general optimization, but at some additional computation cost for, e.g., additional computational tests. As depicted in FIG. 27, an interval map approach in accordance with the invention can operate as follows:

Between pixels Max of left/right/top/down sampling for mesh vertices:

1. Generate interval maps for each disparity map;
2. Render acceleration mesh to get per-pixel interpolated UV for interval map lookup;
3. Sample highest level for interval and compare; if inside, walk up the hierarchy, step as far as possible based on level;
4. If interval is confirmed, trace disparity map for "exact" result.

Fill-In Approaches:

As a method or system of the invention executes a trace against a sparse scene, there can be cases where relevant rays never actually hit a projected disparity. This happens independent of any fill-in already done for the native/expanded disparity maps prior to projection into the scene. Executing fill-in can either be left to the ray-tracing stage or dense maps be produced earlier in the pipeline; the choice is left to the implementer.

Figure 28:
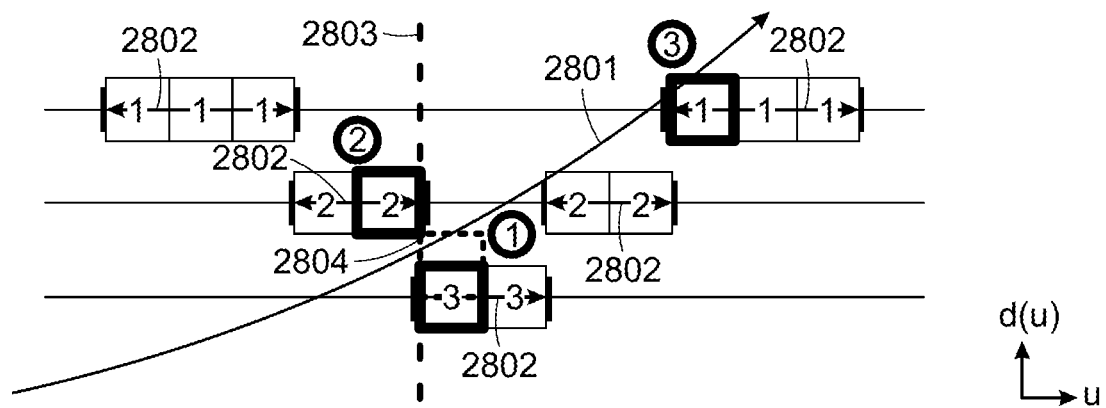
FIG. 28 is a series of diagrams illustrating three possible, non-exclusive fill-in strategies in accordance with exemplary practices of the invention.

FIG. 28 shows three possible (non-exclusive) fill-in strategies, among others in accordance with exemplary practices of the invention. In the example(s) shown in FIG. 28 the ray 2801, represented as its distance function, does not directly intersect with any of the projected disparity values 2802 (i.e., the double-arrowed line segments within each group of blocks). As the dotted vertical 2803 line is crossed, the ray-depth is greater than the disparity map depth for the first time. At this point, in an exemplary practice of the invention, two heuristics can be applied and executed:

1. Assign a thickness to the projected disparity values 2802: instead of intersecting only with the projected disparity directly as indicated by the double-arrowed line segments 2802 within each group of blocks), an exemplary practice of the invention compares the depth interval on the ray with a disparity interval 2804 around the actual disparity value. In the above-discussed example, this would result in an intersection with the first "3" just to the right of the vertical divider.

2. Assume background extension: As the ray 2801 is occluded by a disparity value for the first time, take the disparity value encountered immediately prior to that—in the example, that is the "2" set out with a bold outline—and assume an intersection has occurred with an extension of that disparity value. This process has similarities with the disparity expansion algorithm.

And, along the entire ray 2801:

3. The system can also keep tracing and can consider near-intersections further along. In FIG. 28, for example, the "1" highlighted, set out with a bold outline is the closest miss, followed, by "2" and "3."

Implementation of Fill-In Approaches:

Input is a set of images and associated (native or expanded) disparity maps, calibration data for each of the physical cameras the images originate from and a virtual camera configuration.

Output is a reconstructed image from the perspective of the virtual camera.

In an exemplary practice of the invention, for each output image pixel, one ray, or more than one ray if anti-aliasing by multi-sampling is desired, is generated based on the given virtual camera configuration. Rays can be emitted based on a simple dense/rectangular/linear projection, or a more complex lens model, including a distorted/sparse model as may be required for virtual reality head-mounted displays (VR HMDs).

The ray is then intersected with the frustum planes of the physical cameras, including the configured near and far planes, to establish the segment of the ray actually being traced against each of the disparity maps. Additionally, a starting distance optimization, as discussed above, can be applied here to create the smallest conservative segment that can be established. Depending on the configuration of physical cameras, the number of physical camera frustum plane checks required can be reduced. For example, in a configuration of four physical cameras, where all four cameras form a single epipolar plane and are arranged in a rectangular array, such as might be used for a V3D videoconference setup (see commonly-owned PCT applications incorporated by reference herein), with the cameras placed outside the display, and with the display substantially centered within them, we only need to deal with at most six frustum planes, three intersections per camera, and assume common near and far planes.

The parametric intersections on the ray are then projected onto the camera image planes to establish start and end positions for the 2D-line traces through the disparity maps and the associated distance function parameters.

At this point a method or system according to the invention is ready to step through the disparity maps while applying fill-in strategies. Each trace will result in a depth and a set of UV coordinates, which are then merged using a distance/disparity compatibility function into a blend map, which is subsequently used to sample from one or more of the source images after the UV coordinates have been transformed into the Unrectified/Distorted (URD) space of those images.

Alternatively, instead of considering all disparity maps and images for all output pixels, the method or system can skip tracing additional disparity images if it has found at least one hit of sufficient quality (i.e., quality exceeding a defined threshold).

Mesh-Based Reconstruction/Rasterizing Projections of Disparity Maps

As described in the Overview section above, in various exemplary practices of the invention, there are two classes of methods than can be employed to project a disparity map from one of the input cameras into another projection. These methods include a ray-tracing or ray-casting approach, and an approach utilizing a polygon rasterizer (mesh-based reconstruction). In this section, we describe methods and operations that can be performed using a polygon rasterizer.

As distinguished from a ray tracing approach in accordance with the invention (described in greater detail elsewhere in this document), which offers the most accurate re-projection of a disparity map, the rasterization approach may offer a higher performance/lower computational cost solution, at the possible expense of some loss of image quality.

In common with the ray tracing approach, a native disparity map is required for a single camera (referred to herein as the master camera, or, more generally, a first camera) and either native or expanded disparity maps for each of the other cameras to be integrated. (For purposes of simplicity, the following examples use the "master camera" nomenclature, hut no special requirement is mandated by the invention for any selected camera to be the master camera or more generally, a first camera)

Starting with the native disparity map for the master camera, a method, system or computer code product in accordance with an exemplary practice of the invention includes the following operations or process elements:

1. Quad'patch vertex generation.
2. Transformation of the quad patch vertices.
3. Generation of per-fragment disparity reference value and UV coordinate in master camera.
4. Generation of UV coordinates for the other camera images.
5. Weighted summation of the samples from each camera image.
6. Generation of input to the rasterization depth test.

Figure 29:
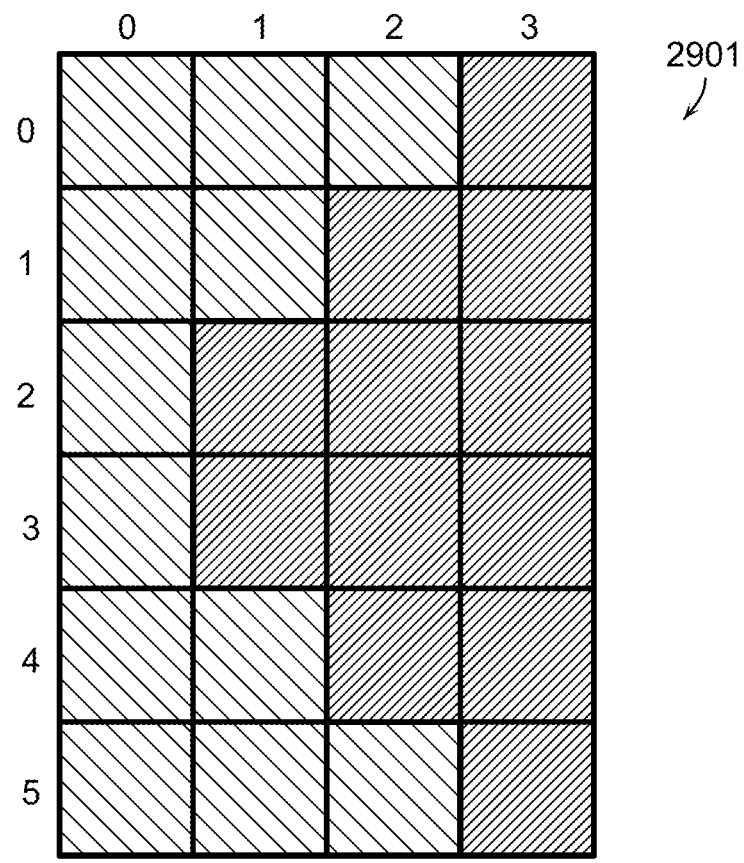
FIG. 29 is a simplified disparity map as an input to a rasterizing or mesh-based process according to exemplary practices of the invention.

The following sections describe an exemplary input disparity map and then each of the above-listed operations,
Input Disparity Map:

For the purposes of explanation, FIG. 29 depicts a simplified disparity map 2901 as an input to the rasterizing or mesh-based process. As shown in FIG. 29, the disparity map has a width of 4 pixels and a height of 6 pixels, and each value is either 0 (zero) (light hatching) or 1 (dark hatching). In practice, the disparity maps will have a much higher resolution and contain a broader range of values.

Figure 30:
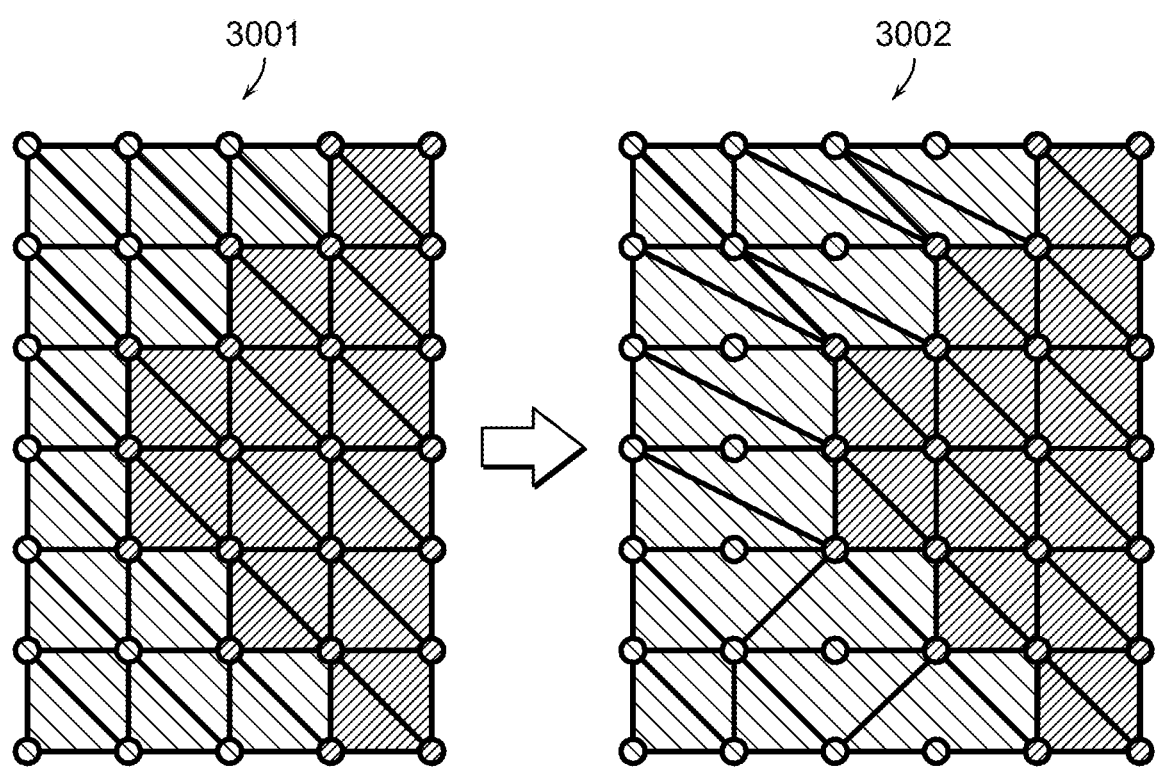
FIG. 30 shows a schematic example of a vertex mesh and associated disparity values, before and after a unit transformation to the right.

1. Quad Patch Vertex Generation:

FIG. 30 is a diagram illustrating a quad patch vertex generation technique according to an aspect of the invention. Given the resolution of the input disparity map (we refer to this as the two-dimensional vector S), the illustrated technique produces a regular grid of vertices forming pairs of triangles making up squares. Each of these squares is referred to herein as a "quad." Each vertex will have associated with it a normalized coordinate within the master camera disparity map and a disparity value. The disparity value is used in subsequent processing in order to re-project the vertex to a new location, based on the specific projection function being used. FIG. 30 shows a schematic example of the vertex mesh and associated disparity values, in the left-hand graphic 3001. The right-hand graphic 3002 illustrates the same mesh after transformation 1 unit to the right.

Referring again to FIG. 30, key points in generation of this vertex array are as follows:

1. The vertices are placed on the corners of the disparity map values, rather than the centers. Therefore, there will be $(S_x+1) \times (S_y+1)$ vertices generated.

2. Since vertices are placed on the corners, there are 4 possible values for the associated disparity of a given vertex. The chosen disparity must be the largest of the disparity values surrounding this vertex.

3. In most implementations, the mesh structure can be defined once for a given disparity map resolution and never needs to be altered. This is possible since the mesh topology is constant and the disparity values for each vertex can be read dynamically, directly from the disparity map during the vertex processing function.

In accordance with the invention, the reason for this mesh structure is so that a constant disparity value can be maintained within each quad. The fragment processing stage, described in greater detail hereinafter, uses the disparity value associated with the minimum quad vertex (upper left in FIG. 30). This is important so that the revealing of background objects during reconstruction will be performed correctly. If this is not done properly, background objects on large disparity discontinuities will appear to stretch during reconstruction.

2. Transformation of the Quad Patch Vertices:

Once the quad patch is generated in accordance with the invention, the next operation in an exemplary practice of the invention is to apply a transform to its vertices. This will produce a new perspective of the disparity map. Exemplary practices of the invention utilize two types of transform in the mesh-based or rasterization-based reconstructor, as follows:

1. Transformation on the camera epipolar plane:

a. This can be used to produce fully expanded disparity maps for cameras in which a native disparity map is unavailable or too computationally expensive to compute.

b. This can also be used to produce a reconstructed image with the same field of view as the actual/physical cameras, but shifted elsewhere on the epipolar plane.

c. This transformation is relatively simple: the projected coordinate is simply the input vertex coordinate in RUD (Rectified, Undistorted) space on the master camera plus the vertex disparity value multiplied by normalized XV position of the projected camera origin on the epipolar plane relative to the master camera.

2. Portal projection transformation:

a. This is used to produce the reference disparities and reconstruct au image as it would appear on the display portal from the perspective of a virtual camera.

b. This is described in detail in the Portal Projection section of this document.

Other types of projection could also be supported in accordance with the present invention, for other applications and use-cases.

After the transform is applied, the rasterizer generates fragments for all display pixels contained within each of the triangles on the quad patch mesh. In an exemplary practice of the invention, the rasterizer will also perform clipping of fragments that are outside of the defined display region.

3. Generation of Per-Fragment Disparity Reference Value and UV Coordinate in Master Camera:

At this stage in the pipeline, the rasterizer has generated calls to a programmable fragment generation function for visible pixels in the triangles of the quad mesh. We next describe the required behavior of this fragment generation function, in accordance with an exemplary practice of the invention.

Inputs:

Primidx: Index of the tuner triangle being rasterized. In an exemplary practice of the invention, the triangles are submitted in a known scan order therefore, this index allows us to identify a triangle within the mesh.

$XY_{mesh\_min}$: Minimum XY coordinate of the overall quad mesh. Often this is [0,0] but may be larger if only a portion of the disparity map is being rendered, $XY_{mesh\_size}$: Number of quads in the mesh in both dimensions.

$UV_{quad\_min}$: Minimum UV coordinate on the mesh of the current quad for of which this fragment is part.

$NDC_{quad\_min}$: Minimum normalized device coordinate of the current quad as projected onto the display.

Ideally, the rasterizer is able to provide $UV_{quad\_min}$ and $NDC_{quad\_min}$ directly since the are known in the vertex processor, though in practice on many hardware rasterizers, they need to be re-derived in the fragment processing stage due to inherent limitations in the fixed-function hardware interpolation units between the vertex and fragment processing stages. They can be derived from Primidx, $XY_{mesh\_min}$ and $XY_{mesh\_size}$, all of which can be made available. Once UVquad_min has been derived, the fragment processor can re-evaluate the projection function to compute. $NDC_{quad\_min}$.

Outputs:

$\Delta_{ref}$: Reference disparity value for the quad. This must be constant for all fragments in the quad.

$UV_{master}$: UV coordinate into the master camera image.

Method:

In an exemplary practice of the invention, the first operation in this aspect of the method is calculate the reference disparity. This is accomplished by sampling into the original master camera disparity map using $UV_{quad\_min}$. The sampling must be performed with nearest neighbor filtering and the rasterizer needs to be configured such that $UV_{quad\_min}$ is guaranteed to be constant across both triangles in the quad. This is not the default behavior of most rasterizers since they typically will linear interpolate vertex attributes across the triangle.

The next operation in this aspect of the method is to computationally generate $UV_{master}$. This will be the UV coordinate to look up color and disparity data from the master camera. It will also be used to calculate the coordinates for the other cameras. $UV_{master}$ is unique for each fragment and is generated using a custom interpolation function whereby the derivative can be controlled. This is non-typical of most rasterizers, since they will only offer linear interpolation across the triangle between its vertices, or no interpolation, known as flat shading. An exemplary practice of the invention uses a different form of interpolation that starts as $UV_{min}$ at the minima of the quad and then continues with a constant derivative across the quad, regardless of the quad's projected size. This is defined in accordance with the following formulas. This derivative used is a function of the reference disparity ($\Delta_{ref}$) and acts to essentially magnify features further away from the viewer, essentially altering the perceived field-of-view of the reconstructed image depending on the viewer's position relative to the portal.

Computational generation of is defined by the following equation:

$$UV_{master} = UV_{quad\_min} + \frac{\partial UV}{\partial NDC}\left(\frac{NDC_{fragment} - NDC_{quad\_min}}{2}\right)$$

For projection of a virtual camera on the epipolar plane:

$$\frac{\partial UV}{\partial NDC} = 1$$

For the portal projection:

$$P_z = \frac{Tf}{\Delta_{ref}}$$

$$\frac{\partial UV}{\partial NDC} = \frac{f \times (V_z + P_z)}{V_z \times (f + P_z)}$$

Where $NDC_{quad\_min}$: Normalized device coordinate of the minimum corner of the quad.

$NDC_{fragment}$: Normalized device coordinate of the current fragment coordinate within the quad. This value is known by the fragment processing pipeline stage.

T: Camera baseline (in mm, cameras assumed, for the purposes of this example, to be arranged in a square)

$f$: Focal length of Bottom Right (BR) camera image (in camera units)

$\Delta_{ref}$: Reference disparity value for the quad. This is constant for all fragments in a given quad.

$V_Z$: Virtual camera origin Z location (in mm, relative to camera square center)

$P_Z$: Z coordinate of all points with the given disparity.

One possible extension of the above-described method is to allow the reconstruction algorithm to switch between the above-described aspect of a continuously incrementing UV across the quad (regardless of its size) and traditional linear interpolation of UV values across the quad on a per-quad basis. For quads spanning small disparity differences, UV interpolation may produce a smoother reconstruction of a continuous surface, while continuous UV values will allow for revealing of background features on a large disparity discontinuity.

4. Generation of UV Coordinates for the Other Camera Images:

Given $UV_{master}$ and $\Delta_{ref}$, we can calculate the UV coordinate of where the same image feature will be found in the other cameras assuming that the other camera has line of sight to that feature.

Assuming a calibrated camera system whereby the pixel row and columns are aligned with their epipolar lines and assuming that the cameras are arranged in a square configuration:

$$UV_i = UV_{master} + \left(E_i \times \frac{\Delta_{ref}}{\Delta_{max}}\right)$$

where $E_i$ is the 2D normalized epipolar vector between the master camera and camera.

5. Weighted Summation of the Samples from Each Camera Image:

As described below in the Sample Weighting section, the resulting color of a given fragment be a weighted summation of each of the camera image samples:

$$R = \sum_{i=0}^{n} W_i C_i$$

Where:
R: Resulting reconstructed image color to be drawn at the projected coordinate on the display;
n: Number of input source camera images being integrated;
$W_i$: Weight of the contribution from the given camera; and
$C_i$: Color sample from the given camera;

The weight value (W) calculation is described in greater detail below in the Sample Weighting section, The color sample from the camera is performed using known texture sampling techniques, which include techniques such as a bilinear, tri-linear or any other kind of typical filtering, made available in the rasterizer. If the camera images have been pre-transformed into RUD space (Rectified, Undistorted) beforehand, then the texture sample can be performed directly. If instead, the camera images are kept in their native URD space (Unrectified, Distorted), then the given incoming UV coordinate must have the affine rectification transform applied, followed by application of the
polynomial lens distortion function, both of which are supplied by the calibration data of the camera system used to the capture the images.

6. Generation of Input to the Rasterization Depth Test:

Rasterizers will generally include a depth test feature that is used to ensure that only the fragment closest to the viewer is drawn to the display pixel. By default, this works by storing a depth value for every display pixel, and when a new fragment is generated far that pixel, it compares the fragment depth with the existing value stored in the pixel. Only if the incoming depth is less than the stared value will the fragment be drawn onto the display. For re-projection methods in accordance with the invention, the normalized version of $\Delta_{ref}$ passed as our value to the depth test, in particular:

$$FragmentDepth = 1 - \frac{\Delta_{ref}}{\Delta_{max}}$$

Sample Weighting

In accordance with exemplary practices of the invention, regardless of whether the ray tracing or polygon rasterization method is used, the reconstruction pipeline will generate sample requests into the input camera images. These sample requests will comprise a UV coordinate into the camera image in RUD space (Rectified, Undistorted) space along with a weight. The resulting color that gets drawn on the display element at the projected point will be a weighted summation of each of the camera image samples, given by the following expression:

$$R = \sum_{i=0}^{n} W_i C_i$$

Where:
R: Resulting reconstructed image color at the projected coordinate on the display
n: Number of input source camera images being integrated
$W_i$: Weight of the contribution from the given camera
$C_i$: Color sample from the given camera
The Sample Weighting function, next described, is executed to computationally generate the value of $W_i$.
Sample Weighting Function:
For purposes of describing this function, it is assumed that the input camera images are already transformed into RUD (Rectified, Undistorted) space, in practice, for performance reasons, the system may opt to keep the camera images in their native URD (Unrectified, Distorted) space and instead transform RUD coordinates into URD space right before sampling their images.
Inputs:
$UV_i$: Normalized UV coordinate in RUD space into the image from camera i
$\Delta_{ref}$: Reference disparity. This is the expected disparity of the feature.
$\Delta_i$: Disparity from camera i at UVi
P: Normalized coordinate of projected point on the camera baseline plane (This value is generated or obtained directly from the projection function previously described in this document; and it is a normalized version of the P''' term described therein),
Output:
$W_{0...n}$: Normalized weight for each camera 0 ... n. The sum of all the weights will equal 1.0 in order to maintain consistent luminance in the reconstructed image.
Description of Function:
In an ideal world, all of the cameras would have perfect visibility to the same feature in the scene and therefore the weights would all be equal such that we simply would average all of the sampled camera color values. In practice, this is not viable due to the following factors:

1. The given feature is visible from only a subset of the cameras due to:
   a. Occlusion by another object in the scene.
   b. Falling outside of the field of view of some of the cameras.
2. The given feature is seen with higher quality from some cameras more than others due to the amount of re-projection being performed by the reconstructor to satisfy the desired virtual camera projection.

Handling Occlusion by Other Objects in the Scene:

In accordance with the it the weighting function needs to know what the expected (or reference) disparity is expected to be at the given reconstructed point: this is the $\Delta_{ref}$ input. In the case of the rasterized polygon method, this comes from the mesh based projection of the disparity map from a one of the cameras. In the ray tracing method, this comes from the intersection of a ray from the virtual camera location with the closest value in the disparity map from one of the cameras. In both methods, multiple cameras may be tested and even a potential vote may occur to select a reference disparity value that is the most popular.

In an exemplary practice of the invention, given the reference disparity and a candidate disparity read from the native or expanded disparity map for camera i, ($\Delta_{ref}$ and $\Delta_i$) the system constructs a weight for each camera based on how close these values are, defined by the following expression:

$$Wocclusion_i = f\left(1 - \frac{|\Delta_{ref} - \Delta_i|}{\Delta_{max}}\right)$$

In accordance with the invention, there are a number of ways of tuning the function "$f$", but the following general rule applies:

If $\Delta_{ref}$ and $\Delta_i$ are equal, the camera should receive its maximum weight. As the difference between $\Delta_{ref}$ and $\Delta_i$ increases, the camera should receive decreasing weight. This intuitively makes sense because if this difference is large, this is likely because one of the cameras is seeing something further away, or in front of, the desired features reference disparity. If the method or system were not to reduce the weight, we would see a ghost features appearing from other cameras that should not be visible from the current reconstructed perspective.

The Applicants have found that in practice, small deviations in disparity values are common due to error in the disparity map and therefore a smooth hermite interpolation (known as a "smoothstep" in graphics shading languages) of the weight between 0 and ±16 disparity units is effective and also eliminates obvious visual discontinuities.

Handling Features Falling Outside of the Camera Field of View:

In practice, it is possible that the UV coordinate generated for a given camera is outside of the field of view of its available image data. In this case, the system needs to avoid sampling from that camera entirely. Simplistically, the weight could simply be set to 0 (zero) when the UV coordinate is outside of the [0 . . . 1] interval. In practice, however, we again prefer a smoothstep as the UV coordinate approaches this limit, so as to remove the obvious visual discontinuity in the reconstructed image when a camera's contribution is "turned off."

In an exemplary practice of the invention, the camera will receive full weight within 90% of the image in each dimension, and will then drop to zero weight between 90% and 100%, creating a soft border around each camera image's contribution. Thus, in this example, the "outside field of view" weight component for camera i is given by the following expression:

$$Wfov_i = 1 - \text{smoothstep}(0.9, 1.0, UV_i)$$

Optimizing Cameras Weights to Minimize Sample Re-Projection Error:

Ultimately, the reconstructor is sliding around pixels from multiple cameras into a new location determined by the projection function. The less a pixel is moved from its original location, the less error will be introduced in the reconstructed image. This is in large part because the disparity values themselves are imperfect.

The goal of the re-projection weight function is to preferentially weight cameras whose center of projection is closer to the projected point of the virtual camera ray with the camera baseline plane. This means that if the virtual camera ray where to pass perfectly through the center of projection of the Bottom Right (BR) camera (as in a four-camera rectangular or square array of physical cameras), then it would receive the maximum weight.

By way of example in accordance with a practice of the invention, for 4 cameras arranged in a square (with cameras BR, Bottom Left (BL), Top Right (TR) and Top Left (To the re-projection weighting function is as follows:

$$Wreproj_{BR} = (1-P_y)(P_x)$$

$$Wreproj_{BL} = (1-P_y)(1-P_x)$$

$$Wreproj_{TR} = (P_y)(P_x)$$

$$Wreproj_{TL} = (P_y)(1-P_x)$$

Combining the Weights:

Given the foregoing, for each camera, we now have three components to the weight:

$$Wocclusion_i, Wfov_i \text{ and } Wreproj_i.$$

In an exemplary practice of the invention, the system combines these weights by multiplication, as given by the following expression:

$$W_i = Wocclusion_i \times Wfov_i \times Wreproj_i$$

In an exemplary practice of the invention, the system normalizes these weights such that;

$$\sum_{i=0}^{n} W_i = 1$$

This normalization function is executed in accordance with the following expressions:

$$S = \sum_{i=0}^{n} W_i$$

$$Wnormalised_i = \frac{W_i}{S}$$

Digital Processing Environment in Which Invention can be Implemented

Those skilled in the art will understand that the above described embodiments, practices and examples of the invention can be implemented using known network, computer processor and telecommunications devices, in which the telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the present invention can be executed in commercially available digital processing systems, such as servers, PCs, laptop computers, tablet computers, cellphones, smartphones and other forms of mobile devices, as well as known forms of digital networks, including architectures comprising server, cloud, network, and client aspects, for communications between such devices.

The terms "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the cellphone, smartphone, tablet computer, PC, laptop, computer-driven television, or other digital processing device or system. Various forms of computer readable elements and media are well known in the computing arts, and their selection is left to the implementer, In addition, those skilled in the art will understand that the invention can be implemented using, computer program modules and digital processing hardware elements, including memory units and other data storage units, and including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for Storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Java, C++, and the like. It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

The Applicants have implemented various aspects of the invention, using, as developmental tools, the following:
  OpenCV (Open Source Computer Vision) library;
  PointGrey Research Chameleon3 USB camera modules;
  Intel HD Graphics OPUS for computing/processing resources; and
  Intel Media SDK for access to H264/H265 compression hardware; noting that the above listed elements are only tools, and not themselves instantiations, embodiments or practices of the invention. The Applicants developed the invention in accordance with the description set forth in this Specification and the accompanying drawings.

Flowcharts of Exemplary Practices of the Invention

FIGS. 31-51 are flowcharts illustrating method aspects and exemplary practices of the invention. The methods depicted in these flowcharts are examples only, the organization, order and number of operations in the exemplary practices can be varied; and the exemplary practices and methods can be arranged or ordered differently, and include different or additional functions, whether singly or in combination, while still being within the spirit and scope of the present invention. Elements shown in the flowcharts in parentheses are, among other aspects, optional in a given practice of the invention.

FIGS. 31-51 illustrate methods relating to the following aspects of the invention:
  FIGS. 31-37: image communication
  FIG. 38: duplex configuration
  FIG. 39: projection function
  FIG. 40: calibration data
  FIG. 41: multiple virtual camera positions
  FIG. 42: disparity map expansion
  FIG. 43: transmitting and receiving subsystems
  FIG. 44: disparity value/disparity map process execution
  FIG. 45: camera/portal configuration
  FIG. 46: generating an expanded disparity map
  FIG. 47: determining stereo correspondence
  FIGS. 48-49: reconstruction based on ray tracing
  FIG. 50: mesh-based reconstruction
  FIG. 51: sample weighting FIG. 31 is a flowchart of an exemplary image communication method 3100 according to an aspect of the invention, comprising the following:

3101: Capture scene images utilizing at least two cameras, each having a respective physical camera view of the scene, wherein each camera captures at least one camera image of the scene and generates corresponding image data representative of the respective camera image of the scene.

3102: Obtain calibration data representative of each camera's respective configuration and representative of at least one epipolar plane configuration shared among cameras, wherein an epipolar plane is shared between at least two cameras.

3103: Generate at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map.

3104: Transmit for remote use in reconstruction of images of the scene, the calibration data, image data representative of the camera images, and at least one native disparity map.

3105: Receive, remote from the cameras having a physical camera view of the scene, the calibration data, image data representative of the camera images and at least one native disparity map.

3106: Generate, based on the calibration data, image data representative of the camera images and at least one native disparity map, a synthetic, reconstructed image of the scene from the perspective of a virtual camera having a selected virtual camera position, the selected virtual camera position being unconstrained by the physical position of any of the cameras having an actual view of the scene, wherein the generating, comprises: utilizing a selected rasterizing technique, selected raytracing, technique, or a selected combination of a rasterizing technique and a raytracing technique, to generate camera image UV sample coordinates and sample weights to generate the reconstructed image from the perspective of the virtual camera.

FIG. 32 is a flowchart of an exemplary image communication method 3200, comprising the following:

3201: Capture images of a scene, utilizing at least two cameras, each having a respective physical camera view of the scene, wherein each camera captures at least one camera image of the scene and generates corresponding image data representative of the respective camera image of the scene, and at a epipolar plane is shared between at least two cameras.

3202: Generate at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map.

3203: Transmit, for remote use in reconstruction of images of the scene, image data representative of the camera images, and at least one native disparity map.

3204: Receive the image data and at least one native disparity map.

3205: Read calibration data representative of each camera's respective configuration an of at least one epipolar plane configuration shared among cameras.

3206: Generate, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene, wherein generating a reconstructed image comprises: utilizing a selected rasterizing technique, selected ray-tracing technique, or a selected combination of a rasterizing technique and a ray-tracing technique, to generate camera image UV sample coordinates and sample weights to generate the reconstructed image from the perspective of the virtual camera.

FIG. 33 is a flowchart of an exemplary image communication method 3300, comprising the following:

3301: Capture images of a scene, utilizing at least two cameras, each having a respective physical camera view of the scene, wherein each camera captures at least one camera image of the scene and generates corresponding image data representative of the respective camera image of the scene, and wherein an epipolar plane is shared between at least two cameras.

3302: Transmit, for remote use in reconstruction of images of the scene, image data representative of the camera images, the image data comprising lossless data from native camera image buffers.

3303: Receive the image data,

3304: Read calibration data representative of each camera's respective configuration and of at least one epipolar plane configuration shared among cameras.

3305: Generate, using the image data, at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map.

3306: Generate, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene, wherein generating a reconstructed image comprises utilizing a selected rasterizing technique, selected ray-tracing technique, or a selected combination of a rasterizing technique and a ray-tracing technique, to generate camera image LTV sample coordinates and sample weights to generate the reconstructed image from the perspective of the virtual camera.

FIG. 34 is a flowchart: of an exemplary image communication method 3400, comprising the following:

3401: Capture images of a scene, utilizing at least two cameras, each having a respective physical camera view of the scene, wherein each camera captures at least one camera image of the scene and generates corresponding image data representative of the respective camera image of the scene, and an epipolar plane is shared between at least two cameras.

3402: Generate at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map.

3403: Transmit, for remote use in reconstruction of images of the scene, image data representative of the camera images, and at least one native disparity map.

3404: Receive the image data and at least one native disparity map,

3405: Read calibration data representative of each camera's respective configuration and of at least one epipolar plane configuration shared among cameras.

3406: Generate, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene, wherein generating a reconstructed image comprises utilizing a selected rasterizing technique, selected ray-tracing technique, or a selected combination of a rasterizing technique and a ray-tracing technique, to generate camera image UV sample coordinates and sample weights to generate the reconstructed image from the perspective of the virtual camera, and the capturing, the generating of a native disparity map and the transmitting are executed in a transmitting digital processing resource, and the receiving, reading and generating of synthetic, reconstructed image are executed in a receiving digital processing resource at least in part remote from the transmitting digital processing resource.

FIG. 35 is a flowchart of an exemplary image communication method 3500, comprising the following:

3501: Capture images of a scene, utilizing at least two cameras, each having a respective physical camera view of the scene, wherein each camera captures at least one camera image of the scene and generates corresponding image data representative of the respective camera image of the scene, and wherein an epipolar plane is shared between at least two cameras.

3502: Generate at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map.

3503: Transmit, for remote use in reconstruction of images of the scene, image data representative of the camera images, and at least one native disparity map, wherein the capturing, the generating of native disparity map and the transmitting are executed by a transmitting digital processing resource, and the image data and at least one native disparity map configured so that a receiving digital processing resource configured to receive the image data and at least one native disparity map, and configured to read calibration data representative of each camera's respective configuration and of at least one epipolar plane configuration shared among cameras, can generate, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene.

FIG. 36 is a flowchart of an exemplary image communication method 3600, comprising the following:

3601: Receive, from a transmitting digital processing resource, image data representative of images of a scene captured by at least two respective cameras, each having a respective physical camera view of the scene, wherein each camera is configured to capture at least one camera image of the scene and generate corresponding image data representative of the respective camera image of the scene, and an epipolar plane is shared between at least two cameras.

3602: Receive, from the transmitting digital processing resource, at least one native disparity map for a given epipolar plane, wherein the native disparity map comprises a computational solution to the stereo correspondence problem between at least two cameras in a shared epipolar plane, using rectified images from the at least two cameras, with associated disparity values stored in the native disparity map.

3603: Read calibration data representative of each camera's respective configuration and of at least one epipolar plane configuration shared among cameras.

3604: Generate, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene, wherein generating a reconstructed image comprises utilizing a selected rasterizing technique, selected ray-tracing technique, or a selected combination of a rasterizing technique and a ray-tracing technique, to generate camera image UV sample coordinates and sample weights to generate the reconstructed image from the perspective of the virtual camera.

FIG. 37 is a flowchart of an exemplary image communication method 3700 comprising the following:

3701: Capture images of a scene, utilizing at least two cameras, each having a respective physical camera view of the scene, wherein each camera captures at least one camera image of the scene and generates corresponding image data representative of the respective camera image of the scene.

3702: Obtain calibration data representative of each camera's respective configuration and representative of at least one epipolar plane configuration shared among cameras, wherein an epipolar plane is shared between at least two cameras.

3703: Generate at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map.

3704: Transmit, for remote use in reconstruction of images of the scene, the calibration data, image data representative of the camera images, and at least one native disparity map.

3705: Receive, remote from the cameras having a physical camera view of the scene, the calibration data, image data representative of the camera images and at least one native disparity map.

3706: Generate, based on the calibration data, image data representative of the camera images and at least one native disparity map, a synthetic, reconstructed image of the scene from the perspective of a virtual camera having a selected virtual camera position, the selected virtual camera position being unconstrained by the physical position of any of the cameras having an actual view of the scene, wherein the generating of a reconstructed image comprises: (a) utilizing a selected rasterizing technique, selected ray tracing technique, or a selected combination of a rasterizing technique and a raytracing technique, to generate camera image UV sample coordinates and sample weights to generate the reconstructed image from the perspective of the virtual camera, and (b) executing a projection function for transforming a point in a disparity map generated from image data from the cameras into a coordinate on the display device, to accurately accommodate differences in position and field of view of the reconstructed image, as displayed on the display device, from that of the camera images captured from the remote scene, thereby to enable a selected virtual camera perspective to be accurately displayed on the display device.

FIG. 38 is a flowchart of an exemplary duplex configuration method 3800, comprising the following:

3801: Configure first and second digital processing resources, respectively corresponding to digital processing devices associated with respective first and second users, to communicate via a communications network to form a duplex configuration.

3802: Execute the capturing of images, obtaining calibration data, generating at least one native disparity map, transmitting image data, receiving image data, and generating of synthetic reconstructed images in a duplex configuration by the first and second digital processing resources, or by other digital processing resources in communication with the first and second digital processing resources via the communications network.

FIG. 39 is a flowchart: of a projection function method 3200, comprising the following (wherein parenthetical elements are optional to practice of inventive method):

(3901: Projection function is executed at least in part in accordance with a tracked position of the user's eyes, face or head.)

(3902: The position of the user's eyes, face or head are tracked by executing a tracking function.)

(3903: Executing a projection function comprises executing a field of view calculation, wherein a face depth value, representing a distance between a respective user's face and a display device associated with the user, is calculated and utilized in the field of view calculation, to enable a selected virtual camera perspective to be accurately displayed on the user's display device.)

(3904: The projection function transforms a plurality of points comprising a disparity map, such that the disparity map is projected by the projection function.)

(3905: Projecting a disparity map utilizes a raster technique.)

(3906: Projecting a disparity map utilizes a ray tracing technique.)

(3907: Projecting a disparity map utilizes a combination of a raster technique and a ray tracing technique.)

FIG. 40 is a flowchart of an exemplary calibration data method 4000, comprising the following (parenthetical elements are optional to practice of inventive method):

(4001: Capture images of the scene utilizing more than two cameras, wherein more than two cameras are calibrated to the same epipolar plane.)

(4002: Calibration data is generated so as to distribute alignment error between cameras sharing an epipolar plane.)

(4003: Calibration data is generated so as to evenly distribute alignment error between all cameras sharing an epipolar plane.)

(4004: Capturing and generating data are executed on one or more digital processing elements within one or more digital processing resources, and calibration data is generated during an initialization phase of one or more digital processing elements.)

(4005: Capturing and generating data are executed, on one or more digital processing elements within one or more digital processing resources, and calibration data is generated during manufacture of one or more digital processing elements.)

(4006: Capturing and generating data are executed on one or mote digital processing elements within one or more digital processing resources, and calibration data is established prior to manufacture of one or more digital processing elements.)

(4007: Generating of a synthetic image is executed on a digital processing resource, and the calibration data is received from a communications network in communication with the digital processing resource.)

(4008: Generating of a synthetic image is executed on a digital processing resource, and the digital processing resource has associated therewith a digital store pre-loaded with calibration data, without requiring the receiving of calibration data from a source external to the digital processing resource at runtime.)

(4009: Each camera image originates from a camera calibrated against at east one epipolar plane for which at least one native disparity map is produced.)

(4010: Generating a reconstructed image comprises ray-tracing into a set of projections of disparity maps based on the provided calibration data, thereby to produce camera image UV sample coordinates and sample weights.)

FIG. 41 is a flowchart of a multiple virtual camera positions method 4100, comprising the following (parenthetical elements are optional to practice of inventive method):

(4101: Select at least two respective virtual camera positions, and generate a plurality of reconstructed images, comprising reconstructed images corresponding to the selected virtual camera positions.)

(4102: The selected virtual camera positions correspond to respective right and left eye positions of a stereo display device.)

(4103: Selected virtual camera positions correspond to respective inputs of a light field display device.)

(4104: Display device is in a head mounted display (HMD) structure.)

(4105: The capturing of data is executed in association with at least one digital processing resource configured to transmit data, the generating of a synthetic image is executed in at least one digital processing resource configured to receive data, and a given receiving digital processing resource can select at least one virtual camera position.)

(4106: Generating a reconstructed image comprises rasterizing a mesh of projected polygons displaced by the disparity map from one of the cameras and the provided calibration data, thereby to produce camera image UV sample coordinates and sample weights.)

(4107: A native disparity map for a given epipolar plane is stored in rectified, undistorted (RUD) image space, based on an origin point of a first camera on the epipolar plane, with each disparity value indicating a pixel offset along the epipolar axis to a matching image feature in an image captured by a second camera on the epipolar plane, displaced from the first camera.)

(4108: The pixel offset represented by a given disparity value is expressed in the same coordinate system as that utilized by the map in which the disparity value is stored.)

Figure 42A:
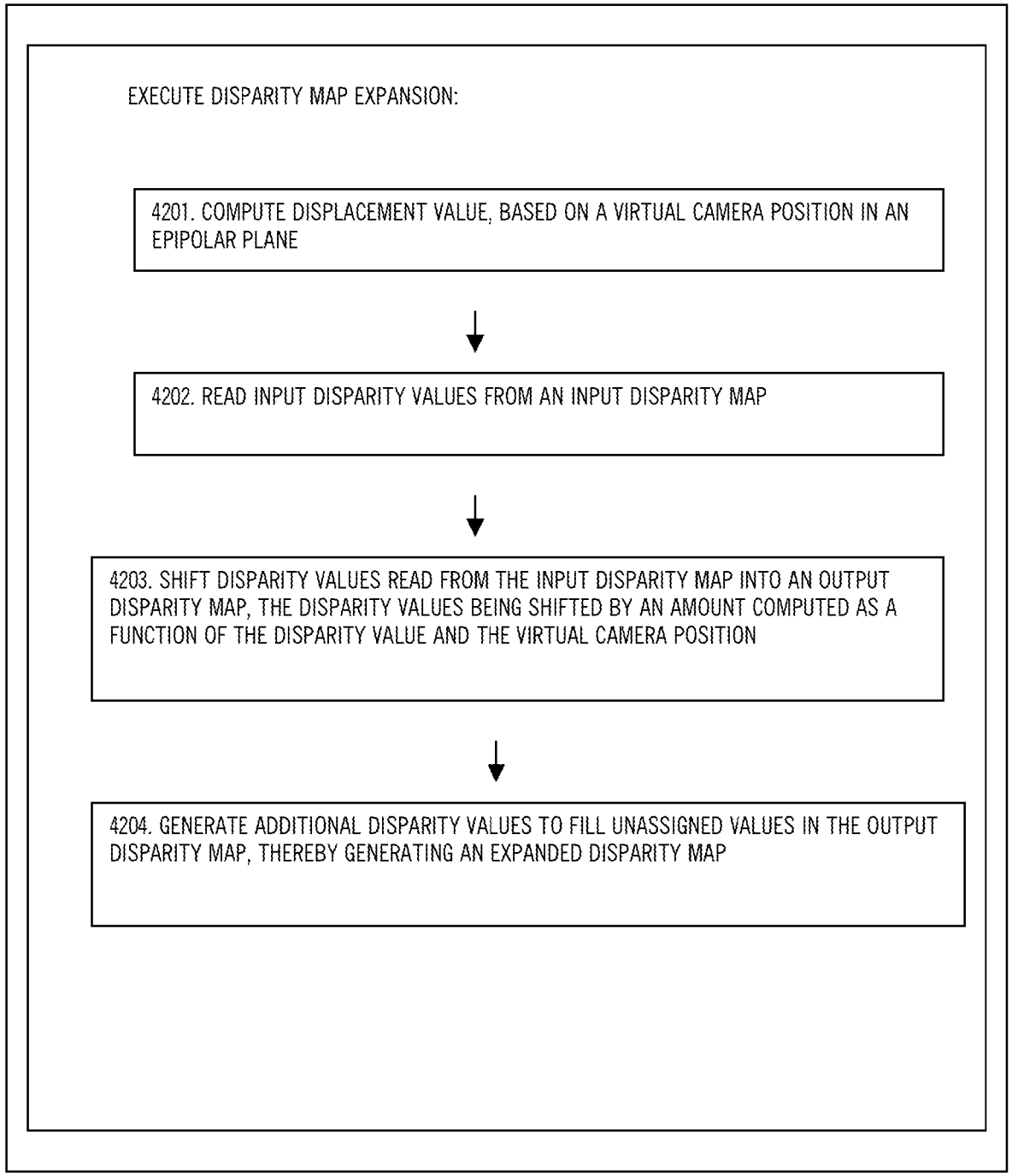

FIG. 42 (divided into FIGS. 42A and 42B) is a flowchart of a disparity map expansion method 4200, comprising the following (parenthetical elements are optional to practice of inventive method):

4201: Compute displacement value, based on a virtual camera position in an epipolar plane.

4202: Read input disparity values from an input disparity map.

4203: Shift disparity values read from the input disparity map into an output disparity map, the disparity values being shifted by an amount computed as a function of the disparity value and the virtual camera position.

4204: Generate additional disparity values to fill unassigned values in the output disparity map, thereby generating an expanded disparity map.

(4205: Maintain status indicator for a given value in the output disparity map to indicate whether the given value is considered final; and prefer final values to non-final values.)

(4206: Prefer values indicating greater disparity to values indicating less disparity.)

(4207: Generating a reconstructed image comprises utilizing a native disparity map or an expanded disparity map per each camera.)

(4208: if a native disparity map is available for a camera in at least one associated epipolar plane, use that native disparity map; otherwise, generate an expanded disparity map.)

(4209: Generate, for each camera for which a native disparity map is not available in any epipolar plane against which it is calibrated, an expanded disparity map from a native disparity map in an associated shared epipolar plane.)

(4210: Generate disparity values in a ray-tracing operation.)

(4211: Generate UV coordinates in a ray-tracing operation.)

(4212: Ray-tracing operation generates UV coordinates for instances in which a given ray misses all available disparity maps, thereby to provide a default hit resolution.)

(4213: Disparity map expansion is executed by a digital processing resource associated with a transmitting digital processing subsystem that transmits any of the calibration data, image data or at least one native disparity map.)

(4214: Disparity map expansion is executed by a digital processing resource associated with a receiving digital processing subsystem that receives any of: the calibration data, image data representative of the camera images, or at least one native disparity map.)

(4215: Disparity map expansion is executed by a digital processing resource associated with a communications network that conveys any of: the calibration data, image data representative of the camera images, or at least one native disparity map.)

FIG. 43 is a flowchart of transmitting and receiving subsystems 4300, comprising the following (parenthetical elements are optional to practice of inventive method):

(4301: Computationally solving the stereo correspondence problem to generate native disparity maps is executed by a digital processing resource associated with a transmitting digital processing subsystem that transmits any of: the calibration data, image data representative of the camera images, or at least one native disparity map.)

(4302: Computationally solving the stereo correspondence problem to generate native disparity maps is executed by a digital processing resource associated with a receiving digital processing subsystem that receives any of the calibration data, image data representative of the camera images, or at least one native disparity map.)

(4303: Computationally solving the stereo correspondence problem to generate native disparity maps is executed by a digital processing resource associated with a communications network that conveys any of: the calibration data, image data representative of the camera images, or at least one native disparity map.)

FIG. 44 is a flowchart of a disparity value/disparity map process execution method 4400, comprising the following (parenthetical elements are optional to practice of inventive method):

(4401: Computational operation for solving the stereo correspondence problem is executed on raw image sensor data.)

(4402: Computational operation for solving the stereo correspondence problem is executed on native image buffers with Bayer pattern removed.)

(4403: At least one camera captures color images):

(4404: Camera image data is compressed prior to transmission, and decompressed after being received.)

(4405: Disparity maps are compressed prior to transmission, and decompressed after being received.)

(4406: Disparity map compression utilizes a discrete cosine transform.)

(4407: The compression is lossless.)

(4408: Multiple disparity maps are encoded together to reduce computational cost.)

(4409: Multiple disparity maps are encoded together to improve compression efficiency.)

(4410: Disparity map values are quantized values with a selected bit depth, the bit depth being dependent on camera resolution and physical camera separation.)

(4411: A token, representative of values for background pixel disparity, is encoded with a selected small number of bits.)

FIG. 45 (including FIGS. 45A and 45B) is a flowchart of a camera/portal configuration method 4500, comprising the following:

4501: Array given set of cameras in a selected configuration:

(4502: Configuration comprises at least one epipolar plane, and at least one pair of cameras, and wherein a given camera can be a member of at least one pair of cameras/)

(4503: Configuration comprises at least two pairs of cameras, and wherein a given camera can be a member of at least two pairs of cameras.)

(4504: Configuration comprises (a) an epipolar plane for each pair of cameras, and (b) a plurality of pairs of cameras, the plurality of pairs of cameras comprising: each camera paired with, respectively, one of each of the other cameras in the configuration of cameras, such that the number of pairs of cameras exceeds the number of cameras.)

(4505: Configuration comprises one epipolar plane, and the number of pairs of cameras is less than or equal to the number of cameras.)

(4506: Configuration comprises at least one pair of cameras in which each camera comprises a sensor, and each camera pair has a camera pair baseline; and the calibration data comprises data representative of: (1) the length of a camera pair baseline, (2) the orientation of the camera pair, (3) the orientation of each camera sensor with respect to the camera pair, and (4) the orientation of a given camera sensor with respect to the at least one epipolar plane.)

(4507: Configuration comprises at least two pairs of cameras, each camera pair having a camera pair baseline, and wherein the respective baseline lengths of at least two pairs of cameras are unequal.)

(4508: Generate shared disparity map based on disparity values generated from each of at least two camera pairs, wherein disparity values generated from a camera pair are scaled so as to normalize the disparity data for inclusion in the shared disparity map.)

(4509: Configuration comprises at least two pairs of cameras: generate a shared disparity map based on disparity data generated from each of the at least two camera pairs, the shared disparity map having a selected resolution, wherein, for at least one camera pair, the resolution of at least one camera is unequal to the resolution of the shared disparity map.)

(4510: Scale disparity data generated from a camera pair for inclusion in the shared disparity map.)

(4511: Configuration comprises at least one pair of cameras in which the cameras in the pair have unequal resolutions.)

(4512: Scale output data from one camera in an unequal-resolution pair to align with the resolution of output data from the other camera in the pair.)

(4513: Configuration comprises at least two pairs of cameras, each camera pair having a camera pair baseline, and each camera having horizontal and vertical axes, and further wherein for at least one camera pair, the camera pair baseline is not aligned with either the horizontal or vertical axis of a given camera of the pair/)

(4514: Output data from at least one camera in a camera pair is rotated to generate disparity values.)

(4515: Each camera pair has an epipolar line between cameras in the pair, and disparity values are generated in a manner so as to account for the slope of the epipolar line between cameras in the pair.)

(4516: in the selected configuration, all cameras share the same epipolar plane.)

(4517: All cameras have the same physical resolution, and the baseline length for each camera pair is the same.)

(4518: Disparity values generated for any of the camera pairs are indicative of a distance between a scene feature and the array of cameras, and further comprising: computationally selecting, from among disparity values generated for any of the camera pairs, the most reliable disparity value.)

(4519: Configuration is octagonal, all cameras share the same epipolar plane, and all cameras have the same physical resolution.)

(4520: Generate enhanced disparity map expander kernel to account for the baseline orientation of an octagonal configuration by incorporating a 2D line algorithm.)

(4521: Two-dimensional (2D) line algorithm is Bresenham's line algorithm.)

(4522: Computationally rotate camera output buffers to facilitate application of a disparity map expander kernel that operates in a standard cardinal orientation.)

(4523: Configuration comprises a set of primary cameras and a set of secondary cameras; a given primary camera is paired with a secondary camera; and a given primary camera is also paired with at least one other primary camera.)

(4524: A given secondary camera has a lower physical resolution than that of the primary camera with which it is paired.)

(4525: The secondary cameras are utilized to generate disparity values and not RGB image data)

(4526: A pixel disparity computed for an image feature with respect to a given camera pair is normalized so that disparity information can be used across camera pairs.)

(4527: Disparity values are normalized with respect to the length of a given camera pair's epipolar line or baseline.)

(4528: Camera array configuration is substantially rectilinear.)

(4529: Camera array configuration is substantially square.)

(4530: Camera array configuration is non-rectilinear.)

Figure 46:
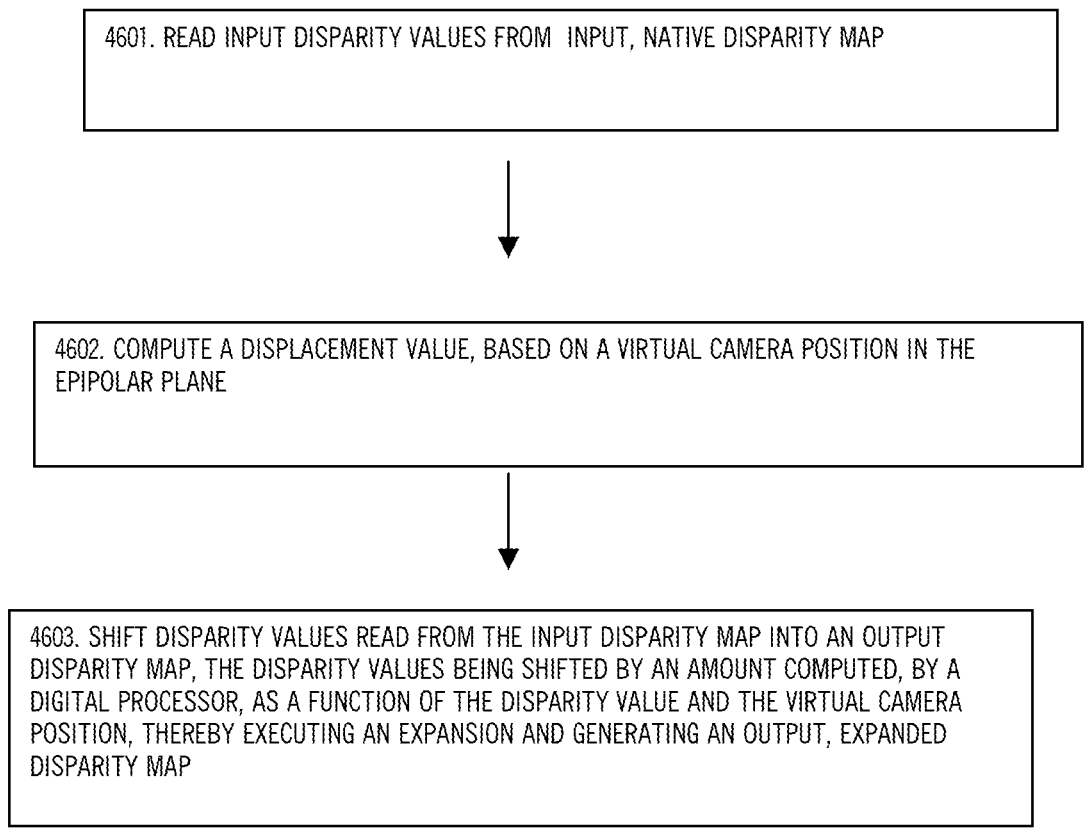

FIG. 46 is a flowchart of an exemplary method for generating an expanded disparity map 4600, comprising the following:

4601: Read input disparity values from input, native disparity map.

4602: Compute a displacement value, based on a virtual camera position in the epipolar plane.

4603: Shift disparity values read from the input disparity map into an output disparity map, the disparity values being shifted by an amount computed, by a digital processor, as a function of the disparity value and the virtual camera position, thereby executing an expansion and generating an output, expanded disparity map.

FIG. 47 is a flowchart of an exemplary method for determining stereo correspondence 4700, comprising the following:

4701: Computationally select, in a first input image, a feature comprising one or more image pixels.

4702: Computationally search, in a second input image, for a correspondence to the feature.

4703: Compute at least one disparity value for the feature, based on differences between the corresponding perspectives of the first and second input images.

4704: shift disparity values by an amount based on (a) the magnitude of the disparity values and (b) separation between the corresponding perspectives of the first and second input images.

FIG. 48 is a flowchart of an exemplary ray tracing method for reconstruction 4800, comprising the following:

4801: Use a digital processing element to read a disparity map for at least one of the physical cameras, the disparity map containing disparity values stored therein, wherein the disparity map represents a computational solution to the stereo correspondence problem between at least two cameras in a shared epipolar plane.

4802: Use a digital processing element to read calibration data representative of a camera's respective configuration and representative of at least one epipolar plane configuration shared among cameras, wherein an epipolar plane is shared between at least two cameras.

4803: Using, as an input, the calibration data for at least one camera for which a disparity map is readable, computationally project the disparity map for the at least one camera into a selected world space to generate a scene representation, the scene representation comprising a plurality of rectangles, the plurality of rectangles comprising one rectangle per each pixel in the disparity map, wherein a given rectangle is at a selected distance from the center of projection of the respective camera along its principal ray based on the associated disparity, with a selected size equivalent to that of the pixel projected onto a plane at the respective selected distance, such that, projected back onto the camera's view plane, the plurality of rectangles represents a rendering of the disparity map used to create the rectangles.

FIG. 49 is a flowchart of an exemplary ray tracing method for reconstruction 4900, comprising the following:

4901: Receive (1) a set of source images of the scene captured by at least two physical cameras each having a physical view of the scene, each image comprising a set of pixels, and each physical camera having associated frustum planes, including defined near and far planes, (2) disparity maps corresponding to the images captured by the at least two physical cameras, and (3) calibration data representative of (i) each of the physical cameras from which the images originate and (ii) a selected virtual camera configuration.

4902: For a given image pixel, generate at least ne ray based on the virtual camera configuration represented by the calibration data.

4903: Computationally intersect the ray with the frustum planes of the physical cameras, including the defined near and far planes, to establish a selected segment of the ray to be traced against each of the disparity maps.

4904: Computationally project the parametric intersections of the ray onto the camera image planes to establish start and end positions for 2D line traces through the disparity maps and associated distance function parameters.

4905: Iteratively step through the disparity maps and executing a ray tracing operation, each ray-tracing operation generating a depth value and a set of UV coordinates.

4906: Merge the generated depth values and UV coordinates into a blend map, the blend map comprising a 2D array of elements containing UV coordinates, each element corresponding to at least one pixel in an output image,

4907: Use the blend map to sample from at least one source image.

FIG. 50 is a flowchart of a mesh-based reconstruction method 5000, comprising the following:

5001: Read a native disparity map for a first physical camera having a physical view of a scene, the disparity map containing disparity values stored therein, the disparity map representing a computational solution to the stereo correspondence problem between at least two cameras in a shared epipolar plane.

5002: Read either a native disparity map or an expanded disparity map for a second physical camera having a physical view of the scene.

5003: Using at least the native disparity map for the first camera, execute the following:

5003A: Generate quad patch vertex values to form a vertex array, including generating a regular grid of vertices forming pairs of adjacent triangles that form, pairwise, respective square quads, wherein each vertex has (a) an associated normalized coordinate within the disparity map for the first camera, and (b) a disparity value, wherein the disparity value can be used tore-project the respective vertex to a new location based on a selected projection function.

5003B: Execute a selected transformation of the quad patch vertices.

5003C: Generate per-fragment disparity reference values and UV coordinate values corresponding to the first camera.

5003D: Generate UV coordinates for an image obtained by the second camera.

5003E: Execute weighted summation of samples from camera images captured by each first and second cameras.

5003F: Generate an input to a rasterization depth test, thereby projecting the disparity map from first camera into another, selected projection for reconstruction of a synthetic image from the perspective of a virtual camera.

FIG. 51 is a flowchart of a sample weighting method 5100, comprising the following:

5101: Receive, as an input, a sample request into a set of respective camera images, ones of the sample requests comprising a UV coordinate into a respective camera image in rectified, undistorted (RUD) space and a weighting value.

5102: Generate color values defining a color to be displayed on a display device at a respective projected point of the display of the display device, as part of a reconstructed synthetic image drawn on the'display of the display device, in accordance with a weighted summation of a plurality of camera image samples as defined by:

$$R = \sum_{i=0}^{n} W_i C_i,$$

where R is the reconstructed image color to be drawn at the projected coordinate of the display of the display device; n is the number of input source camera images being integrated; $W_i$ is the weight of the contribution from the given camera, given by a selected weighting function; and $C_i$ is a color sample from the given camera; and wherein $W_i$ is generated by executing a selected sample weighting function.

Conclusion

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted broadly prior art.

We claim:

1. A digital image processing method that enables remote reconstruction, based on remotely captured images of a scene, of synthetic images of the scene from the perspective of a virtual camera having a selected virtual camera position, the method comprising:

reading image data representative of images of a scene captured by at least two cameras, each having a respective physical camera view of the scene, each camera being configured to capture at least one camera image of the scene and generate corresponding image data representative of the respective camera image of the scene, wherein an epipolar plane is shared between at least two cameras;

reading at least one native disparity map for a given epipolar plane, wherein the native disparity map comprises a computational solution to a stereo correspondence problem between at least two cameras in a shared epipolar plane, using rectified images from the at least two cameras, with associated disparity values stored in the native disparity map;

reading calibration data representative of each camera's respective configuration and of at least one epipolar plane configuration shared among cameras; and generating, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene;

the generating of a reconstructed image of the scene from the perspective of a virtual camera comprising: utilizing a selected digital image processing technique to generate sample coordinates in a camera image, and sample weights, to generate the reconstructed image from the perspective of the virtual camera.

2. The method of claim 1 wherein:

reading image data comprises receiving image data from at least one digital processing resource;

reading at least one native disparity map comprises receiving at least one native disparity map from at least one digital processing resource; and the selected digital image processing technique is any of a rasterizing technique, a ray-tracing technique, or a combination of a rasterizing technique and a ray-tracing technique.

3. The method of claim 1 wherein the image data is prerecorded image data.

4. The method of claim 3 wherein the prerecorded image data is obtained from at least one digital storage resource.

5. The method of claim 1 further comprising:

capturing images of a scene, utilizing at least two cameras, each having a respective physical camera view of the scene, wherein each camera captures at least one camera image of the scene and generates corresponding image data representative of the respective camera image of the scene, and wherein an epipolar plane is shared between at least two cameras;

generating at least one native disparity map for a given epipolar plane, wherein generating a native disparity map comprises computationally solving the stereo correspondence problem between at least two cameras in a shared epipolar plane, using rectified images from the at least two cameras, and generating disparity values stored in the native disparity map;

transmitting, for remote use in reconstruction of images of the scene, image data representative of the camera images, and at least one native disparity map; and receiving the image data and at least one native disparity map;

wherein the capturing, generating of native disparity map and transmitting are executed in at least one transmitting digital processing resource, and the receiving, reading and generating of a synthetic, reconstructed image are executed in at least one receiving digital processing resource at least in part remote from the transmitting digital processing resource.

6. The method of claim 1, further comprising a sample weighting method adapted for reconstruction of synthetic images of a scene from the perspective of a virtual camera having a selected virtual camera position, based on images of the scene captured by at least two physical cameras, each having a respective physical camera view of the scene, the sample weighting method comprising:

receiving, as an input, a sample request into a set of respective camera images, ones of the sample requests comprising a coordinate into a respective camera image in Rectified, Undistorted (RUD) space and a weighting value; and generating color values defining a color to be displayed on a display device at a respective projected point of the display of the display device, as part of a reconstructed synthetic image drawn on the display of the display device, in accordance with a weighted summation of a plurality of camera image samples as defined by:

$$R = \sum_{i=0}^{n} W_i C_i,$$

where R is the reconstructed image color to be drawn at the projected coordinate of the display of the display device; n is the number of input source camera images being integrated; $W_i$ is the weight of the contribution from the given camera, given by a selected weighting function; and $C_i$ is a color sample from the given camera; and wherein $W_i$ is generated by executing a selected sample weighting function.

7. The method of claim 1, further comprising: capturing images of the scene utilizing at least three cameras.

8. The method of claim 7 wherein at least two cameras are calibrated to the same epipolar plane.

9. The method of claim 8 wherein calibration data is generated so as to distribute alignment error between cameras sharing an epipolar plane.

10. The method of claim 1 wherein the generating of a synthetic image is executed on at least one digital processing resource, and the calibration data is received from at least one communications network in communication with the at least one digital processing resource.

11. The method of claim 1 wherein the generating of a synthetic image is executed on at least one digital processing resource, and wherein the at least one digital processing resource has associated therewith at least one digital store pre-loaded with the calibration data, without requiring the receiving of calibration data from a source external to the at least one digital processing resource at runtime.

12. The method of claim 1 wherein generating a reconstructed image comprises ray-tracing into a set of projections of disparity maps based on the calibration data, thereby to produce sample coordinates in a camera image, and sample weights.

13. The method of claim 1 wherein generating a reconstructed image comprises rasterizing a mesh of projected polygons displaced by the disparity map from one of the cameras and the calibration data, thereby to produce sample coordinates in a camera image, and sample weights.

14. The method of claim 1 further comprising:
selecting at least two respective virtual camera positions, and generating a plurality of reconstructed images, comprising reconstructed images corresponding to the selected virtual camera positions;
wherein the selected virtual camera positions correspond to respective right and left eye positions of a stereo display device; and
wherein the display device is in a head mounted display (HMD).

15. The method of claim 1 further comprising:
transmitting camera image data; and
transmitting disparity maps; and wherein any of:
(A) camera image data is compressed prior to transmission, and decompressed after being received; or
(B) disparity maps are compressed prior to transmission, and decompressed after being received.

16. The method of claim 15 wherein the compression utilizes a discrete cosine transform.

17. The method of claim 1 wherein:
a given set of cameras is arrayed in a selected configuration, and the selected configuration comprises at least one epipolar plane, and at least one pair of cameras; and
a given camera can be a member of at least one pair of cameras.

18. The method of claim 17 wherein the selected configuration comprises at least two pairs of cameras, and wherein a given camera can be a member of at least two pairs of cameras.

19. The method of claim 17 wherein:
(A) the selected configuration comprises at least one pair of cameras in which each camera comprises a sensor, and each camera pair has a camera pair baseline; and
(B) the calibration data comprises data representative of: (1) the length of a camera pair baseline, (2) the orientation of the camera pair, (3) the orientation of each camera sensor with respect to the camera pair, and (4) the orientation of a given camera sensor with respect to the at least one epipolar plane.

20. A digital image processing method that enables capture of images of a given scene and remote reconstruction, based on the captured images, of synthetic images of the scene from the perspective of a virtual camera having a selected virtual camera position, the method comprising:

capturing images of a scene, utilizing at least two cameras, each having a respective physical camera view of the scene, wherein each camera captures at least one camera image of the scene and generates corresponding image data representative of the respective camera image of the scene;

reading calibration data representative of each camera's respective configuration and representative of at least one epipolar plane configuration shared among cameras, wherein an epipolar plane is shared between at least two cameras; and generating at least one native disparity map for a given epipolar plane, wherein generating a native disparity map comprises computationally solving a stereo correspondence problem between at least two cameras in a shared epipolar plane, using rectified images from the at least two cameras, and generating disparity values stored in the native disparity map; and generating a synthetic, reconstructed image of the scene from the perspective of a virtual camera having a selected virtual camera position, based on the calibration data, image data representative of the camera images, and at least one native disparity man, the selected virtual camera position being unconstrained by the physical position of any of the cameras having an actual view of the scene.

21. A program product for use with a digital processing system, for enabling remote reconstruction, based on remotely captured images of a scene, of synthetic images of the scene from the perspective of a virtual camera having a selected virtual camera position, the digital processing system comprising at least one digital processing resource, the digital processing resource comprising at least one digital processor, the program product comprising digital processor-executable program instructions stored on a non-transitory digital processor-readable medium, which when executed in the digital processing resource cause the at least one digital processing resource to:

read image data representative of images of the scene captured by at least two respective cameras, each having a respective physical camera view of the scene, each camera being configured to capture at least one camera image of the scene and generate corresponding image data representative of the respective camera image of the scene, wherein an epipolar plane is shared between at least two cameras;

read at least one native disparity map for a given epipolar plane, wherein the native disparity map comprises a computational solution to a stereo correspondence problem between at least two cameras in a shared epipolar plane, using rectified images from the at least two cameras, with associated disparity values stored in the native disparity map;

read calibration data representative of each camera's respective configuration and of at least one epipolar plane configuration shared among cameras; and generate, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene;

the generating of a reconstructed image of the scene from the perspective of a virtual camera comprising: utilizing a selected digital image processing technique to generate sample coordinates in a camera image, and sample weights, to generate the reconstructed image from the perspective of the virtual camera.

22. A system for enabling capture of images of a scene and remote reconstruction, based on the captured images, of synthetic images of the scene from the perspective of a virtual camera having a selected virtual camera position, the system comprising a digital processing resource comprising at least one digital processor, the digital processing resource being operable to:

read image data representative of images from the scene captured by at least two cameras, each having a respective physical camera view of the scene, wherein each camera is operable to capture at least one camera image of the scene and generate corresponding image data representative of the respective camera image of the scene, wherein an epipolar plane is shared between at least two cameras;

read at least one native disparity map for a given epipolar plane, wherein the native disparity map comprises a computational solution to a stereo correspondence problem between at least two cameras in a shared epipolar plane, using rectified images from the at least two cameras, with associated disparity values stored in the native disparity map;

read calibration data representative of each camera's respective configuration and of at least one epipolar plane configuration shared among cameras; and generate, based on the calibration data, image data and at least one native disparity map, a synthetic, reconstructed image of the scene from the perspective of a virtual camera having a selected virtual camera position, the selected virtual camera position being unconstrained by the physical position of any of the cameras having an actual view of the scene;

the generating of a reconstructed image of the scene from the perspective of a virtual camera comprising: utilizing a selected image processing technique to generate sample coordinates in a camera image, and sample weights, to generate the reconstructed image from the perspective of the virtual camera.

* * * * *